United States Patent
Shimizu et al.

[11] Patent Number: 5,903,296
[45] Date of Patent: May 11, 1999

[54] PHOTOELECTRIC SENSOR, INFORMATION RECORDING SYSTEM AND INFORMATION RECORDING AND REPRODUCING METHOD

[75] Inventors: Osamu Shimizu; Daigo Aoki; Tomoyuki Idehara; Masanori Akada, all of Tokyo, Japan

[73] Assignee: Dai Nippon Printing Co., Ltd., Tokyo, Japan

[21] Appl. No.: 08/869,512

[22] Filed: Jun. 5, 1997

Related U.S. Application Data

[63] Continuation of application No. 08/233,672, Apr. 26, 1994, abandoned.

[30] Foreign Application Priority Data

Apr. 26, 1993 [JP] Japan .................................... 5-099594

[51] Int. Cl.$^6$ ............................... B41J 2/385; B41J 2/06; G03G 13/04
[52] U.S. Cl. .................................. 347/139; 347/55
[58] Field of Search ........................ 347/55, 139, 262, 347/264, 153; 346/136; 520/25; 503/215, 216; 430/31, 48; 428/424.2, 394, 402.22

[56] References Cited

U.S. PATENT DOCUMENTS 3,958,207  5/1976  Tutihasi ...................................... 338/15

FOREIGN PATENT DOCUMENTS 0342967  11/1989  European Pat. Off. .
0404575  12/1990  European Pat. Off. .

(List continued on next page.)

OTHER PUBLICATIONS

M. Hiramoto et al.: Photocurrent Multiplication in Amorphous Silicon Carbide Films; Appl. Phys. Lett.; 59 (16), 1992 (1991).

M. Hiramoto et al.: Photocurrent Multiplication in Amorphous Silicon Carbide Films; J. Imag. Sci. Technol.; 37 (2), 192 (1993).

M. Hiramoto et al.: Photocurrent Multiplication Phenomenon in Organic Pigment Film; The Extended Abstract of the 53rd Autumn Meeting of the Japan Society of Applied Physics; 1043 (1992).

M. Hiramoto et al.: Photocurrent Multiplication in Organic Pigment Films; Final Program and the Proceedings of the 9th International Congress on Advances in Non–Impact Printing Technologies; Japan Hardcopy '93; 671 (1993).

M. Hiramoto et al.: Photocurrent Multiplication in Organic Pigment Films; Appl. Phys. Lett; 64 (2), 187 (1994).

(List continued on next page.)

*Primary Examiner*—Benjamin R. Fuller
*Assistant Examiner*—Raquel Yve He Gordon
*Attorney, Agent, or Firm*—Morgan & Finnegan, L.L.P.

[57] ABSTRACT

A photoelectric sensor having a photoconductive layer on an electrode and used to form information on an information recording medium. The photoelectric sensor is semiconductive and has such a function that when a voltage is applied between the electrode of the photoelectric sensor and an electrode of the information recording medium while information exposure is being carried out, or when information exposure is carried out with a voltage being applied between the two electrodes, information can be recorded on the information recording medium with an electric current amplified to a level higher than the intensity of a photoelectric current induced by the information exposure, and that even after termination of the information exposure, when the voltage is continuously applied, the photoelectric sensor shows electrical conductivity and continuously effects information recording to the information recording medium. The photoelectric sensor has a photo-induced current amplifying layer provided between the electrode and the photoconductive layer, thereby enabling an image free from unevenness and noise to be formed with high sensitivity.

21 Claims, 10 Drawing Sheets

FOREIGN PATENT DOCUMENTS

| | | |
|---|---|---|
| 0422238 | 4/1991 | European Pat. Off. . |
| 0454869 | 11/1991 | European Pat. Off. . |
| 0455824 | 11/1991 | European Pat. Off. . |
| 1289975 | 11/1989 | Japan . |
| 1290366 | 11/1989 | Japan . |
| 1290368 | 11/1989 | Japan . |
| 1293348 | 11/1989 | Japan . |
| 1293358 | 11/1989 | Japan . |
| 1293359 | 11/1989 | Japan . |
| 1293360 | 11/1989 | Japan . |
| 1295897 | 11/1989 | Japan . |
| 1296254 | 11/1989 | Japan . |
| 1296255 | 11/1989 | Japan . |
| 1296256 | 11/1989 | Japan . |
| 1298860 | 12/1989 | Japan . |
| 1298865 | 12/1989 | Japan . |
| 21693 | 1/1990 | Japan . |
| 256557 | 2/1990 | Japan . |
| 277764 | 3/1990 | Japan . |
| 277780 | 3/1990 | Japan . |
| 287148 | 3/1990 | Japan . |
| 289081 | 3/1990 | Japan . |
| 293477 | 4/1990 | Japan . |
| 2153365 | 6/1990 | Japan . |
| 2173756 | 7/1990 | Japan . |
| 2176765 | 7/1990 | Japan . |
| 2203353 | 8/1990 | Japan . |
| 2230244 | 9/1990 | Japan . |
| 2230246 | 9/1990 | Japan . |
| 2242260 | 9/1990 | Japan . |
| 2244004 | 9/1990 | Japan . |
| 2244053 | 9/1990 | Japan . |
| 2244062 | 9/1990 | Japan . |
| 2244064 | 9/1990 | Japan . |
| 2244086 | 9/1990 | Japan . |
| 2244155 | 9/1990 | Japan . |
| 2244156 | 9/1990 | Japan . |
| 2244157 | 9/1990 | Japan . |
| 2244158 | 9/1990 | Japan . |
| 2244160 | 9/1990 | Japan . |
| 2244162 | 9/1990 | Japan . |
| 2244166 | 9/1990 | Japan . |
| 2244167 | 9/1990 | Japan . |
| 2244168 | 9/1990 | Japan . |
| 2245181 | 9/1990 | Japan . |
| 2245182 | 9/1990 | Japan . |
| 2245645 | 10/1990 | Japan . |
| 2245731 | 10/1990 | Japan . |
| 2245734 | 10/1990 | Japan . |
| 2245735 | 10/1990 | Japan . |
| 2245758 | 10/1990 | Japan . |
| 2245759 | 10/1990 | Japan . |
| 2245760 | 10/1990 | Japan . |
| 2245761 | 10/1990 | Japan . |
| 2245762 | 10/1990 | Japan . |
| 2245763 | 10/1990 | Japan . |
| 2245764 | 10/1990 | Japan . |
| 2245765 | 10/1990 | Japan . |
| 2245766 | 10/1990 | Japan . |
| 2262664 | 10/1990 | Japan . |
| 2275960 | 11/1990 | Japan . |
| 2275968 | 11/1990 | Japan . |
| 2275974 | 11/1990 | Japan . |
| 2275980 | 11/1990 | Japan . |
| 2289865 | 11/1990 | Japan . |
| 315081 | 1/1991 | Japan . |
| 315087 | 1/1991 | Japan . |
| 320755 | 1/1991 | Japan . |
| 320756 | 1/1991 | Japan . |
| 37942 | 1/1991 | Japan . |
| 37943 | 1/1991 | Japan . |
| 354579 | 3/1991 | Japan . |
| 3154875 | 7/1991 | Japan . |
| 3158857 | 7/1991 | Japan . |
| 3158858 | 7/1991 | Japan . |
| 3158859 | 7/1991 | Japan . |
| 3158867 | 7/1991 | Japan . |
| 3170982 | 7/1991 | Japan . |
| 3170984 | 7/1991 | Japan . |
| 3170985 | 7/1991 | Japan . |
| 3172068 | 7/1991 | Japan . |
| 3174166 | 7/1991 | Japan . |
| 3175475 | 7/1991 | Japan . |
| 3192288 | 8/1991 | Japan . |
| 3192373 | 8/1991 | Japan . |
| 3200269 | 9/1991 | Japan . |
| 3200276 | 9/1991 | Japan . |
| 3219270 | 9/1991 | Japan . |
| 3231754 | 10/1991 | Japan . |
| 3246560 | 11/1991 | Japan . |
| 440475 | 2/1992 | Japan . |
| 446347 | 2/1992 | Japan . |
| 470757 | 3/1992 | Japan . |
| 470758 | 3/1992 | Japan . |
| 470759 | 3/1992 | Japan . |
| 470760 | 3/1992 | Japan . |
| 470808 | 3/1992 | Japan . |
| 470809 | 3/1992 | Japan . |
| 470841 | 3/1992 | Japan . |
| 470842 | 3/1992 | Japan . |
| 470843 | 3/1992 | Japan . |
| 470844 | 3/1992 | Japan . |
| 470845 | 3/1992 | Japan . |
| 470846 | 3/1992 | Japan . |
| 470864 | 3/1992 | Japan . |
| 470870 | 3/1992 | Japan . |
| 470871 | 3/1992 | Japan . |
| 470872 | 3/1992 | Japan . |
| 470887 | 3/1992 | Japan . |
| 470894 | 3/1992 | Japan . |
| 473656 | 3/1992 | Japan . |
| 473769 | 3/1992 | Japan . |
| 4336752 | 11/1992 | Japan . |
| 4337961 | 11/1992 | Japan . |
| 4362916 | 12/1992 | Japan . |
| 52280 | 1/1993 | Japan . |
| 5107775 | 4/1993 | Japan . |
| 5107776 | 4/1993 | Japan . |
| 5107777 | 4/1993 | Japan . |
| 5134426 | 5/1993 | Japan . |
| 5150251 | 6/1993 | Japan . |
| 5165005 | 6/1993 | Japan . |
| 5232770 | 9/1993 | Japan . |
| 5238181 | 9/1993 | Japan . |
| 5270140 | 10/1993 | Japan . |
| 5297351 | 11/1993 | Japan . |
| 5297352 | 11/1993 | Japan . |
| 5297353 | 11/1993 | Japan . |
| 611727 | 1/1994 | Japan . |
| 618917 | 1/1994 | Japan . |
| 618918 | 1/1994 | Japan . |
| 648044 | 2/1994 | Japan . |

OTHER PUBLICATIONS

S. Kawase et al: Photocurrent Multiplication Device in Organic Pigment Film; The 67th National Meeting of the Chemical Society of Japan; Abstract No. 670 (1994).

T. Yajima et al.: Mechanism of Photocurrent Multiplication in Organic/Inorganic Layered Photoreceptors Consisting of a–SiC:H; The Proceedings of the Annual Conference of Japan Hardcopy '92 for the Society of Electrophotography of Japan; 211 (1992).

A. Fujii et al.: Plastic Devices Using Memory–Type Organic Photoconductor; The Extended Abstract of the 39th Spring Meeting of the Japan Society of Applied Physics and related Societies; 1064 (1992).

PHOTOELECTRIC SENSOR, INFORMATION RECORDING SYSTEM AND INFORMATION RECORDING AND REPRODUCING METHOD

This is a continuation of application Ser. No. 08/233,672, filed on Apr. 26, 1994 now abandoned.

BACKGROUND OF THE INVENTION

The present invention relates to a photoelectric sensor capable of recording light information on an information recording medium in the form of visible information or electrostatic information. More specifically, the present invention relates to a photoelectric sensor having on an electrode a photo-induced current amplifying layer which has photo-induced current amplifying action and/or injection current stabilizing action. The present invention also relates to an information recording system including the photoelectric sensor and an information recording medium, and to an information recording and reproducing method which employs the information recording system. More particularly, the present invention relates to an information recording system including a photoelectric sensor having a photo-induced current amplifying layer that markedly amplifies the information recording performance with respect to an information recording medium, thereby making it possible to obtain a predetermined image density and eliminate unevenness of the recorded image and generation of image noise, and also relates to an information recording and reproducing method which employs the information recording system.

There has heretofore been an information recording and reproducing method in which a photoelectric sensor having a photoconductive layer provided with an electrode on the front side thereof is disposed to face, on an optical axis, an information recording medium having an electric charge retaining layer provided with an electrode on the rear side thereof, and exposure is carried out with a voltage being applied between the two electrodes, thereby enabling electrostatic charge corresponding to the incident optical image to be recorded on the electric charge retaining layer, and then the recorded electrostatic information is reproduced by toner development or electric potential reading method, as described, for example, in Japanese Patent Application Laid-Open (KOKAI) Nos. 01-290366 and 01-289975. There is another conventional information recording and reproducing method in which the electric charge retaining layer in the above-described method is replaced by a thermoplastic resin layer, and after electrostatic charge has been recorded on the surface of the thermoplastic resin layer, heating is carried out to form a frost image on the surface of the thermoplastic resin layer, thereby making the recorded electrostatic charge visible, as described, for example, in Japanese Patent Application Laid-Open (KOKAI) No. 03-192288.

The present applicants have developed an information recording and reproducing method in which the information recording layer of the above-described information recording medium is a polymer dispersed liquid crystal layer, and in which exposure is carried out under voltage application in the same way as the above, and the molecules in the liquid crystal layer are aligned by an electric field formed by a photoelectric sensor, thereby effecting information recording, and the recorded information is reproduced as visible information by transmitted or reflected light. With regard to the information recording and reproducing method, we have filed applications as Japanese Patent Application Nos. 04-3394, 04-24722 and 05-266646. This method enables the recorded information to be made visible without using a polarized light plate.

For these information recording methods, there has been a demand for a photoelectric sensor which enables information recording of higher sensitivity, higher resolution and higher image quality. There has also been a demand for a photoelectric sensor of high resolution and high sensitivity which provides a highly stable base current and photo-induced current and which is free from unevenness of sensitivity and noise, thereby enabling an image to be formed at a predetermined image density without scumming.

It is an object of the present invention to provide a photoelectric sensor used to form information on an information recording medium, which has superior information forming power and improved information recording sensitivity, whereby it is possible to obtain an image of high quality which is free from image density variation, sensitivity unevenness and noise, which are particularly noticeable problems in photoelectric sensors of high resolution and high sensitivity, and to provide an information recording system including the photoelectric sensor, and an information recording and reproducing method which employs the information recording system.

SUMMARY OF THE INVENTION

The present invention provides a photoelectric sensor having a photoconductive layer on an electrode and used to form information on an information recording medium. The photoelectric sensor is semiconductive and has such a function that when a voltage is applied between the electrode of the photoelectric sensor and an electrode of the information recording medium while information exposure is being carried out, or when information exposure is carried out with a voltage being applied between the two electrodes, information can be recorded on the information recording medium with an electric current amplified to a level higher than the intensity of a photoelectric current induced by the information exposure, and that even after termination of the information exposure, when the voltage is continuously applied, the photoelectric sensor shows moderately decaying electrical conductivity and continuously effects information recording to the information recording medium. The photoelectric sensor has a photo-induced current amplifying layer provided between the electrode and the photoconductive layer.

In addition, the present invention provides a photoelectric sensor having a photoconductive layer on an electrode and used to form information on an information recording medium having an information recording layer stacked on an electrode so that information can be formed on the information recording layer by an electric field or electric charge given thereto from the photoelectric sensor disposed to face the information recording medium. The photoelectric sensor is semiconductive and has such a function that when a voltage is applied between the electrode of the photoelectric sensor and the electrode of the information recording medium while information exposure is being carried out, or when information exposure is carried out with a voltage being applied between the two electrodes, the electric field or electric charge given to the information recording medium is amplified, and that even after termination of the information exposure, when the voltage is continuously applied, the photoelectric sensor sustains electrical conductivity and continuously gives the electric field or electric charge to the information recording medium. The photoelectric sensor has a photoinduced current amplifying layer provided between the electrode and the photoconductive layer.

The photoconductive layer may have a single-layer structure containing a photoconductive substance and a charge transport substance.

The photoconductive layer may have a double-layered structure including a charge generation layer and a charge transport layer.

The photo-induced current amplifying layer contains at least one substance selected from an electron accepting substance, an organic pigment and a synthetic resin material.

The photo-induced current amplifying layer has photoinduced current amplifying action and/or injection current stabilizing action.

Preferably, when an electric field having an intensity of $10^5$ V/cm to $10^6$ V/cm is applied to the photoelectric sensor during the voltage application, the passing current density at the unexposed portion is $10^{-4}$ A/cm$^2$ to $10^{-7}$ A/cm$^2$.

Preferably, when a thermally stimulated current is measured at a bias voltage of 1.5 V/um, clear peak is observed in the range of 50° C. to 110° C., and the current density at the peak is not lower than $5 \times 10^{-8}$ A/cm$^2$.

In addition, the present invention provides an information recording system for recording light information on an information recording medium by information exposure. The system comprises the above-described photoelectric sensor and the information recording medium having an information recording layer formed on an electrode. The photoelectric sensor and the information recording medium are disposed on an optical axis to face each other across a gap and connected to each other so that a voltage can be applied between the electrode of the photoelectric sensor and the electrode of the information recording medium.

The information recording layer may comprise a liquid crystal phase and a resin phase.

The information recording layer may be made of a thermoplastic resin and heated after electric charge corresponding to information exposure has been given to a surface thereof, thereby forming a frost image corresponding to the information exposure on the surface of the information recording layer.

The information recording layer may be an electric charge retaining layer, so that electric charge corresponding to information exposure is given to and formed on a surface of the information recording layer, or the electric charge formed on the surface of the information recording layer is developed with a toner.

The information recording layer may have memory properties.

Preferably, when an electric field having an intensity of $10^5$ V/cm to $10^6$ V/cm is applied to the photoelectric sensor, the passing current density at the unexposed portion is $10^{-4}$ A/cm$^2$ to $10^{-7}$ A/cm$^2$, and the resistivity of the information recording medium is $10^{10}$ ohm-cm to $10^{13}$ ohm-cm.

In addition, the present invention provides an information recording system having a photo-induced current amplifying layer, a photoconductive layer, a dielectric layer, an information recording layer, and an upper electrode, which are successively stacked on a lower electrode in the mentioned order, wherein a photoelectric sensor part including the lower electrode, the photo-induced current amplifying layer and the photoconductive layer comprises the above-described photoelectric sensor, and the lower and upper electrodes are connected together so that a voltage can be applied therebetween.

The information recording layer of the information recording medium may comprise a liquid crystal phase and a resin phase.

In addition, the present invention provides an information recording and reproducing method wherein light information is recorded on an information recording medium by information exposure. The method comprises: using the above-described photoelectric sensor and the information recording medium having an information recording layer formed on an electrode, at least one of the electrodes of the photoelectric sensor and the information recording medium being transparent; disposing the photoelectric sensor and the information recording medium on an optical axis to face each other across a gap; applying a voltage between the two electrodes while carrying out light information exposure, or carrying out light information exposure while applying a voltage between the two electrodes, thereby recording light information on the information recording medium; and reproducing the light information recorded on the information recording medium as visible information by transmitted or reflected light.

In addition, the present invention provides an information recording and reproducing method wherein light information is recorded on an information recording medium by information exposure. The method comprises: using the above-described photoelectric sensor and the information recording medium having an information recording layer of a thermoplastic resin formed on an electrode; carrying out light information exposure; heating the information recording layer after electric charge has been given to a surface thereof by the light information exposure, thereby forming a frost image corresponding to the information exposure on the surface of the information recording layer; and reproducing the light information recorded on the information recording medium as visible information by transmitted or reflected light.

In addition, the present invention provides an information recording and reproducing method wherein light information is recorded on an information recording medium by information exposure. The method comprises: using the above-described photoelectric sensor and the information recording medium having as an information recording layer an electric charge retaining layer formed on an electrode; carrying out light information exposure to give electric charge to the information recording layer, thereby recording light information on the information recording medium; and reading and reproducing the recorded light information with an electric potential sensor.

In addition, the present invention provides an information recording and reproducing method wherein light information is recorded on an information recording medium by information exposure. The method comprises: using the above-described photoelectric sensor and the information recording medium having as an information recording layer an electric charge retaining layer formed on an electrode; carrying out light information exposure to give electric charge to the information recording layer, thereby recording light information on the information recording medium; developing the recorded light information with a toner; and reproducing the recorded light information as visible information by transmitted or reflected light.

In addition, the present invention provides an information recording and reproducing method wherein light information is recorded on an information recording medium by information exposure. The method comprises: using the information recording medium having a photo-induced current amplifying layer, a photoconductive layer, a dielectric layer, an information recording layer, and an upper electrode, which are successively stacked on a lower electrode in the mentioned order, in which a photoelectric sensor part including the lower electrode, the photo-induced current amplifying layer and the photoconductive layer comprises the above-described photoelectric sensor, at least one of the upper and lower electrodes being transparent; applying a voltage between the upper and lower electrodes while carrying out light information exposure, or carrying out light information exposure while applying a voltage between the upper and lower electrodes, thereby recording light information on the information recording medium; and reproducing the light information recorded on the information recording medium as visible information by transmitted or reflected light.

The photoelectric sensor of the present invention, which is used to record light information on an information recording medium, has a photo-induced current amplifying layer and a photoconductive layer which are stacked on an electrode. The photoelectric sensor is semiconductive and has such a function that when a voltage is applied between the electrode of the photoelectric sensor and an electrode of the information recording medium while information exposure is being carried out, or when information exposure is carried out with a voltage being applied between the two electrodes, the electric field or electric charge given to the information recording medium is amplified, and that even after termination of the information exposure, when the voltage is continuously applied, the photoelectric sensor sustains electrical conductivity and continuously gives the electric field or electric charge to the information recording medium.

Since the photoelectric sensor has a photo-induced current amplifying layer provided between the electrode and the photoconductive layer, the injection of charge carriers from the electrode into the photoconductive layer can be stably controlled, and when no light is applied to the photoelectric sensor, the overall electrical conductivity of the photoelectric sensor is kept semiconductive. In addition, it is possible to eliminate partial or local unevenness of sensitivity of the photoelectric sensor, which would otherwise be likely to occur when light is applied to the photoelectric sensor.

Although the reason for the above characteristics is not clear, it is considered that in the photoelectric sensor of the present invention all photocarriers generated as a result of the irradiation with information light do not move in the direction of the width of the photoconductive layer under the voltage application condition, but some photocarriers are trapped in trap sites present in the photo-induced current amplifying layer, and trapped carriers are accumulated with time, so that under the voltage application condition, charge carriers injected from the electrode are induced to flow as a current by the trapped carriers in addition to the photocurrent generated by exposure, thus amplifying the apparent photocurrent. It is further surmised that when exposure is terminated with the voltage application condition maintained, photocarriers generated by the exposure immediately decay and disappear, but the decay of the trapped carriers is moderate, and hence the current of charge carriers injected from the electrode, which is induced by the trapped carriers, flows in a sufficient amount although it decays.

In addition, it is considered that the trap sites present in the photo-induced current amplifying layer have been partly filled in advance of irradiation with light, and therefore the injection of charge carriers from the electrode into the photoconductive layer can be stably controlled by providing between the electrode and the photoconductive layer a photo-induced current amplifying layer having a trap site filling rate set at a predetermined value. Consequently, when no light is applied to the photoelectric sensor, the overall electrical conductivity of the photoelectric sensor can be maintained at a semiconductive level within the electrical conductivity range according to the present invention. At the same time, the photoelectric sensor is free from partial unevenness of the recorded information occurring over a relatively wide area and observed as unevenness of sensitivity and local unevenness of the recorded information occurring locally and observed as noise, which sensitivity unevenness and noise are supposed to be caused by non-uniform injection of charge carriers from the electrode into the photoconductive layer, which is likely to occur because of nonuniform contact at the interface between the electrode and the photoconductive layer.

Thus, the photoelectric sensor of the present invention enables high-sensitivity and high-quality information recording on an information recording medium without unevenness of sensitivity and noise.

DESCRIPTION OF THE PREFERRED EMBODIMENTS

The present invention will be described below in detail.

The photoelectric sensor of the present invention, which is used in an information recording system, has a photo-induced current amplifying layer and a photoconductive layer stacked on an electrode. The photoconductive layer may have a single-layer structure or a double-layered structure including a charge generation layer and a charge transport layer, which are stacked one on top of another. The photoconductive layer generally functions such that when it is irradiated with light, photo-induced charge carriers (electrons or holes) are generated in the irradiated portion and these carriers are movable across the width of the layer. The photoelectric sensor of the present invention has a photo-induced current amplifying layer (described later) provided between the electrode and the photoconductive layer, thereby enabling an electric field or electric charge, which is given to an information recording medium when the photoelectric sensor is irradiated with light, to be amplified with time during the light irradiation. In addition, even after the termination of the light irradiation, when the voltage is continuously applied, the photoelectric sensor sustains the increased conductivity in the form of moderately decaying electrical conductivity and continuously gives the electric field or the electric charge to the information recording medium. Further, since the photoelectric sensor has a photo-induced current amplifying layer provided between the photoconductive layer and the electrode, the injection of charge carriers from the electrode into the photoconductive layer can be stably controlled, and when no light is applied to the photoelectric sensor, the overall electrical conductivity of the photoelectric sensor is kept semiconductive. In addition, it is possible to minimize partial or local unevenness of sensitivity of the photoelectric sensor, which would otherwise be likely to occur when light is applied to the photoelectric sensor, i.e., noise appearing as an undesired blank spot, black spot, etc. when an image is formed.

Figure 5:
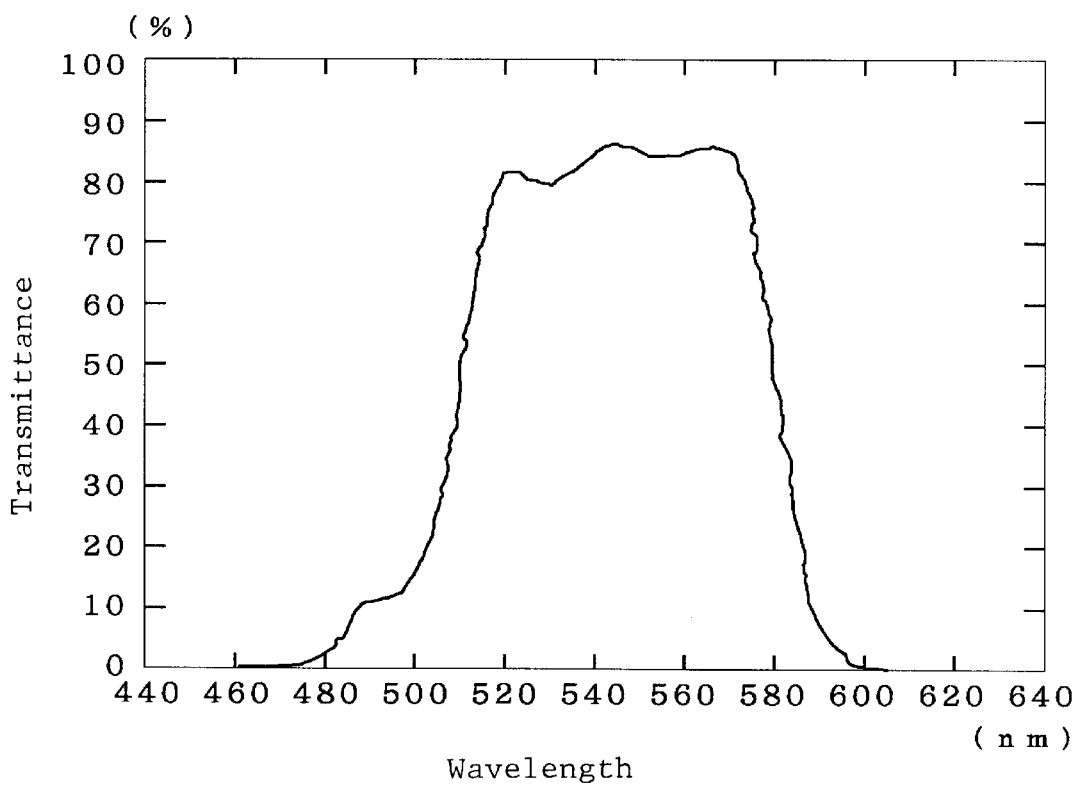
FIG. 5 is a graph showing spectral characteristics of a green filter in a measuring system used to explain the photocurrent amplifying action of the photoelectric sensor according to the present invention.

The photo-induced current amplifying action taking place in the photoelectric sensor of the present invention will be explained below. A photoelectric sensor having an ITO electrode provided on a transparent glass substrate and a photoconductive layer stacked on the electrode is prepared as a photoelectric sensor for measuring the amplifying action, and a gold electrode of 0.16 $cm^2$ is stacked on the photoconductive layer. Then, a predetermined DC voltage is applied between the two electrodes with the ITO electrode used as a positive electrode. In addition, 0.5 sec. after the initiation of the voltage application, the photoelectric sensor is irradiated with light for 0.033 sec. from the substrate side. The behavior of the current flowing in the photoelectric sensor during the time of measurement is measured from the time (t=0) of initiation of the light irradiation. It should be noted that as the light for irradiation, green light was selected from light emitted from a xenon lamp (L2274, manufactured by Hamamatsu Photonics K.K.) as a light source by using a green filter (manufactured by Vacuum Optics Co., of Japan) and applied at a luminous intensity of 20 lux. The intensity of light was measured with an illuminometer (manufactured by Minolta Camera Co., Ltd.). FIG. 5 shows the characteristics of the filter used.

When the photoelectric sensor is irradiated with light having the above-described intensity, $4.2 \times 10^{11}$ photons/$cm^2$-sec. are incident on the photoconductive layer, considering the light transmittance of the transparent substrate and the ITO film and the spectral characteristics of the filter. If all the incident photons are converted into photocarriers, a photocurrent of $1.35 \times 10^{-6}$ $A/cm^2$ (per unit area) is generated in theory.

When measurement is carried out with the above-described measuring system, the ratio of the photo-induced current actually generated in the photosensitive sensor to the theoretical photocurrent is defined as the quantum efficiency of the photoelectric sensor:

Quantum efficiency=photo-induced current actually generated in the photoelectric sensor/theoretical photocurrent The term "photo-induced current" is employed herein to mean what is obtained by subtracting the value of base current, which is a current flowing through a portion irradiated with no light, from the value of current flowing through a portion irradiated with light. Therefore, the photo-induced current is not so-called photocurrent but a current which flows due to light irradiation in excess of the base current during the light irradiation or even after the light irradiation. The photo-induced current amplifying action in the photoelectric sensor of the present invention is defined as the behavior of such photo-induced current.

Figure 6:
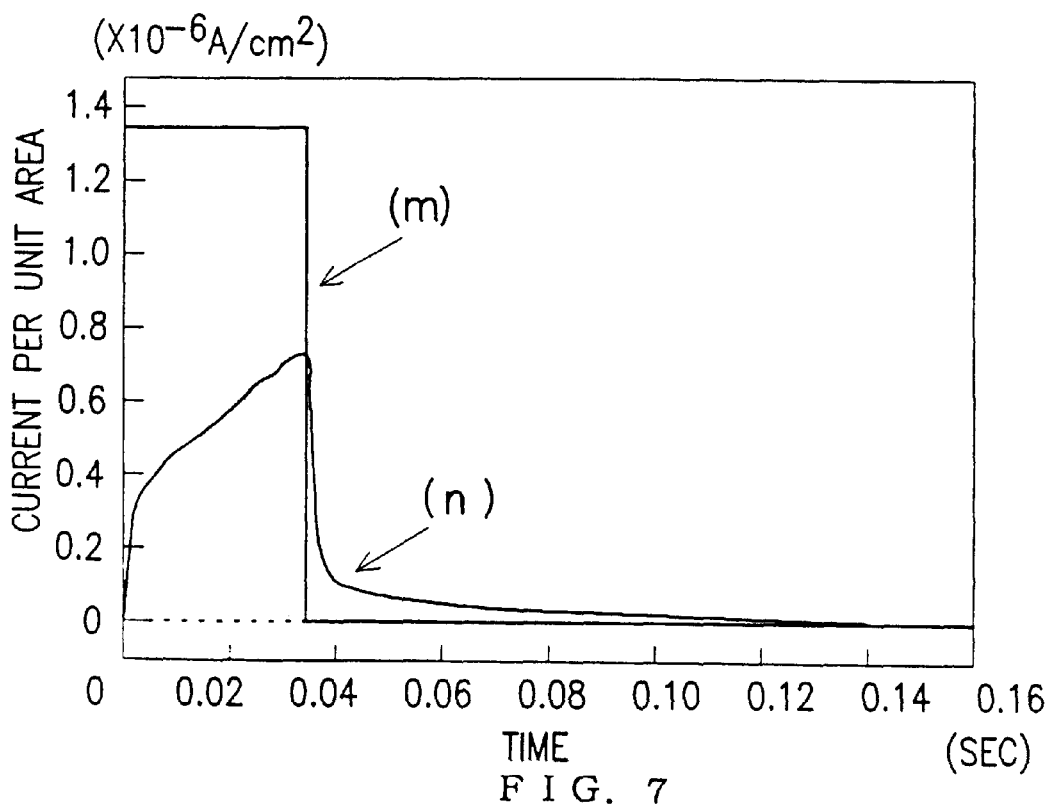
FIG. 6 is a graph showing the results of measurement of photocurrent amplifying action of a comparative photoelectric sensor.
Figure 7:
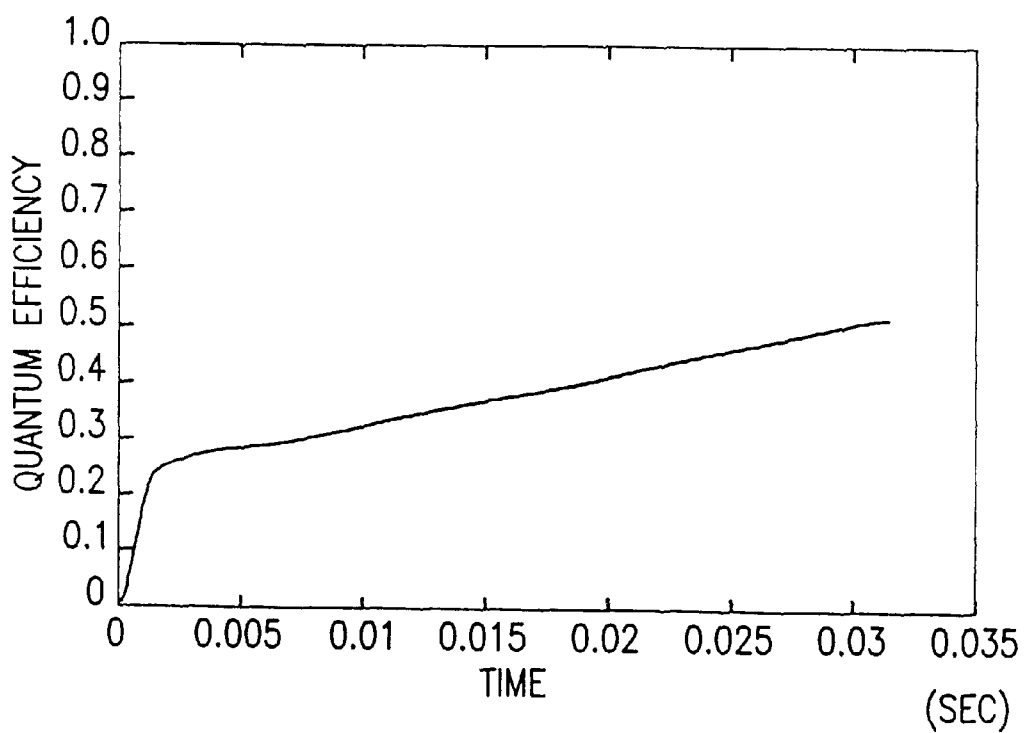
FIG. 7 is a graph showing the change of quantum efficiency of the comparative photoelectric sensor during light irradiation.

The photoelectric sensor including a photo-induced current amplifying layer having photo-induced current amplifying action according to the present invention and a photoelectric sensor (hereinafter referred to as "comparative sensor") having no photo-induced current amplifying layer will be explained below by using the results of measurement carried out with the above-described measuring system. First, the results of measurement with regard to the comparative sensor are shown in FIG. 6. In FIG. 6, the line m is a reference line indicating the above-described theoretical value ($1.35 \times 10^{-6}$ $A/cm^2$). The line m shows a state wherein light irradiation is effected for 0.033 sec. and the voltage application is continued even after the termination of the light irradiation. The line n shows the current measured in the photoelectric sensor having no photo-induced current amplifying layer. It will be understood from the line n that the increase of the photocurrent is small during the light irradiation, and the value does not exceed the theoretical value ($1.35 \times 10^{-6}$ $A/cm^2$). The quantum efficiency of the comparative sensor is only about 0.5 at the highest. FIG. 7 shows the change of the quantum efficiency during the light irradiation.

Figure 8:
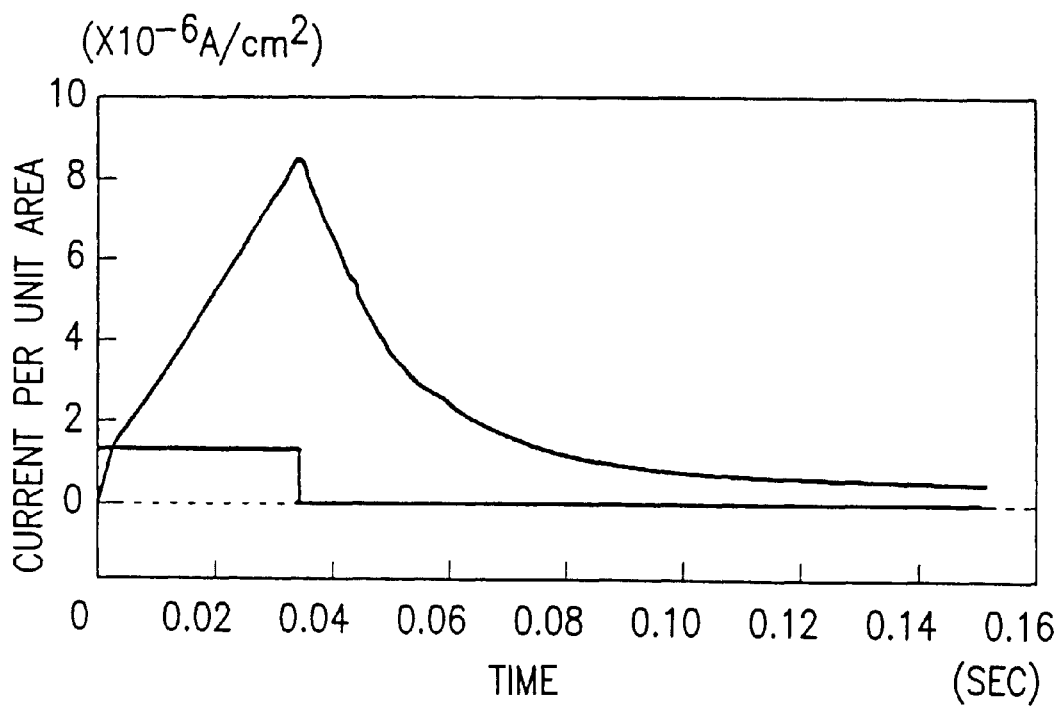
FIG. 8 is a graph showing the results of measurement of photocurrent amplifying action of the photoelectric sensor of the present invention.
Figure 9:
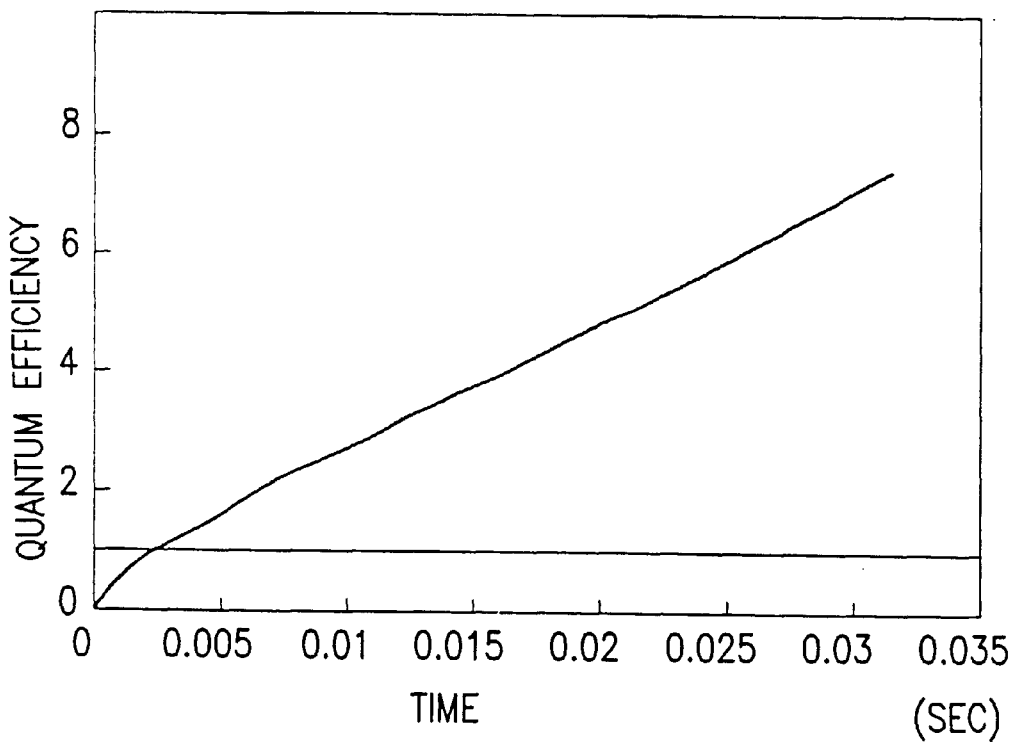
FIG. 9 is a graph showing the change of quantum efficiency of the photoelectric sensor according to the present invention during light irradiation.

In contrast, in the photoelectric sensor of the present invention the photo-induced current increases during the light irradiation, as shown, for example, in FIG. 8, and as will be clear from FIG. 9, which shows the relationship between the quantum efficiency and time, the quantum efficiency exceeds 1 about 0.003 sec. after the initiation of the light irradiation, and it still continues increasing thereafter. That is, the provision of the photo-induced current amplifying layer makes it possible to obtain a much higher amplification factor than in the case of a photo-induced current condition which is usually attainable with a photo-electric sensor having no photo-induced current amplifying layer.

In the comparative sensor, the photocurrent decays rapidly at the same time as the light irradiation terminates. Therefore, no current effective as light information can be obtained even when the voltage application is continued after the termination of the light irradiation. On the other hand, in the photoelectric sensor of the present invention, the photo-induced current continuously flows when the voltage application is continued even after the termination of the light irradiation. Thus, the photo-induced current can be continuously taken out, and light information can be continuously obtained.

Although the reason for the above is not clear, it is considered that in the photoelectric sensor of the present invention all photo-induced charge carriers generated as a result of the irradiation with information light do not move in the direction of the width of the photoconductive layer under the voltage application condition, but some photo-induced charge carriers are trapped in trap sites present in the photoconductive layer or in the extremely thin photo-induced current amplifying layer present between the electrode and the photoconductive layer, and trapped carriers are accumulated with time, so that under the voltage application condition, charge carriers injected from the electrode are induced to flow as a current by the trapped carriers in addition to the photocurrent generated by exposure, thus amplifying the apparent photo-induced current with time. Thus, by providing such a photo-induced current amplifying layer in the photoelectric sensor, photo-induced current amplifying action can be effectively produced. It is further surmised that when exposure is terminated with the voltage application condition maintained, photocarriers generated by the exposure immediately decay and disappear, but the decay of the trapped carriers is moderate, and hence the current of charge carriers injected from the electrode, which is induced by the trapped carriers, flows in a sufficient amount although it decays. The phenomenon that the electrical conductivity gradually decays is referred to as "moderately decaying electrical conductivity". The photo-induced current is the advantageous result obtained by the current amplification, which is triggered by light, in the photoelectric sensor of the present invention. Since a photocurrent larger than the photocurrent generated by incident light, which is expected from an ordinary photosensitive member, flows by virtue of the amplifying action, light information can be effectively supplied to an information recording medium.

Next, the injection current stabilizing action taking place in the photoelectric sensor of the present invention will be explained.

The injection current stabilizing action includes two actions, that is, the action of controlling the amount of charge carrier injected, and the action of uniforming the injection of carriers. First, the injection control action will be explained.

The photoelectric sensor of the present invention is a semiconductive device whose resistivity in dark is preferably in the range of $10^9$ ohm-cm to $10^{13}$ ohm-cm from the viewpoint of the density of current flowing. When the resistivity is in the range of $10^{10}$ ohm-cm to $10^{11}$ ohm-cm, a particularly remarkable amplifying action is obtained. A photoelectric sensor having a resistivity more than $10^{13}$ ohm-cm shows no amplifying action as occurs in the photoelectric sensor of the present invention in the field intensity range of $10^5$ V/cm to $10^6$ V/cm. In a photoelectric sensor having a resistivity less than $10^9$ ohm-cm, an exceedingly large current flows, so that noise is likely to occur due to the current. Therefore, such a photoelectric sensor is unfavorable.

By providing the photo-induced current amplifying layer, the amount of charge carrier injected from the electrode can be controlled so that the overall electrical conductivity of the photoelectric sensor is set at a favorable level. Thus, it is possible to obtain a photoelectric sensor having considerably excellent amplifying characteristics.

On the other hand, photosensitive devices employed for general electrophotography have a dark resistivity in the range of $10^{14}$ ohm-cm to $10^{16}$ ohm-cm. Therefore, the photoelectric sensor of the present invention cannot attain the object of the present invention in electrophotography, whereas photoelectric sensors having a photoconductive layer with a relatively high dark resistivity for use in general electrophotography cannot be used for the purpose of the present invention.

The following relation holds between the resistivity ρ (ohm-cm) and current density J (A/cm$^2$) of the photoelectric sensor:

$$\rho=(E\cdot d/J\cdot S)\times(S/d)=E/J$$

where d is the layer thickness of the photoelectric sensor,
S is the electrode area, and
E is the applied field intensity (V/cm)

Therefore, the resistivity can be obtained from the applied field intensity and the current density. In Examples of the present invention, it is expressed by the current density.

When the information recording layer of the information recording medium is a polymer dispersed liquid crystal in particular, the sensitivity of the photoelectric sensor must be set in the operating voltage region of the liquid crystal. That is, the contrast voltage, which is a difference between the potential (light potential) applied to the information recording medium at the exposed region and the potential (dark potential) applied to the information recording medium at the unexposed region, must be set at a predetermined level in the operating voltage region of the liquid crystal in the information recording medium.

Therefore, the dark potential that is applied to the liquid crystal layer at the unexposed region of the photoelectric sensor, for example, must be set at a level approximately equal to the operation initiating potential of the liquid crystal. Accordingly, the photoelectric sensor is required to have a conductivity at which a base current in the range of $10^{-4}$ A/cm$^2$ to $10^{-7}$ A/cm$^2$, preferably in the range of $10^{-5}$ A/cm$^2$ to $10^{-6}$ A/cm$^2$, is generated under the condition where the resistivity of the information recording medium is in the range of $10^{10}$ ohm-cm to $10^{13}$ ohm-cm and an electric field of $10^5$ V/cm to $10^6$ V/cm is given to the photoelectric sensor. With a photoelectric sensor in which the base current is less than $10^{-7}$ A/cm$^2$, the molecules in the liquid crystal phase are not aligned even if exposure light is applied. With a photoelectric sensor in which the base current exceeds $10^{-4}$ A/cm$^2$, a large current flows at the same time as the voltage application is initiated even if no exposure light is applied, causing the molecules of the liquid crystal to be aligned. Therefore, even if exposure is carried out, no transmittance difference can be obtained between the exposed and unexposed regions. In addition, since the operating voltage and its range differ among liquid crystals, when the level of applied voltage and voltage application time are to be set, it is preferable to properly set the voltage distribution in the information recording medium.

Since the overall electrical conductivity of the photoelectric sensor can be controlled by providing the photo-induced current amplifying layer, it is possible to obtain a photoelectric sensor conformable to the operating voltage and range of a liquid crystal medium used. Accordingly, the recording image density can be set within a predetermined range, and stable light information recording can be effected.

Although the reason is not clear, it is considered that in the photoelectric sensor of the present invention a relatively large amount of injection current flows, and the amount of charge carrier injected is largely limited by the injection from the electrode into the photoconductive layer. Thus, the condition of the interface between the electrode and the photoconductive layer is important. In the photoelectric sensor of the present invention, an extremely thin photo-induced current amplifying layer is provided between the electrode and the photoconductive layer so that the injection of charge carriers is effected through the photo-induced current amplifying layer. Accordingly, by properly providing the photo-induced current amplifying layer, it is possible to control the amount of charge carrier injected from the electrode into the photoconductive layer through the photo-induced current amplifying layer. Thus, the overall electrical conductivity of the photoelectric sensor can be set at a predetermined level.

Next, the injection uniforming action, which is the second action of the injection current stabilizing action in the photoelectric sensor of the present invention, will be explained.

Since the photoelectric sensor of the present invention has high resolution and high sensitivity, unevenness of sensitivity or noise which gives rise to no problem in an ordinary photosensitive member may be undesirably recorded on an information recording medium as a noticeable defect, causing a serious problem in terms of the image quality. It is possible in the present invention to minimize the sensitivity unevenness and the image noise by providing a photo-induced current amplifying layer between the electrode and photoconductive layer of the photoelectric sensor.

Although the reason is not clear, it is considered that when the photoconductive layer is stacked directly on the electrode, partial or local nonuniformity may be produced in the condition of contact between the electrode and the photoconductive layer for some reason, and such nonuniformity reflects unevenness or noise on the image finally obtained. However, by providing a photo-induced current amplifying layer between the electrode and the photoconductive layer, the problem of nonuniform contact between the electrode and the photoconductive layer is solved. As a result, it is possible to uniformly inject charge carriers from the electrode into the photoconductive layer through the photo-induced current amplifying layer. Thus, image unevenness and image noise can be reduced to a considerable extent.

Next, measurement of thermally stimulated current will be explained.

Although the reason is not clear, it is considered that charge trap sites are present in the photoelectric sensor of the present invention, which trap and accumulate part of photo-induced charge carriers with time, as has been described above, and that since a certain amount of charge has already been trapped in the charge trap sites for some reason before photo-induced current amplification is performed, it is possible to measure a thermally stimulated current.

Figure 14:
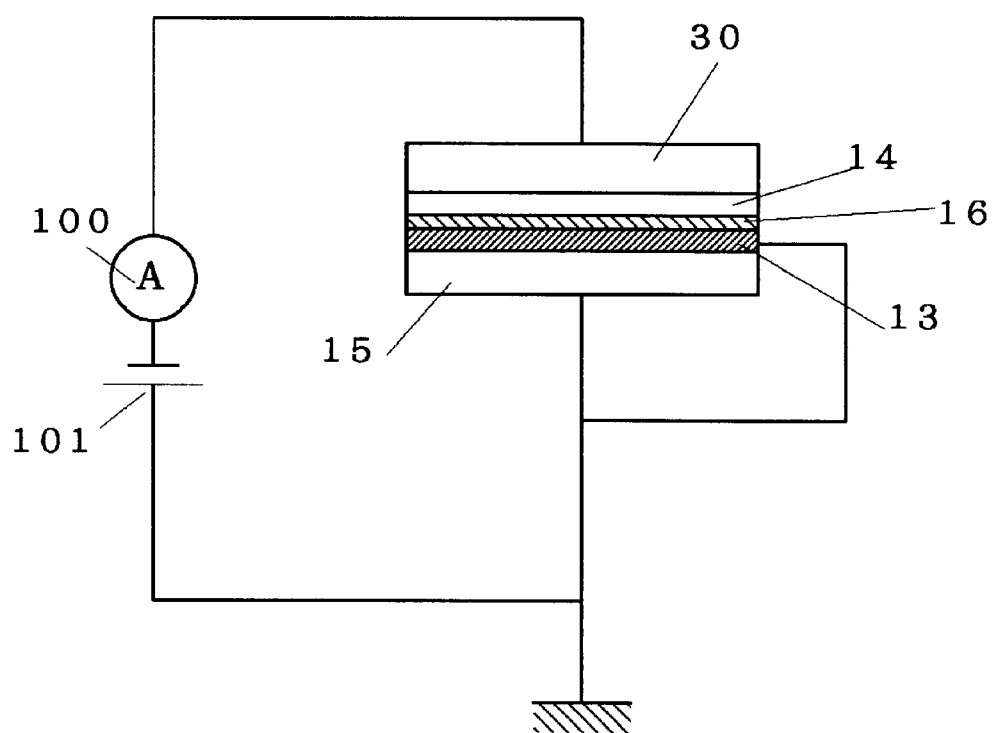
FIG. 14 illustrates a current measuring device used to measure thermally stimulated current.

The thermally stimulated current in the photoelectric sensor of the present invention is measured as follows: A sample for measurement is prepared by depositing a gold electrode having a film thickness of 30 nm, a sheet resistivity of 1,000 ohm/sq., and a size of 0.16 cm$^2$ on the photoconductive layer, and the thermally stimulated current is measured with a short-circuit thermally stimulated current measuring device (manufactured by Toyo Seiki K.K.), as shown in FIG. 14. A DC voltage of 1.5 V/$\mu$m is applied between the photoelectric sensor electrode as a positive electrode and the gold electrode as a negative electrode, and at the same time, the photoelectric sensor for measurement is heated at a heating rate of 10° C./min. Under these conditions, the current flowing during the heating process is measured with a micro-ammeter.

A photoelectric sensor including a photo-induced current amplifying layer having photo-induced current amplifying action according to the present invention and a photoelectric sensor (comparative sensor) having no photo-induced current amplifying layer will be explained below by use of the results of measurement carried out using the above-described measuring device.

Figure 15:
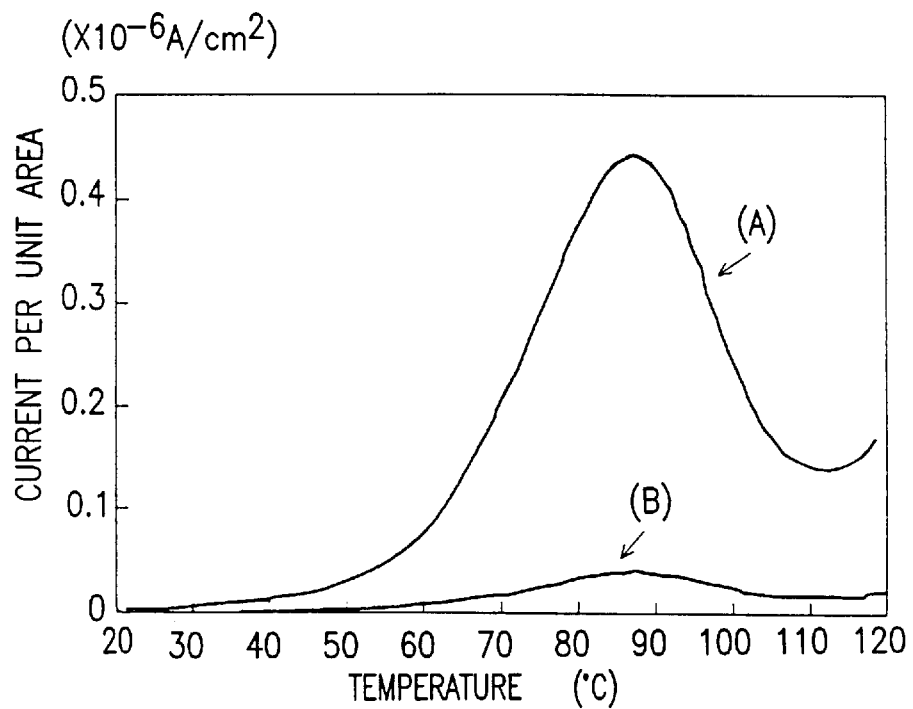
FIG. 15 is a graph showing the results of measurement of thermally stimulated current.

The results of the measurement are shown in FIG. 15. In the graph of FIG. 15, the axis of abscissas represents the heating temperature (°C.), and the axis of ordinates represents the current density value ($10^{-6}$ A/cm$^2$). As shown by the line A, in the photoelectric sensor having the photo-induced current amplifying layer according to the present invention, a clear peaked waveform is observed besides the base current in the temperature range of 50° C. to 110° C., and a peak appears in the vicinity of 88° C. At the peak, a current value of $4.4 \times 10^{-7}$ A/cm$^2$ was obtained. On the other hand, in the comparative sensor having no photo-induced current amplifying layer, a peaked waveform is observed besides the base current in the temperature range of 50° C. to 110° C., as shown by the line B, in the same way as in the photoelectric sensor of the present invention, but the peak is exceedingly small. The current density at the peak in the vicinity of 88° C. was also exceedingly low, i.e., $4.5 \times 10^{-8}$ A/cm$^2$.

The very small current that is observed in the measurement of the thermally stimulated current is considered to be attributable to the charge trapped in the charge trap sites present in the photoelectric sensor. That is, the trapped charge itself or charge that is induced by the trapped charge is stimulated by heating to move inside or outside the photoelectric sensor. Thus, a very small current is induced to flow through the external circuit by the movement of the charge.

Although the reason is not clear, it is considered that the photoelectric sensor having photo-induced current amplifying action according to the present invention has many charge trap sites that trap and accumulate part of photo-induced charge carriers with time, as described above, and that a certain amount of charge produced for some reason has already been trapped in the trap sites before photo-induced current amplification is performed, and the trapped charge itself or charge that is induced by the trapped charge is stimulated by heating to move inside or outside the photoelectric sensor. Thus, a very small current is induced to flow through the external circuit by the movement of the charge, and it is therefore possible to measure the thermally stimulated current.

As the photo-induced current amplifying action intensifies, the current value observed in the measurement of the thermally stimulated current tends to becomes larger. It is necessary for the photoelectric sensor of the present invention that when measurement of the thermally stimulated current is carried out at a bias voltage of 1.5 V/$\mu$m, clear peak should be observed in the temperature range of 50° C. to 110° C., and the current density at the peak should be not lower than $5\times10^{-8}$ A/cm$^2$.

Figure 1:
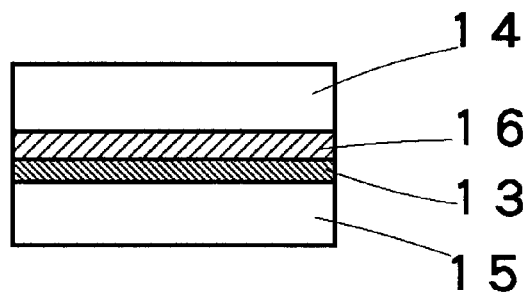
FIG. 1 is a sectional view for explanation of a single-layer photoelectric sensor of the present invention.

The following is a description of a single-layer photoelectric sensor of the present invention in which the photoconductive layer of the photoelectric sensor comprises a single layer. FIG. 1 is a sectional view for explanation of the single-layer photoelectric sensor, in which reference numeral 13 denotes an electrode, 16 a photo-induced current amplifying layer, 14 a photoconductive layer, and 15 a substrate.

The photoconductive layer 14 is formed of an inorganic or organic photoconductive substance. Examples of inorganic photoconductive substances include Se, Se—Te, ZnO, TiO$_2$, Si, CdS, etc. These substances may be used alone or in the form of a combination of two or more of them. Such an inorganic photoconductive material is stacked on the electrode to a layer thickness of 1 μm to 30 μm, preferably 3 μm to 20 μm, by vapor deposition, sputtering, CVD, etc. It is also possible to use an inorganic photoconductive substance in the form of finely divided particles dispersed in a binder. Examples of binders usable in the present invention include a silicone resin, a polycarbonate resin, a polyvinyl formal resin, a polyvinyl acetal resin, a polyvinyl butyral resin, a styrene resin, a styrene-butadiene copolymer resin, an epoxy resin, an acrylic resin, a saturated or unsaturated polyester resin, a methacrylic resin, a vinyl chloride resin, a vinyl acetate resin, a vinyl chloride-vinyl acetate copolymer resin, etc. These binder resins may be used alone or in the form of a combination of two or more of them. It is preferable to disperse 0.1 to 10 parts by weight, preferably 1 to 5 parts by weight, of finely divided photoconductive particles in 1 part by weight of a binder resin material.

Organic photoconductive substances include dispersions of high- and low-molecular photoconductive substances in an insulating binder. Examples of high-molecular photoconductive substances are polyvinyl carbazole (PVK), and poly-N-ethylenic unsaturated group-substituted carbazoles in which an ethylenic unsaturated group, e.g., allyl group or acryloxyalkyl group, is contained in place of the vinyl group in PVK. Examples of high-molecular photoconductive substances further include poly-N-ethylenic unsaturated group-substituted phenothiazines, e.g., poly-N-acrylphenothiazine, poly-N-(β-acryloxy)phenothiazine, etc., and polyvinyl pyrene. Among these substances, poly-N-ethylenic unsaturated group-substituted carbazoles, particularly polyvinyl carbazole may preferably be employed.

Examples of low-molecular photoconductive substances are oxadiazoles substituted by alkylaminophenyl group or the like, a triphenylmethane derivative, a hydrazone derivative, a butadiene derivative, a stilbene derivative, etc. It is also possible to form the photoconductive layer by using a charge generating substance and a charge transport substance, which are employed in a double-layered photoelectric sensor. In such a case, the charge generating and transport substances may be mixed in the ratio of from 1:1 to 1:10, preferably from 1:2 to 1:5.

An organic photoconductive layer having film-forming properties may be formed by dispersing 0.1 to 10 parts by weight, preferably 0.1 to 1 part by weight, of an electrically insulating resin material in 1 part by weight of one selected from among the above organic photoconductive substances. An organic photoconductive layer produced by any of the above-described methods is formed on the electrode so that the dry film thickness is in the range of 1 μm to 50 μm, preferably in the range of 3 μm to 20 μm. Within the film thickness range, the photoelectric sensor exhibits excellent sensitivity and image quality.

Figure 2:
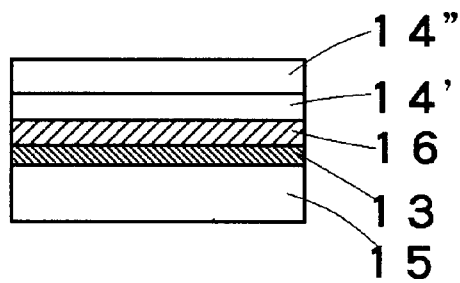
FIG. 2 is a sectional view for explanation of a double-layered photoelectric sensor of the present invention.

Next, a double-layered photoelectric sensor will be explained. FIG. 2 is a sectional view for explanation of the double-layered photoelectric sensor, in which reference numeral 13 denotes an electrode, 16 a photo-induced current amplifying layer, 14' a charge generation layer, 14" a charge transport layer, and 15 a substrate.

As illustrated in the figure, the double-layered photoelectric sensor has a photo-induced current amplifying layer, a charge generation layer and a charge transport layer, which are successively formed on the electrode. This type of photoelectric sensor includes an inorganic material photoelectric sensor and an organic material photoelectric sensor.

The charge generation layer 14' in the inorganic material photoelectric sensor is formed on the electrode to a thickness of 0.05 μm to 1 μm by vapor deposition, sputtering, CVD, etc. using a material such as Se—Te or Si doped with sulfur or oxygen, for example.

Next, a charge transport layer is formed on the charge generation layer to a thickness of 1 μm to 50 μm, preferably 3 μm to 20 μm, in the same way as the above using a material such as Se, As$_2$Se$_3$, Si, or Si doped with methane, for example.

The charge generation layer 14' in the organic material photoelectric sensor is composed of a charge generating substance and a binder. Examples of charge generating substances usable in the present invention are cationic dyes, e.g., pyrylium dyes, thiapyrylium dyes, azulenium dyes, cyanine dyes, azulenium salt dye, etc., squalium salt dyes, phthalocyanine pigments, perylene pigments, polycyclic quinone pigments, e.g., pyranthrone pigments, etc., indigo pigments, quinacridone pigments, pyrrole pigments, and azo pigments, which are shown below. The dyes and pigments may be used alone or in the form of a combination of two or more of them.

① Pyrylium dye

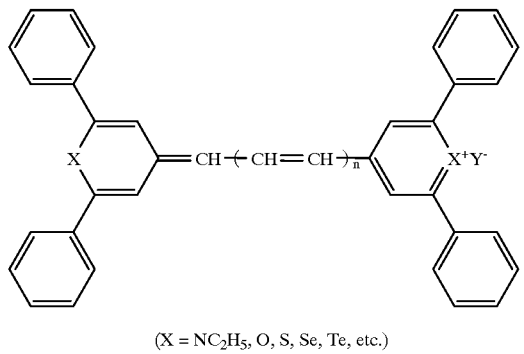

(X = NC$_2$H$_5$, O, S, Se, Te, etc.)

② Thiapyrylium dye

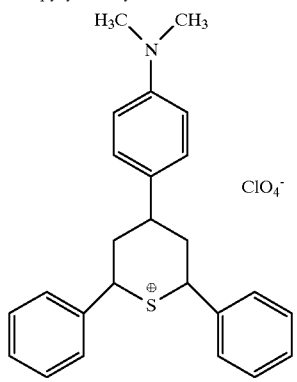

③ Azulenium dye

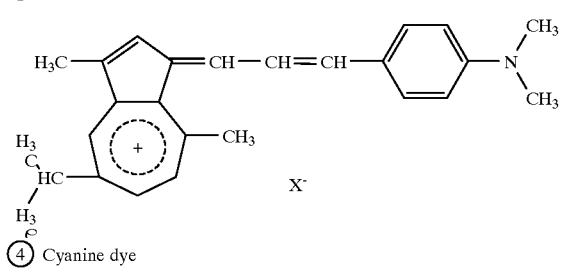

④ Cyanine dye

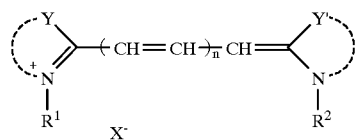

Y, Y' = O, S, Se, NH, CH=CH, C(CH$_3$)$_2$
R$^1$, R$^2$ = CH$_3$, C$_2$H$_5$, CH$_2$CH$_2$SO$_3^-$

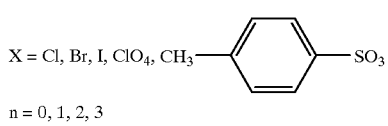

n = 0, 1, 2, 3

⑥ Azulenium salt

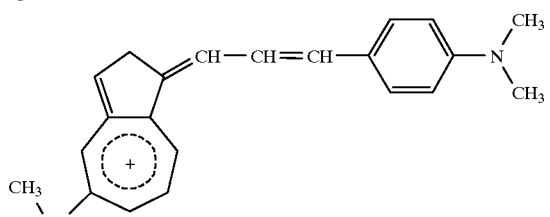

⑦ Squalium salt

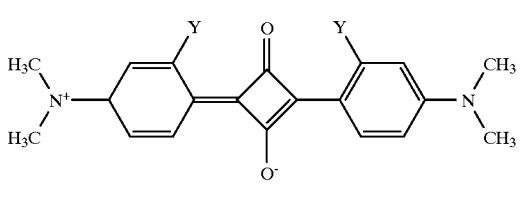

Y = H, OH, CH$_3$

⑧ Phthalocyanine pigment

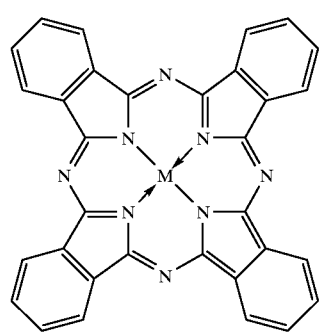

M = Cu, Mg, etc.

⑨ Perylene pigment

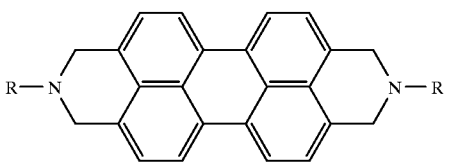

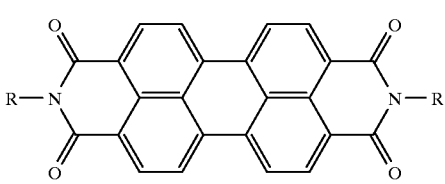

R = CH$_3$, 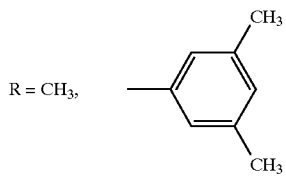

⑪ Polycyclic quinone pigment

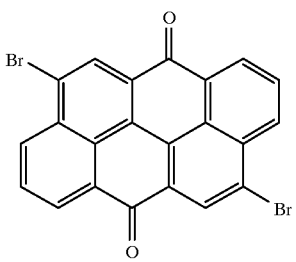

⑫ Indigo pigment

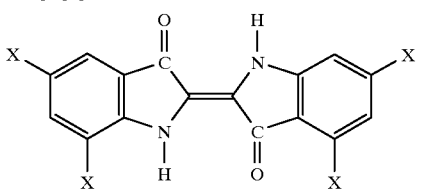

X = H, Cl, Br

⑬ Quinacridone pigment

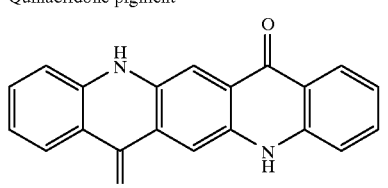

⑭ Pyrrole pigment

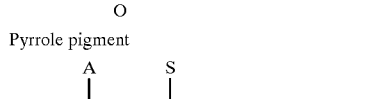

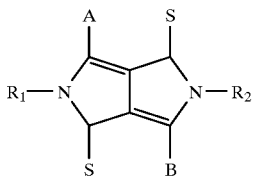

A, B = alkyl group, aralkyl group, cycloalkyl group, carbocyclic or heterocyclic aromatic ring R$_1$, R$_2$ = hydrogen atom, or substituent ring not imparting water-solubility In addition, many azo pigments are usable. The chemical structure of particularly preferable azo pigments may be expressed by the central skeleton A and the coupler portion Cp as follows:

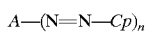

Specific examples of A are as follows:

A1
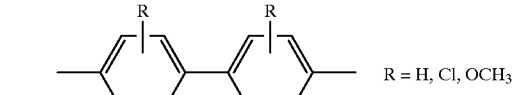
R = H, Cl, OCH₃

A2
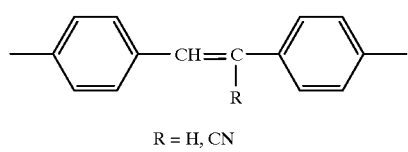
R = H, CN

A3
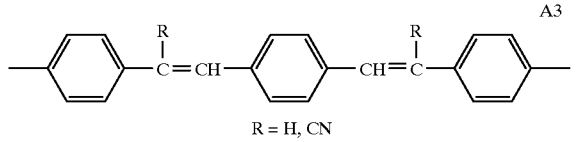
R = H, CN

A4
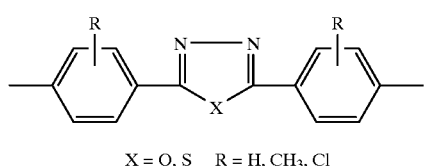
X = O, S    R = H, CH₃, Cl

A5
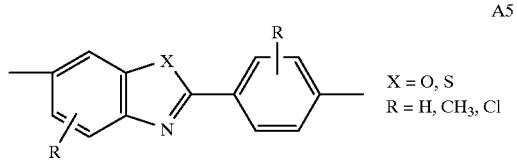
X = O, S
R = H, CH₃, Cl

A6
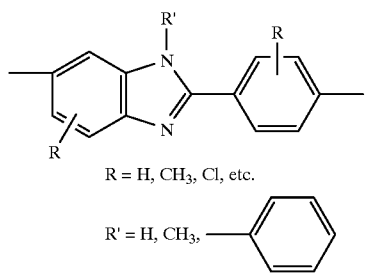
R = H, CH₃, Cl, etc.
R' = H, CH₃,

A7
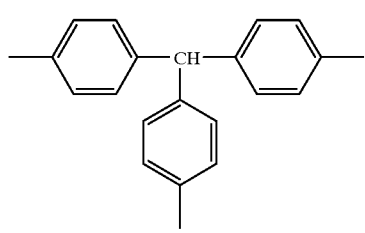

A8
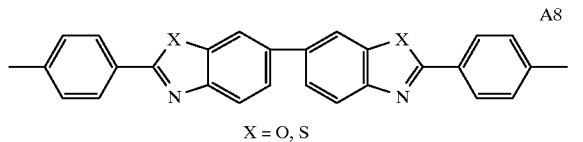
X = O, S

A9
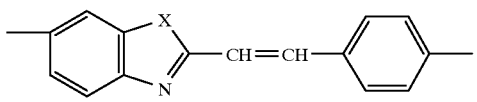
X = O, S

A10
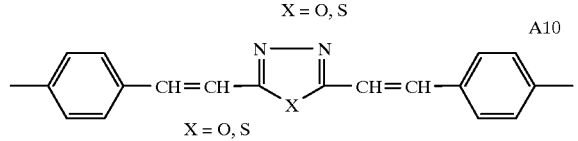
X = O, S

A11
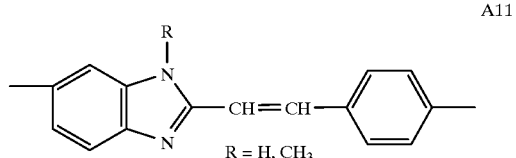
R = H, CH₃

A12
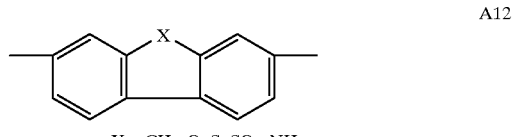
X = CH₂, O, S, SO₂, NH

A13
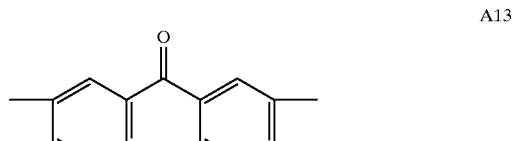

A14
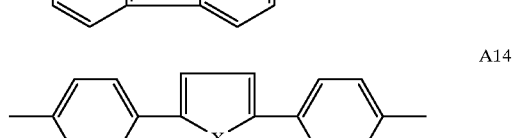
X = O, S

A-15
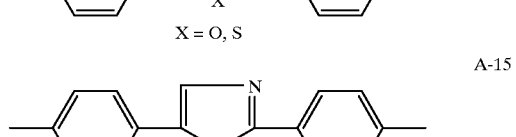

A16
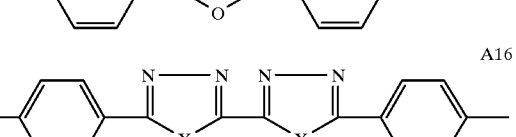
X = O, S

A17
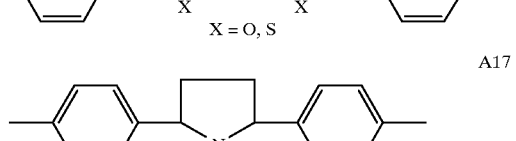
C₂H₅

A18
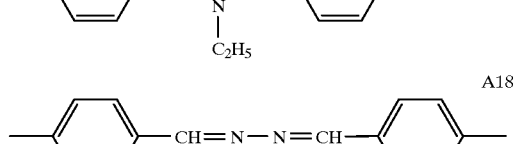

A19
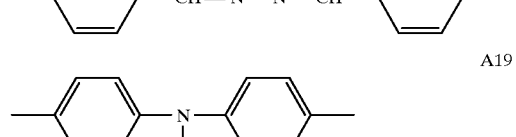

A20
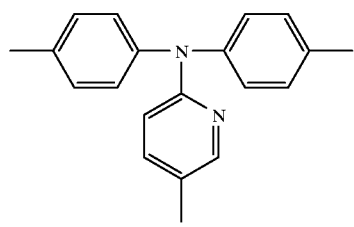
A21
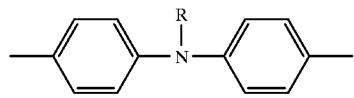
R = H, CH₃
A22
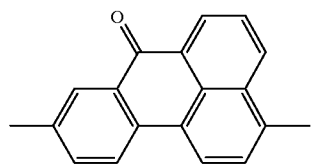
A23
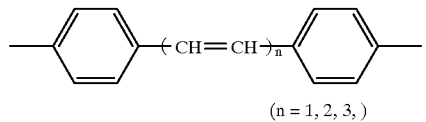
(n = 1, 2, 3, )
A24
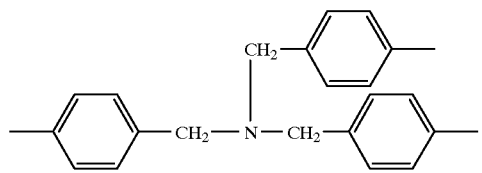
A25
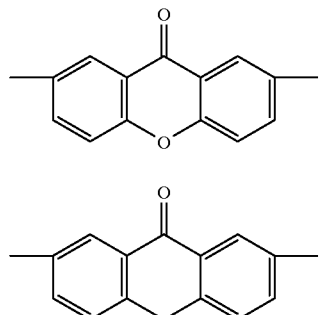
A26
A27
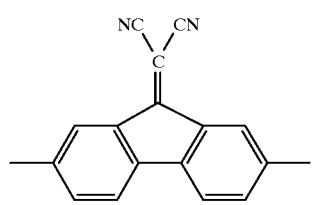
A28
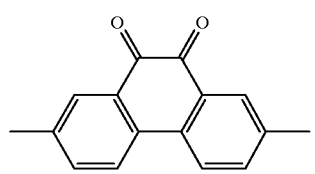
A29
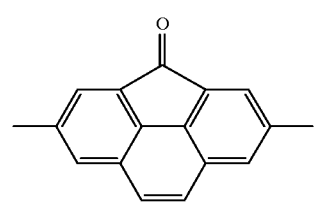
specific examples of Cp are as follows:
Cp-1
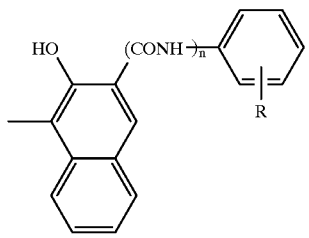
R = H, halogen atom, alkoxy group, alkyl group, nitro group, etc.
n = 1 or 2
Cp-2
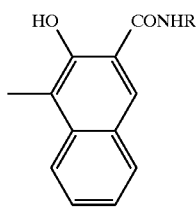
R = CH₃, C₂H₅, C₃H₇
Cp-3
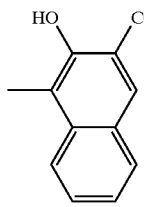
R = alkyl group,
R' = hydrogen atom, halogen atom alkoxy group, alkyl group, nitro group
Cp-4
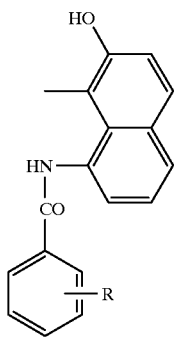
R = hydrogen atom, halogen atom alkoxyalkyl group, nitro group -continued Cp-5
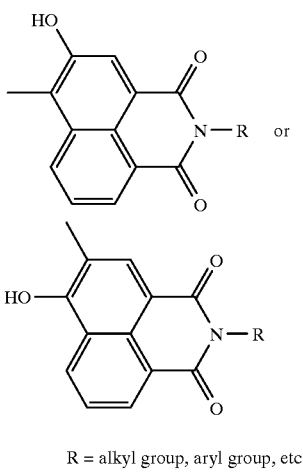
R = alkyl group, aryl group, etc.

Cp-6
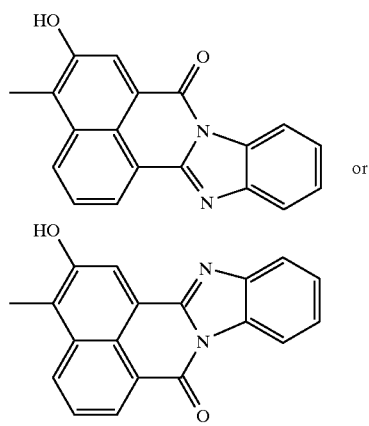

Cp-7
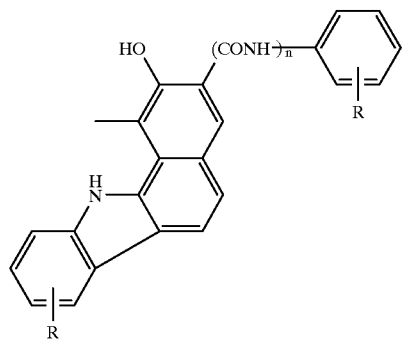
R = hydrogen atom, halogen atom, alkoxyl group
alkyl group, nitro group, alkyl amino group, etc.

n = 1 or 2

By properly combining the above central skeleton A and coupler Cp, an azo dye suitable for use as a charge generating substance can be obtained.

Examples of binders usable in the present invention are a silicone resin, a polycarbonate resin, a polyvinyl formal resin, a polyvinyl acetal resin, a polyvinyl butyral resin, a styrene resin, a styrene-butadiene copolymer resin, an epoxy resin, an acrylic resin, a saturated or unsaturated polyester resin, a methacrylic resin, a vinyl chloride resin, a vinyl acetate resin, a vinyl chloride-vinyl acetate copolymer resin, etc. These binder resins may be used alone or in the form of a combination of two or more of them.

It is preferable to mix 0.1 to 10 parts by weight, preferably 0.2 to 1 part by weight, of a binder with 1 part of a charge generating substance. The dry film thickness of the charge generation layer is in the range of 0.01 $\mu$m to 2 $\mu$m, preferably in the range of 0.1 $\mu$m to 0.5 $\mu$m. Within this thickness range, the photoelectric sensor exhibits excellent sensitivity and image quality.

Among the above-mentioned charge generating substances, those which enable film formation by vapor deposition can be used alone without a binder.

The charge transport layer 14" is composed of a charge transport substance and a binder. The charge transport substance is a substance having excellent properties to transport electric charge generated in the charge generation layer. Examples of charge transport substances usable in the present invention are oxadiazole, oxazole, triazole, thiazole, triphenylmethane, styryl, pyrazoline, hydrazone, aromatic amine, carbazole, polyvinyl carbazole, stilbene, enamine, azine, triphenylamine and butadiene compounds, polycyclic aromatic compounds, and stilbene dimers. The charge transport substance must have excellent hole transport properties.

As for the binder, it is possible to use the same binders as those mentioned for the charge generation layer, and in addition, a polyarylate resin and a phenoxy resin can be used for the binder. Preferable examples of binders are a styrene resin, a styrene-butadiene copolymer resin, and a polycarbonate resin. It is preferable to use 0.1 to 10 parts by weight, preferably 0.1 to 1 part by weight, of a binder per part by weight of a charge transport substance. The dry film thickness of the charge transport layer is in the range of 1 $\mu$m to 50 $\mu$m, preferably in the range of 3 $\mu$m to 20 $\mu$m. With such a film thickness, excellent sensitivity and image quality can be obtained.

Among the above-mentioned charge transport substances, those which enable film formation by vapor deposition can be used alone without a binder.

The electrode 13 needs to be transparent if the information recording medium (described later) is opaque. However, if the information recording medium is transparent, the electrode 13 may be either transparent or opaque. Any material which stably gives a resistivity of not higher than $10^6$ ohm-cm can be used for the electrode 13. Examples of such material are a thin metallic conductive film, e.g., gold, platinum, zinc, titanium, copper, iron, tin, etc., a metallic oxide conductive film, e.g., tin oxide, indium oxide, zinc oxide, titanium oxide, tungsten oxide, vanadium oxide, etc., and an organic conductive film, e.g., quaternary ammonium salt, and so forth. These materials may be used alone or in the form of a composite material comprising two or more of them. Among these materials, oxide conductors are preferable; indium-tin oxide compound (ITO) is particularly preferable.

The electrode 13 is formed by vapor deposition, sputtering, CVD, coating, plating, dipping, electrolytic polymerization, etc. The film thickness of the electrode needs to be changed depending upon the electrical characteristics of the material thereof and the level of voltage applied during information recording. For example, the thickness is about from 10 nm to 300 nm in the case of an ITO film. The electrode 13 may be formed either on the whole area between the substrate and the information recording layer or in conformity with a desired pattern. The electrode 13 may also be formed by stacking two or more different kinds of material.

The substrate 15 needs to be transparent if the information recording medium (described later) is opaque. However, if the information recording medium is transparent, the substrate 15 may be either transparent or opaque. The substrate 15 has the shape of card, film, tape, disk or the like and supports the photoelectric sensor so as to provide the required strength. Accordingly, the substrate 15 need not be provided if the photoelectric sensor itself has supporting properties, and various materials are usable, provided that they are sufficiently strong to support the photoelectric sensor. Examples of usable materials are a flexible plastic film, or a rigid material such as glass, plastic sheet, card, etc. made of polyethylene, polypropylene, polyethylene terephthalate, polymethyl methacrylate, polymethyl acrylate, polyester, polycarbonate, etc.

It should be noted that if the electrode 13 is transparent, anti-reflection properties are preferably imparted to the substrate by stacking a layer having anti-reflection effect on the surface of the substrate 15 which is remote from the electrode 13, or by adjusting the film thickness of the transparent substrate to a level at which anti-reflection effect is obtainable, or by combining together these two measures, according to need.

The photoconductive layer may contain additives such as an electron accepting substance, an electron donating substance, a sensitizing dye, an antioxidizing agent, an ultraviolet absorbing agent, a light stabilizer, etc. Electron accepting substances and sensitizing dyes have functions to adjust and stabilize the base current and to attain sensitization.

Examples of electron accepting substances include nitro-substituted benzenes, amino-substituted benzenes, halogen-substituted benzenes, substituted naphthalenes, benzoquinones, nitro-substituted fluorenones, chloranils, and the compounds enumerated above as examples of charge transport substances. Examples of sensitizing dyes are a triphenylmethane dye, a pyrylium salt dye, a xanthene dye, and a leuco dye.

Examples of antioxidizing agents are phenol-, sulfur- and phosphorus-containing antioxidizing agents. Examples of ultraviolet absorbing agents are salicyclic acid-, benzophenone-, benzotriazole- and cyanoacrylate-containing ultraviolet light absorbing agents. Examples of light stabilizers are ultraviolet light stabilizers, hindered amine light stabilizers, etc.

An electron accepting substance and a sensitizing dye are each added in the ratio of 0.001 to 10 parts by weight, preferably 0.01 to 1 part by weight, to 1 part by weight of a photoconductive substance. If the lower limit of the above range, i.e., 0.001 part by weight, is not reached, the desired action cannot be obtained. If the upper limit of the above range, i.e., 10 parts by weight, is exceeded, an adverse effect is made on the image quality.

An antioxidizing agent, an ultraviolet absorbing agent, and a light stabilizer are each added in the ratio of 0.001 to 10 parts by weight, preferably 0.01 to 1 part by weight, to 1 part by weight of a photoconductive substance, alone or in the form of a combination of a plurality of agents. If the lower limit of the above range, i.e., 0.001 part by weight, is not reached, no advantageous effect is obtained from the addition of these substances. If the upper limit of the above range, i.e., 10 parts by weight, is exceeded, an adverse effect is made on the image quality. In the case of a double-layered photoelectric sensor, the above-described substances may be added to each of the charge generation and transport layers in the same ratio. Preferably, these substances are added to the charge generation layer.

The photo-induced current amplifying layer that is used to constitute the photoelectric sensor of the present invention will be explained.

The photo-induced current amplifying layer 16 is provided between the electrode 13 and the photoconductive layer 14 or the charge generation layer 14'. Although the reason is not clear, the photo-induced current amplifying layer 16 has the action of amplifying the photo-induced current in the photoelectric sensor, the action of controlling the injection of charge carriers from the electrode 13 into the photoconductive layer 14 or the charge generation layer 14' to thereby control the voltage actually applied to the information recording medium, and the action of uniforming the injection of charge carriers from the electrode 13 into the photoconductive layer 14 or the charge generation layer 14' to thereby reduce the noise, unevenness and so forth of information recorded on the information recording medium. The first action is effective in improving the recording sensitivity of the photoelectric sensor. The second action is effective in controlling the image density of the recorded image. Further, the third action is effective in improving the image quality of the recorded image.

For the photo-induced current amplifying layer in the present invention, the same binder as that used in the above-described charge generation layer may be used. Examples of binders usable in the present invention include a silicone resin, a polycarbonate resin, a polyvinyl formal resin, a polyvinyl acetal resin, a polyvinyl butyral resin, a styrene resin, a styrene-butadiene copolymer resin, an epoxy resin, an acrylic resin, a saturated or unsaturated polyester resin, a methacrylic resin, a vinyl chloride resin, a vinyl acetate resin, a vinyl chloride-vinyl acetate copolymer resin, etc. These binder resins may be used alone or in the form of a combination of two or more of them. It is also possible to use a soluble polyamide, a phenolic resin, a polyurethane, a polyurea, a casein, a polypeptide, a polyvinyl alcohol, a polyvinyl pyrrolidone, a maleic anhydride ester polymer, a quaternary ammonium salt-containing polymer, a cellulose compound, etc. These binder resins may be used alone or in the form of a combination of two or more of them. Particularly preferable examples are a polyvinyl formal resin, a polyvinyl acetal resin, and a polyvinyl butyral resin.

The thickness of the photo-induced current amplifying layer is set in the range of 0.005 $\mu$m to 5 $\mu$m, preferably in the range of 0.05 $\mu$m to 0.5 $\mu$m. The photo-induced current amplifying layer may be provided by a coating method, e.g., dip coating, roll coating, spin coating, etc. If the thickness is less than 0.005 $\mu$m, no image noise reducing action is available. If the thickness is greater than 5 $\mu$m, the resulting layer will hinder the injection of charge carriers from the electrode into the charge generation layer.

Further, various kinds of electron accepting substance, electron donating substance, photoconductive substance, inorganic salt and organic salt may be added to the photo-induced current amplifying layer according to need. These additives may be used alone or in the form of a combination of two or more of them.

Examples of electron accepting substances include substituted benzenes represented by 1,3-dinitrobenzene, substituted naphthalenes, substituted or non-substituted benzoquinones represented by p-benzoquinone, 2,5-dichloro-p-benzoquinone, and 2,3-dichloro-5,6-dicyano-p-benzoquinone, substituted and non-substituted naphthoquinones, substituted and non-substituted anthraquinones, substituted fluorenones represented by 2,4,7-trinitrofluorenone and 2,4,5,7-tetranitrofluorenone, chloranils represented by p-chloranil and o-chloranil, and substituted quinodimethans represented by 7,7,8,8-tetracyanoquinodimethan.

Examples of usable photoconductive substances include inorganic and organic photoconductive substances mentioned above for the single-layer photoelectric sensor and charge generating substances mentioned above for the double-layered photoelectric sensor. Examples of inorganic photoconductive substances are Se, Se—Te, ZnO, $TiO_2$, Si, Si doped with sulfur, oxygen or the like, CdS, etc. These inorganic photoconductive substances may be used in the form of finely divided particles alone or in a combination of two or more of them. Organic photoconductive substances include high- and low-molecular photoconductive substances. Examples of high-molecular photoconductive substances are polyvinyl carbazole (PVK), and poly-N-ethylenic unsaturated group-substituted carbazoles in which an ethylenic unsaturated group, e.g., allyl group or acryloxyalkyl group, is contained in place of the vinyl group in PVK. Examples of high-molecular photoconductive substances further include poly-N-ethylenic unsaturated group-substituted phenothiazines, e.g., poly-N-acrylphenothiazine, poly-N-($\beta$-acryloxy)phenothiazine, etc., and polyvinyl pyrene.

Examples of low-molecular photoconductive substances are oxadiazoles substituted by alkylaminophenyl group or the like, a triphenylmethane derivative, a hydrazone derivative, a butadiene derivative, a stilbene derivative, etc.

Examples of charge generating substances usable in the present invention are cationic dyes, e.g., pyrylium dyes, thiapyrylium dyes, azulenium dyes, cyanine dyes, azulenium salt dye, etc., squalium salt dyes, phthalocyanine pigments, perylene pigments, polycyclic quinone pigments, e.g., pyranthrone pigments, etc., indigo pigments, quinacridone pigments, pyrrole pigments, and azo pigments. The dyes and pigments may be used alone or in the form of a combination of two or more of them.

Examples of inorganic and organic salts usable in the present invention are perchlorates, borofluorates, thiocyanates, nitrates, carboxylates, sulfonates, and halides, which have as cationic species metallic ions such as lithium, sodium, potassium, magnesium, calcium, or aluminum, quaternary ammonium ions, organic ions, etc.

These additives are added in the ratio of 0.001 to 10 parts by weight, preferably 0.05 to 5 parts by weight, to 1 part by weight of a binder resin. The additives may be used alone or in the form of a combination of two or more of them. It is particularly preferable to use a combination of an electron accepting compound and an organic photoconductive pigment, e.g., a substituted benzoquinone and an azo pigment. With such a combination, particularly great amplifying action is obtained.

Next, the information recording medium 2 will be explained. There is a case where the information recording medium used in the present invention has an information recording layer formed of a polymer dispersed liquid crystal.

The polymer dispersed liquid crystal has a structure in which resin particles are dispersed in a liquid crystal phase. Examples of usable liquid crystal materials are a smectic liquid crystal, nematic liquid crystal, cholesteric liquid crystal and a mixture of these liquid crystals. However, it is preferable to use a smectic liquid crystal from the point of view of retaining the liquid crystal alignment and holding the recorded information permanently, that is, from the viewpoint of memory effect.

Examples of smectic liquid crystals usable in the present invention are as follows: cyanobiphenyl, cyanoterphenyl and phenylester liquid crystals, in which the end group of a liquid crystalline substance has a long carbon chain; liquid crystal substances that present smectic A phase, e.g., fluorine liquid crystal; liquid crystal substances presenting smectic C phase, which are used as ferroelectric liquid crystals; and liquid crystal substances that present smectic H, G, E or F phase.

Examples of materials which are preferable to use for forming the resin phase are ultraviolet curing resin materials which are compatible with a liquid crystal material or a common solvent therewith in the form of a monomer or an oligomer. Examples of such ultraviolet curing resin materials are acrylic and methacrylic esters. It is also possible to use thermosetting resin materials which are compatible with a solvent common to the liquid crystal material, for example, an acrylic resin, methacrylic resin, polyester resin, polystyrene resin, copolymers composed mainly of these resin materials, epoxy resin, silicone resin, etc.

It is preferable to use a liquid crystal and a resin material in such a ratio that the liquid crystal content in the information recording layer is 10% to 90% by weight, more preferably 40% to 80% by weight. If the liquid crystal content is less than 10% by weight, light transmittance is low even when the molecules in the liquid crystal phase are aligned by recording of information, whereas, if the liquid crystal content exceeds 90% by weight, the liquid crystal oozes out, causing unevenness of the recorded information.

Since the thickness of the information recording layer influences the definition of recorded information, it is preferable to set the thickness of the layer after it has been dried in the range of 0.1 $\mu$m to 10 $\mu$m, more preferably 3 $\mu$m to 8 $\mu$m. By doing so, the operating voltage can be lowered with the definition maintained at high level. If the information recording layer is excessively thin, the contrast of the information recording part becomes low, whereas, if the layer is excessively thick, the operating voltage becomes high.

Figure 3:
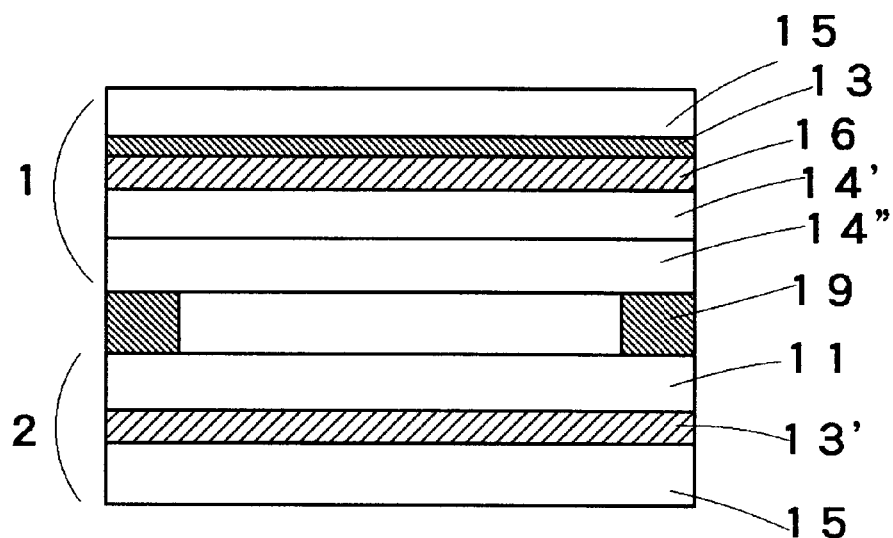
FIG. 3 is a sectional view for explanation of a first information recording system of the present invention.

The information recording medium is disposed to face the photoelectric sensor across a spacer 19 made of an insulating resin film such as polyimide, as shown in FIG. 3, and the electrodes 13 and 13' are connected to each other through a voltage source V, thereby forming a first information recording system of the present invention. At least one of the electrodes 13 and 13' in this system must be transparent.

Figure 4:
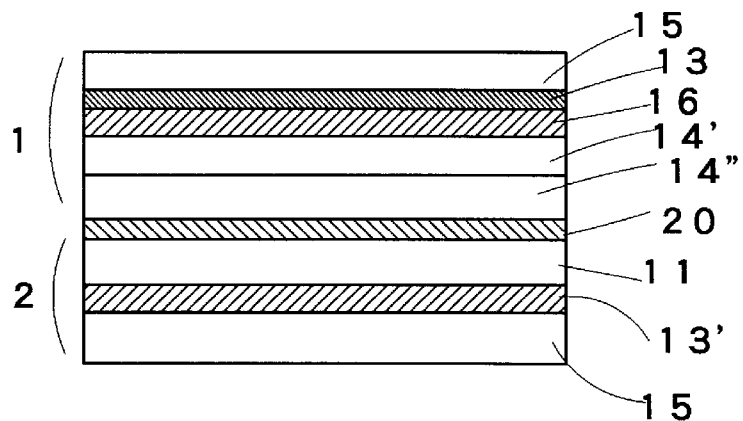
FIG. 4 is a sectional view for explanation of a second information recording system of the present invention.

Next, the second information recording system will be explained. FIG. 4 is a sectional view of the second information recording system according to the present invention, in which reference numeral 20 denotes a dielectric layer, and the same reference numerals as those in FIG. 3 denote the same contents.

The second information recording system is arranged such that the photoelectric sensor and the information recording medium in the first information recording system are disposed to face each other across a dielectric layer 20 without an air gap. The second information recording system is particularly suitable for an arrangement in which the photoconductive layer of the photoelectric sensor is formed by coating using a solvent. The arrangement of the second information recording system makes it possible to prevent unevenness of the recorded image which might otherwise be caused by elution of the liquid crystal from the information recording layer by the interaction between the photoconductive layer and the information recording layer if the latter is coated directly on the former, or elution of the photoconductive material by a solvent used for forming the information recording layer. It is also possible to integrate the photoelectric sensor and the information recording medium into one unit.

The material for forming the dielectric layer 20 needs to be incompatible with either of the materials for forming the photoconductive layer and the information recording layer and must not have electrical conductivity. If the material is electrically conductive, the space charge is diffused, causing deterioration of the resolution. Therefore, insulating properties are required. However, since the dielectric layer lowers the distributed voltage that is applied to the liquid crystal layer or degrades the definition, it is preferable for the layer thickness to be as small as possible, preferably 2 µm or less. On the other hand, reduction in the layer thickness gives rise to not only generation of image noise due to the interaction that progresses with the passage of time but also the problem of permeation due to defects such as pinholes at the time of coating the material for stacking the layer. Since the permeability depends on the proportion of the solid content of the material to be coated for stacking, the kind of solvent used and the viscosity, the layer thickness is properly set in accordance with the material which is to be coated. The layer thickness is preferably 10 µm or less, more preferably in the range of 0.1 µm to 3 µm. When the voltage distribution to each layer is taken into consideration, it is preferable to use a material having a high dielectric constant as well as to minimize the layer thickness.

For example, the dielectric layer is preferably formed by depositing an inorganic material, e.g., $SiO_2$, $TiO_2$, $CeO_2$, $Al_2O_3$, $GeO_2$, $Si_3N_4$, AlN, TiN, $MgF_2$, ZnS, a mixture of silicon dioxide and titanium dioxide, a mixture of zinc sulfide and magnesium fluoride, a mixture of aluminum oxide and germanium, etc., by vapor deposition, sputtering, chemical vapor deposition (CVD), etc. It is also possible to use an aqueous solution of polyvinyl alcohol, water-system polyurethane, water glass, etc. as a water-soluble resin material which is less compatible with an organic solvent and to coat such an aqueous solution by spin coating, blade coating, roll coating and so forth. Further, a coatable fluorocarbon resin may also be used. In such a case, it may be dissolved in a fluorine-containing solvent and coated by spin coating or stacked by blade coating, roll coating, etc.

Coatable fluorocarbon resins which are preferable to use include fluorocarbon resins disclosed, for example, in Japanese Patent Application Laid-Open (KOKAI) No. 04-24722, and organic materials, e.g., poly-para-xylylene, etc., which are subjected to film formation in a vacuum system.

Figure 10:
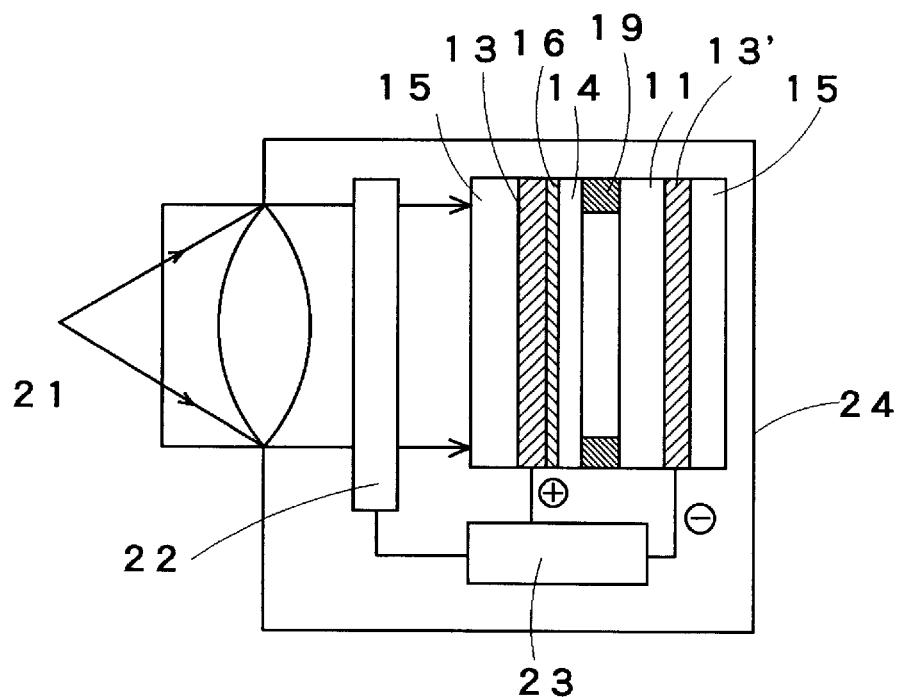
FIG. 10 illustrates an information recording method for the first information recording system of the present invention.

The following is a description of an information recording method for the first and second information recording systems of the present invention. FIG. 10 is a sectional view for explanation of the information recording method for the first information recording system of the present invention. For the second information recording system also, the information recording method is carried out in the same way. In the figure, reference numeral 11 denotes an information recording layer, 13 an electrode of a photoelectric sensor, 13' an electrode of an information recording medium, 16 a photoinduced current amplifying layer, 14 a photoconductive layer, 21 a light source, 22 a shutter having a driving mechanism, 23 a pulse generator serving as a power source, and 24 a camera obscura.

When information light is incident on the information recording system with an appropriate voltage applied between the electrodes 13 and 13' from the pulse generator 23, photocarriers are generated in the photoconductive layer 14 at the region where the light is incident, and the photocarriers move as far as the interface of the photoconductive layer 14 on the side thereof which is closer to the information recording layer 11 by the electric field formed by the two electrodes 13 and 13', causing redistribution of the voltage. As a result, the molecules in the liquid crystal phase in the information recording layer 11 are aligned in the pattern of information light, thereby recording the desired information.

The information recording method of the present invention enables planar analog recording and makes it possible to obtain recording at the liquid crystal particle level and hence high resolution, and it also permits the exposure light pattern to be retained in the form of a visible image by the molecular alignment in the liquid crystal phase.

To record information with the information recording system, a method that uses a camera or a recording method that uses laser may be employed. The recording method by a camera uses an information recording medium in place of a photographic film used in an ordinary camera. Either an optical or electrical shutter can be used for this camera. It is also possible to conduct color photography by using a prism and a color filter by which light information is separated into R, G and B light components and taken out in the form of parallel rays, and forming one frame from three information recording mediums for R, G and B light components or from one set of R, G and B images recorded on different portions of one information recording medium.

In the recording method by laser, argon laser (514 nm, 488 nm), helium-neon laser (633 nm) or semiconductor laser (780 nm, 810 nm, etc.) may be used as a light source. Laser exposure corresponding to an image signal, character signal, code signal or line drawing signal is performed by scanning. Analog recording such as recording of an image is effected by modulating the intensity of laser light, whereas digital recording such as recording of characters, code or line drawing is effected by on/off control of laser light. An image that consists of halftone dots is formed by on/off controlling laser light through a dot generator. It should be noted that the photoconductive layer in the photoelectric sensor need not have panchromatic spectral characteristics, but it is only required to have sensitivity to the wavelength of the laser light source employed.

Figure 11:
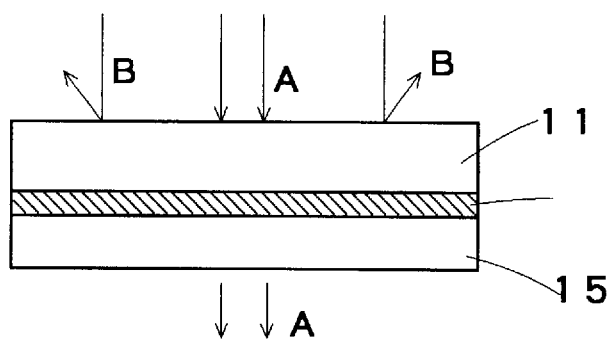
FIG. 11 illustrates an information reproducing method for the first information recording system of the present invention.

The exposure light information recorded on the information recording medium is reproduced by transmitted light, as shown in FIG. 11. In the case of the first information recording system, light is applied to the information recording medium separated from the system, whereas, in the case of the second information recording system, light is applied thereto in this state, without separating the information recording medium. Consequently, in the information recording region, light A is transmitted because the liquid crystal molecules are aligned in the direction of the electric field, whereas, in the region where no information has been recorded, light B is scattered, thus presenting a contrast with the information recording region. The recorded information may be read by reflected light by use of a light-reflecting layer.

For example, in the first information recording system having the stack structure incorporated therein, as shown in FIG. 10, the photoelectric sensor of the present invention and an information recording medium are loaded into an imaging camera (e.g., RB67, manufactured by Mamiya Camera Co., Ltd.) in place of an ordinary photographic film. Then, a DC voltage of 700 V is applied between the respective electrodes of the photoelectric sensor and the information recording medium for 0.04 sec., and at the same time, exposure is carried out by projecting a gray scale from the photoelectric sensor side for 1/30 sec. By doing so, record regions comprising light-transmitting portions corresponding to the gray scale are formed on the information recording layer. Thus, information recording can be effected.

It is also possible to conduct color photography by using prisms and a color filter for the imaging camera. That is, light information is separated into R, G and B light components by the color filter and taken out in the form of parallel rays through the prisms, and one frame is formed from three information recording mediums for R, G and B light components or from one set of R, G and B images recorded on different portions of one information recording medium.

Figure 12:
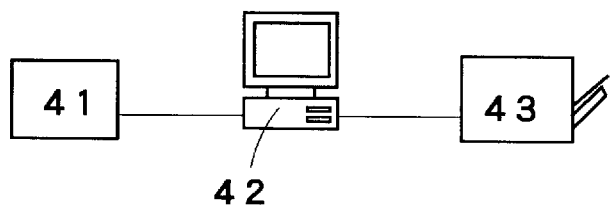
FIG. 12 illustrates one example of an information output system.

Next, the information recorded on the information recording medium is read with an image scanner having a CCD line sensor in an information output system as shown in FIG. 12, and the read information is output by using a sublimation transfer printer (e.g., SP-5500, manufactured by Victor Company of Japan, Limited). As a result, a favorable print corresponding to the gray scale can be obtained.

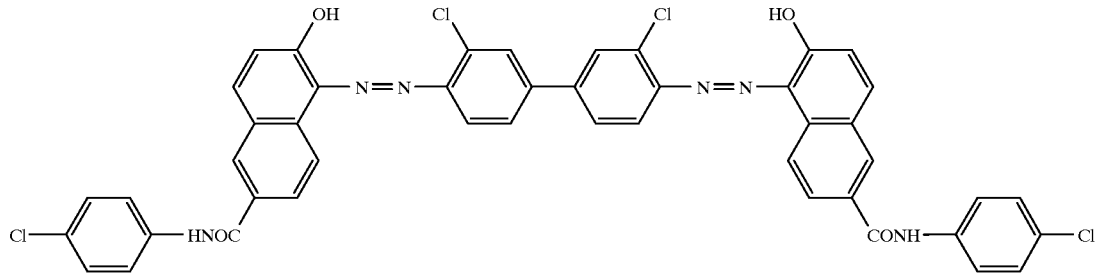

Information that is recorded by the molecular alignment in the liquid crystal is visible information which can be read by visual observation, and it can also be read in the form of an enlarged image by using a projector. When laser scanning or CCD is used, the information can be read with high accuracy. It should be noted that occurrence of scattered light can be prevented by using a Schlieren optical system, if necessary.

In the above-described information recording medium, information recorded by exposure light is made visible by the molecular alignment in the liquid crystal, and the information once made visible can be kept from disappearing by properly selecting a combination of a liquid crystal and a resin material. Thus, memory properties can be imparted to the information recording medium. Since the recorded visible information can be erased by heating the information recording medium to a high temperature near the isotropic phase transition temperature, the information recording medium can be reused.

As the information recording medium in the information recording system, it is also possible to use an electrostatic information recording medium having an electric charge retaining layer as an information recording layer, as described, for example, in Japanese Patent Application Laid-Open (KOKAI) Nos. 03-7942, 05-107775, 05-107776, 05-107777, and 04-70842. In this case, information is stored in the form of electrostatic charge in the information recording medium. Therefore, the electrostatic charge can be reproduced by toner development, or by an electric potential reading method as described, for example, in Japanese Patent Application Laid-Open (KOKAI) No. 01-290366. It is also possible to use an information recording medium having a thermoplastic resin layer as an information recording layer, as described, for example, in Japanese Patent Application Laid-Open (KOKAI) No. 04-46347. In this case, after information has been stored in the form of electrostatic charge on the surface of the information recording medium in the same way as the above, the thermoplastic resin layer is heated to thereby store the information as a frost image, which can be reproduced as visible information.

The present invention will be described below more specifically by way of Examples.

EXAMPLE 1

(Preparation of a coating solution for forming a photo-induced current amplifying layer)

3 parts by weight of a bis-azo pigment having the following structure as a photoconductive substance and 1 part by weight of a polyvinyl formal resin were mixed with 98 parts by weight of 1,4-dioxane and 98 parts by weight of cyclohexanone, and the mixture was thoroughly kneaded by using a mixing machine to obtain a pigment dispersion.

2,3-dichloro-5,6-dicyano-p-benzoquinone having the following structure as an electron accepting substance was added to the pigment dispersion in the ratio of 0.1 mol to 1 mol of the pigment in the dispersion and completely dissolved in the pigment dispersion, thereby obtaining a coating solution for forming a photo-induced current amplifying layer.

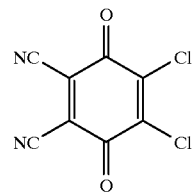

2,3-dichloro-5,6-dicyano-p-benzoquinone (Preparation of a double-layered photoelectric sensor)

On a glass substrate having a thickness of 1.1 mm and thoroughly cleaned, an ITO film having a sheet resistivity of 80 ohm/sq. and a thickness of 100 nm was grown by sputtering to obtain an electrode. The electrode was subjected to a cleaning treatment twice by using a scrubber cleaning machine (Plate Cleaner, Model 602, trade name, manufactured by Ultratech Co., Ltd.). The cleaning treatment was comprised of spraying of pure water for 2 sec., scrubber cleaning for 20 sec., rinsing with pure water for 15 sec., removal of water by high-speed rotation for 25 sec., and infrared drying for 55 sec.

The surface of the electrode thus treated was coated with the prepared coating solution for forming a photo-induced current amplifying layer in 0.4 sec. by a spinner at 4,000 rpm, and the coated electrode was allowed to stand under a dust-free condition, thereby effecting leveling drying. Thereafter, drying was carried out for 0.5 hour at 100° C. Thus, a photo-induced current amplifying layer having a thickness of 100 nm was stacked on the electrode.

Then, a pyrrolopyrrole pigment (manufactured by Ciba-Geigy Ltd.) having the following structure as a charge generating substance was deposited on the photo-induced current amplifying layer at a rate of 3 nm/sec. under a vacuum of $10^{-6}$ Torr and then allowed to stand for 1 hour in acetone vapor, thereby stacking a charge generation layer of 200 nm in thickness on the photo-induced current amplifying layer.

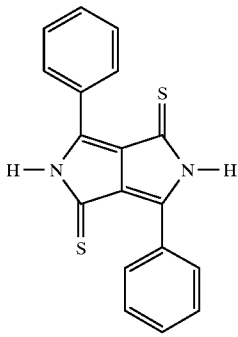

Pyrrolopyrrole Pigment

The surface of the charge generation layer was coated with a coating solution in 0.4 sec. by a spinner at 400 rpm. The coating solution was prepared by uniformly dissolving 3 parts by weight of a biphenylamine derivative having the following structure as a charge transport substance, and 2 parts by weight of a polystyrene resin material (HRM-3, manufactured by Denki Kagaku Kogyo K.K.) in 14 parts by weight of dichloromethane and 22 parts by weight of 1,1,2-trichloroethane.

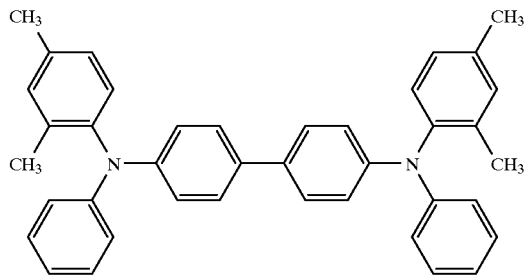

After the coating process, the coated electrode was allowed to stand under a calm condition until a dry film was formed on the surface of the coating so that the surface of the coating film was unadherable, thereby effecting leveling drying. After the leveling drying, the coating was dried for 2 hours at 80° C., thereby stacking a charge transport layer on the charge generation layer, and thus obtaining a photoelectric sensor having a photoconductive layer of 10 µm in thickness that comprised the charge generation and transport layers according to the present invention.

(Electrical characteristics of the photoelectric sensor)

Figure 13:
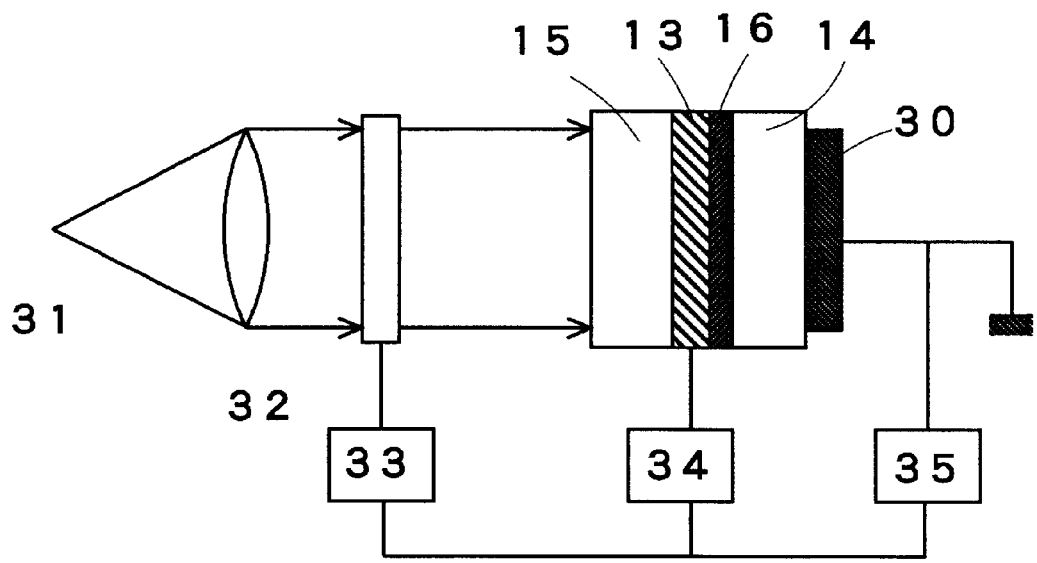
FIG. 13 illustrates a current measuring device used for the photoelectric sensor according to the present invention.

To measure the electrical characteristics of the photoelectric sensor thus obtained, a sample for measurement was prepared by depositing a gold electrode having a size of 0.16 cm$^2$, a thickness of 10 nm and a sheet resistivity of 1,000 ohm/sq. on the charge transport layer of the photoelectric sensor, and a current measuring system as shown in FIG. 13 was constructed. In the figure, reference numeral 15 denotes a photoelectric sensor substrate, 13 a photoelectric sensor electrode, 16 a photo-induced current amplifying layer, 14 a photoconductive layer including a charge generation layer and a charge transport layer, 30 a gold electrode, 31 a light source, 32 a shutter (No. O electromagnetic shutter, manufactured by Copal Co., Ltd.), 33 a shutter driving mechanism, 34 a pulse generator (manufactured by Yokogawa Hewlett-Packard Co.), and 35 an oscilloscope.

In the current measuring system, a DC voltage of 150 V (15 V/µm) was applied between the photoelectric sensor electrode 13 as a positive electrode and the gold electrode 30 as a negative electrode, and at the same time, light was applied from the glass substrate side for 0.033 sec. 0.5 sec. after the initiation of the voltage application. In this state, the current flowing in the photoelectric sensor was measured with the light irradiation initiation time set at t=0. As the light for irradiation, green light was selected from light emitted from a xenon lamp (L2274, manufactured by Hamamatsu Photonics K.K.) as a light source by using a green filter (manufactured by Vacuum Optics Co., of Japan), and applied to the photoelectric sensor at a luminous intensity of 20 lux. The intensity of irradiation light was measured with an illuminometer (manufactured by Minolta Camera Co., Ltd.). FIG. 5 shows the characteristics of the filter used.

The voltage application was continued for 0.15 sec. from the light irradiation initiation time even after the termination of the light irradiation, and the change of current with time during the voltage application was measured with the oscilloscope 35. In another experiment, no exposure was carried out, but the voltage application alone was performed, and the change of current with time was measured in the same way as the above. The measurement was carried out at room temperature.

Figure 16:
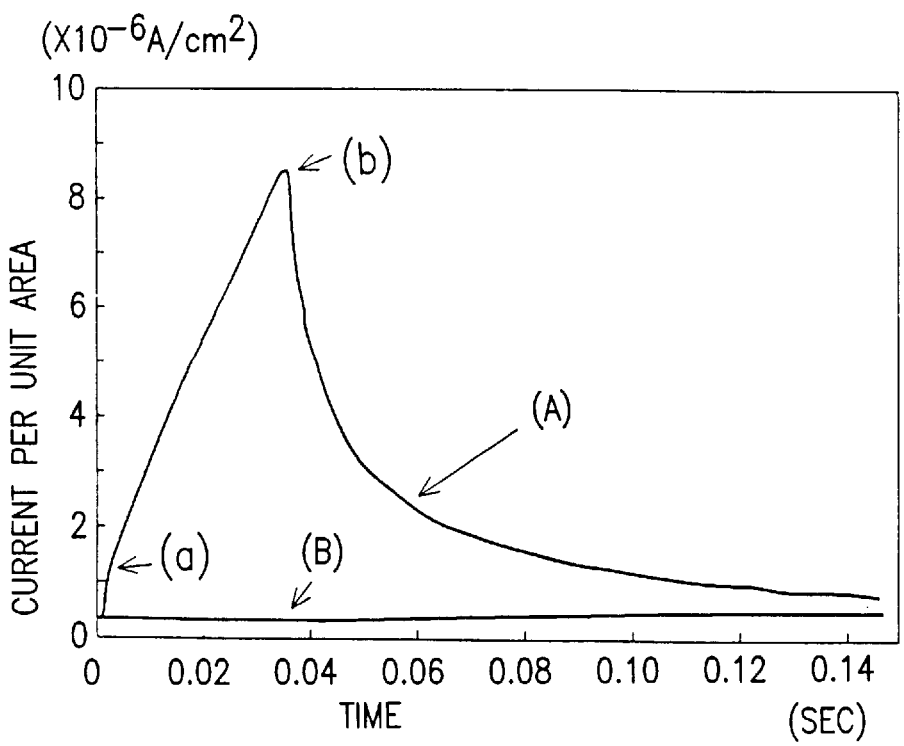
FIG. 16 is a graph showing electrical characteristics of one example of the photoelectric sensor according to the present invention.

The results of the measurement are shown in FIG. 16. In the graph of the figure, the axis of abscissas represents the voltage application time (second), and the axis of ordinates represents the current density ($10^{-6}$ A/cm$^2$). In the figure, the line A shows the measured current value in the case where exposure was carried out, and the line B shows the measured current value in the case where no exposure was carried out, but the voltage application alone was performed.

As shown by the line A, two points (a) and (b) of inflections are observed on the curve representing the amount of current flowing in the photoelectric sensor of the present invention. It is considered from the comparison with a comparative sensor (described later) that the amount of current below the inflection point (a) is the amount of current flowing in proportion to the quantity of exposure energy (the current will be hereinafter referred to as "photo-induced current"). The inflection point (b) is a point of change in the amount of current due to the termination of the exposure. Thus, it will be understood that even after the termination of the exposure and even when no exposure is carried out, a current corresponding to the applied voltage continuously flows, and the current gradually decays. In other words, it will be understood from FIG. 16 that in the photoelectric sensor of the present invention, the photo-induced current continues to increase during the exposure, and it continuously flows even after the termination of the exposure and gradually decays after a predetermined time. The resistivity was determined to be $4 \times 10^{11}$ ohm-cm from the value of current flowing in the photoelectric sensor.

Further, the apparent quantum efficiency was calculated. The results are shown in FIG. 9. In the photoelectric sensor of the present invention, the quantum efficiency exceeded 1 to a considerable extent and reached a value near 8 at the maximum.

(Preparation of an information recording medium)

On a glass substrate having a thickness of 1.1 mm, an ITO film having a thickness of 100 nm was grown by sputtering, thereby obtaining an electrode. Thereafter, the surface of the electrode was cleaned.

The surface of the electrode was coated with a coating solution by using a blade coater provided with a gap of 50 µm. The coating solution was obtained by uniformly dissolving 40 parts by weight of a multifunctional monomer (dipentaerythritol hexaacrylate, M-400, manufactured by Toa Gosei Chemical Industry Co., Ltd.), 2 parts by weight of a photo-curing initiator (2-hydroxy-2-methyl-1-phenylpropane-1-one, Darocure 1173, manufactured by Ciba-Geigy Ltd.), 50 parts by weight of a liquid crystal [90% of which was a smectic liquid crystal (S-6, manufactured by Merck & Co., Ltd.) and 10% of which was a nematic liquid crystal (E31LV, manufactured by Merck & Co., Ltd.)], and 3 parts by weight of a surface-active agent (Fluorad FC-430, manufactured by Sumitomo 3M) in 96 parts by weight of xylene. The coating was dried for 3 minutes at 47° C. and then vacuum-dried for 2 minutes at 47° C. Immediately thereafter, the dry coating film was cured by irradiation with ultraviolet rays at 0.3 J/cm², thereby obtaining an information recording medium having an information recording layer of 6 µm in thickness.

A cross-section of the information recording layer was dried after the liquid crystal had been extracted with hot methanol, and then the internal structure of the information recording layer was observed with a scanning electron microscope having a magnifying power of 1,000 (S-800, manufactured by Hitachi, Ltd.). As a result, it was revealed that the surface of the information recording layer was covered with the ultraviolet curing resin material having a thickness of 0.6 µm and the inside of the layer had a structure in which the liquid crystal phase that formed a continuous layer was filled with the resin particle phase having a particle diameter of 0.1 µm.

(Information recording method and recording characteristics)

The photoelectric sensor and the information recording medium, prepared as described above, were disposed to face each other across an air gap defined by a spacer of polyimide film having a thickness of 10 µm.

The stack structure thus obtained was loaded into an imaging camera (RB67, manufactured by Mamiya Camera Co., Ltd.) in place of a photographic film, as shown in FIG. 10. A DC voltage of 700 V was applied between the respective electrodes of the photoelectric sensor and the information recording medium for 0.04 sec., and at the same time, exposure was carried out by projecting a gray scale from the photoelectric sensor side for 1/30 sec. at an exposure of 0.2 to 200 lux. After the exposure, the information recording medium was taken out. As a result, record regions comprising light-transmitting portions corresponding to the gray scale were observed on the information recording layer. In contrast to a comparative example, the sensitivity was improved to a considerable extent. In addition, the recorded image had no image unevenness or image noise attributable to partial or local unevenness of sensitivity of the photoelectric sensor. Thus, a favorable recorded image was obtained.

Next, the information recorded on the information recording medium was reproduced by an information output system as shown in FIG. 12. In the figure, reference numeral 41 denotes an information recording medium scanner, 42 a personal computer, and 43 a printer.

The information recorded on the information recording medium was read with an image scanner employing a CCD line sensor, and the read information was output by using a sublimation transfer printer (SP-5500, manufactured by Victor Company of Japan, Limited). As a result, a favorable print, which had gradation corresponding to the gray scale and was free from image unevenness and image noise, was obtained.

Further, a color image was similarly recorded by separating the applied light into three colors, i.e., R. G and B, using prisms and a color filter. As a result, the recorded image was free from image unevenness and image noise attributable to partial or local unevenness of sensitivity of the photoelectric sensor. When information on the color image thus recorded was read and output in the same way as the above, a favorable print, which was free from image unevenness and image noise, was obtained.

(Measurement of thermally stimulated current in the photoelectric sensor)

In the photoelectric sensor of the present invention, a certain amount of charge has already been trapped in the charge trap sites before light amplification is performed. Therefore, it is possible to measure a thermally stimulated current.

The thermally stimulated current in the photoelectric sensor of the present invention was measured as follows. A sample for measurement was prepared by depositing a gold electrode having a film thickness of 30 nm, a sheet resistivity of 1,000 ohm/sq., and a size of 0.16 cm² on the photoconductive layer, and 3 days after the preparation of the photoelectric sensor, the thermally stimulated current was measured with a short-circuit thermally stimulated current measuring device (manufactured by Toyo Seiki K.K.), as shown in FIG. 14. A DC voltage of 1.5 V/µm was applied between the photoelectric sensor electrode as a positive electrode and the gold electrode as a negative electrode, and at the same time, the photoelectric sensor for measurement was heated at a heating rate of 10° C./min. Under these conditions, the current flowing during the heating process was measured with a micro-ammeter.

In the figure, reference numeral 15 denotes a photoelectric sensor substrate, 13 a photoelectric sensor electrode, 16 a photo-induced current amplifying layer, 14 a photoconductive layer including a charge generation layer and a charge transport layer, 30 a gold electrode, 100 a micro-ammeter, and 101 a DC power source. For the micro-ammeter 100 and the DC power source 101, a DC power source with a micro-ammeter (HP4140B, manufactured by Hewlett-Packard Co.) was used.

The temperature of the sample was measured near the sample, that is, at a sample mount part covered with a heat insulation cover, by using an alumel-chromel thermocouple.

The results of the measurement are shown in FIG. 15. In the graph of FIG. 15, the axis of abscissas represents the heating temperature (°C.), and the axis of ordinates represents the current value (A). As shown by the line A, in the photoelectric sensor having the photo-induced current amplifying layer according to the present invention, a clear peaked waveform was observed besides the base current in the temperature range of 50° C. to 110° C. A peak appeared in the vicinity of 88° C., and the current density at the peak was $4.4 \times 10^{-7}$ A/cm².

COMPARATIVE EXAMPLE 1

A comparative photoelectric sensor was prepared in the same way as in Example 1 except that no photo-induced current amplifying layer was provided in the comparative photoelectric sensor.

Figure 17:
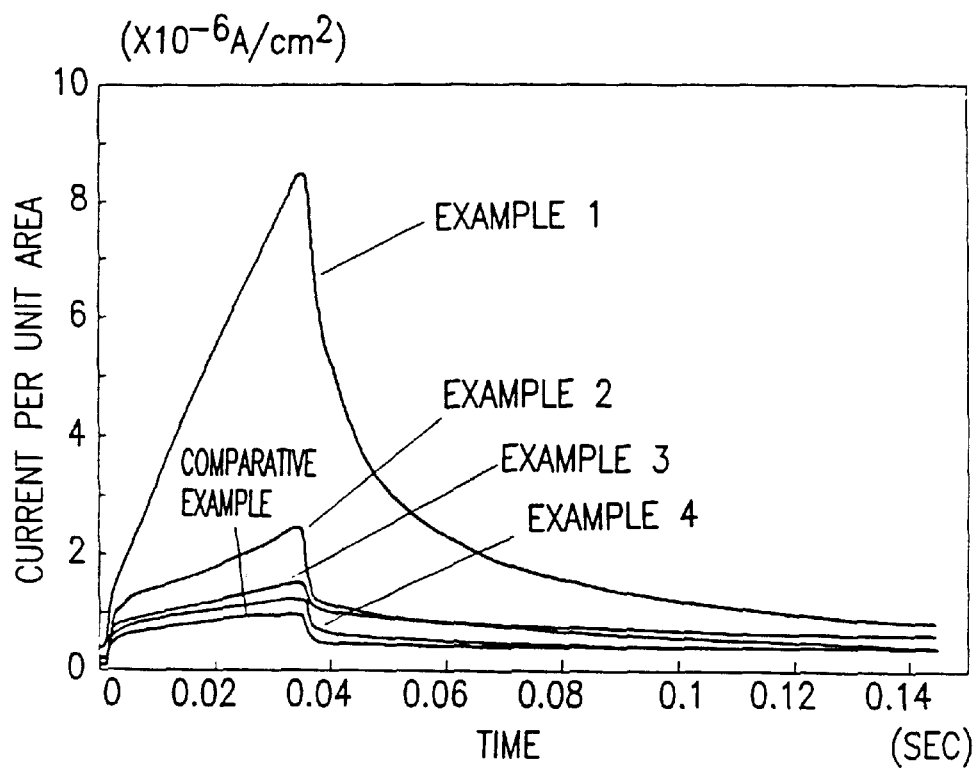
FIG. 17 is a graph showing electrical characteristics of other examples of the photoelectric sensor according to the present invention and a comparative photoelectric sensor.
Figure 18:
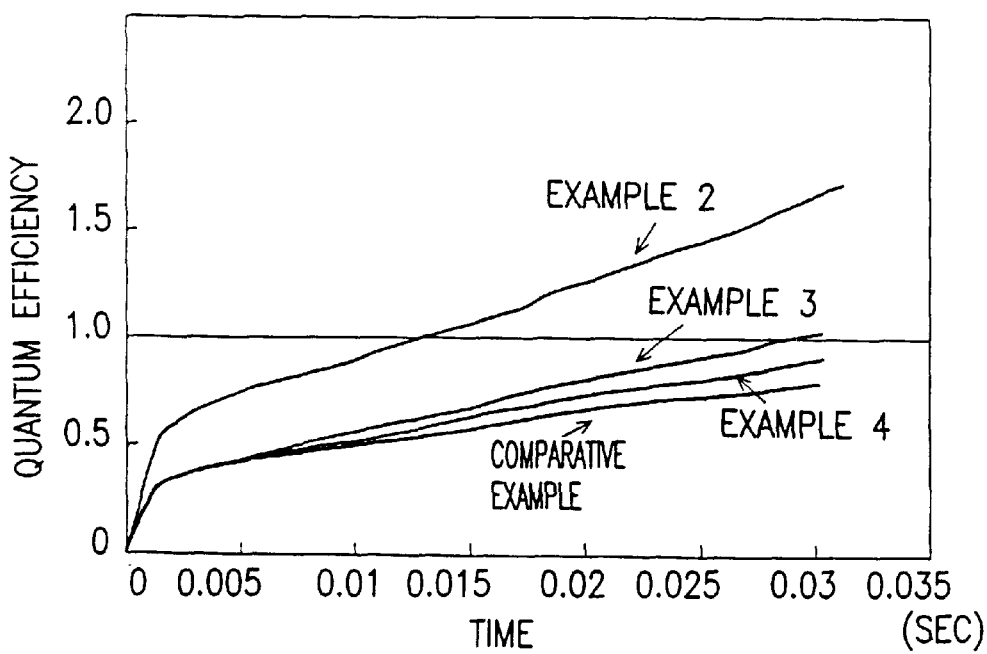
FIG. 18 is a graph showing the quantum efficiency of the photoelectric sensors of the present invention and the comparative photoelectric sensor.

Electrical characteristics of the comparative photoelectric sensor were measured by a current measuring device similar to that used in Example 1. The results of the measurement are shown in FIG. 17. As will be understood from the graph, substantially no increase in the photocurrent according to the light irradiation was observed, and the amount of current that contributes to the information recording was not much. FIG. 18 shows the results of calculation of quantum efficiency in the same way as in Example 1.

An information recording system similar to the above was prepared by using the comparative photoelectric sensor and the above-described information recording medium. A DC voltage of 700 V was applied between the two electrodes for 0.04 sec., and at the same time, exposure was carried out by projecting a gray scale from the photoelectric sensor side. After the exposure, the information recording medium was taken out, and the recorded information was read and output by an information output system similar to the above. It was revealed that information only in an extremely narrow exposure range of the gray scale was recorded on the information recording medium. In addition, image unevenness and noise in the form of undesired blank spot, which were attributable to partial or local unevenness of sensitivity of the photoelectric sensor, were observed on the medium having the light information recorded thereon.

Further, measurement of a thermally stimulated current was carried out in the same way as in Example 1. The results of the measurement are shown by the line B in FIG. 15. As shown by the line B, in the photoelectric sensor having no photo-induced current amplifying layer, a peaked waveform was observed besides the base current in the temperature range of 50° to 110° C., but the peak was very small, and the current density at the peak in the vicinity of 88° C. was extremely low, i.e., $4.5 \times 10^{-8}$ A/cm$^2$.

EXAMPLE 2
(Preparation of a double-layered photoelectric sensor)

1 part by weight of a polyvinyl formal resin was dissolved in 98 parts by weight of 1,4-dioxane and 98 parts by weight of cyclohexanone. In the resulting solution, 0.078 parts by weight of 2,3-dichloro-5,6-dicyano-p-benzoquinone having the following structure as an electron accepting substance was completely dissolved, thereby obtaining a coating solution for forming a photo-induced current amplifying layer.

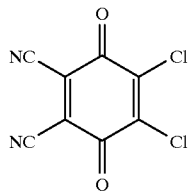

2,3-dichloro-5,6-dycano-p-benzoquinone

In the same way as in Example 1, the surface of a cleaned electrode was coated with the prepared coating solution in 0.4 sec. by a spinner at 4,000 rpm, and the coated electrode was allowed to stand under a dust-free condition, thereby effecting leveling drying. Thereafter, drying was carried out for 0.5 hour at 100° C. Thus, a photo-induced current amplifying layer having a thickness of 100 nm was stacked on the electrode. On the photo-induced current amplifying layer, a charge generation layer and a charge transport layer were formed in the same way as in Example 1, thereby preparing a double-layered photoelectric sensor.
(Electrical characteristics of the photoelectric sensor)

The electrical characteristics of the photoelectric sensor thus obtained were measured by a current measuring device similar to that used in Example 1. The results of the measurement are shown in FIG. 17. As will be understood from the graph, an increase in the photocurrent according to the light irradiation was observed, and the amplifying effect was greater than in the comparative photoelectric sensor. FIG. 18 shows the results of calculation of quantum efficiency made in the same way as in Example 1.
(Information recording method and recording characteristics)

Image recording was carried out in the same way as in Example 1 by using the photoelectric sensor of the present invention prepared as described above and an information recording medium prepared in the same way as in Example 1. The recorded image was free from image unevenness and image noise attributable to partial or local unevenness of sensitivity of the photoelectric sensor. Thus, a favorable recorded image was obtained.

The information recorded on the information recording medium was read and output in the same way as in Example 1. As a result, it was revealed that the gray scale was reproduced to a considerable extent, and that the sensitivity was considerably improved in comparison to the comparative photoelectric sensor. In addition, a favorable print, which was free from image unevenness and image noise, was obtained. Thus, the image quality was improved.

Further, a color image was recorded by separating the applied light into three colors, i.e., R, G and B, using prisms and a color filter in the same way as in Example 1. As a result, the recorded image was free from image unevenness and image noise attributable to partial or local unevenness of sensitivity of the photoelectric sensor. When information on the color image thus recorded was read and output in the same way as in Example 1, a favorable print, which was free from image unevenness and image noise, was obtained.

EXAMPLE 3
(Preparation of a double-layered photoelectric sensor)

3 parts by weight of a bis-azo pigment having the following structure as a photoconductive substance and 1 part by weight of a polyvinyl formal resin were mixed with 98 parts by weight of 1,4-dioxane and 98 parts by weight of cyclohexanone, and the mixture was thoroughly kneaded by using a mixing machine to prepare a dispersion, thereby obtaining a coating solution for forming a photo-induced current amplifying layer.

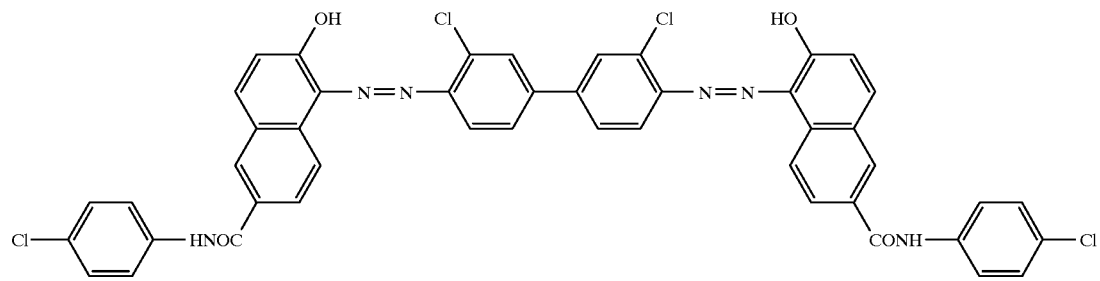

In the same way as in Example 1, the surface of a cleaned electrode was coated with the prepared coating solution in 0.4 sec. by a spinner at 4,000 rpm, and the coated electrode was allowed to stand under a dust-free condition, thereby effecting leveling drying. Thereafter, drying was carried out for 0.5 hour at 100° C. Thus, a photo-induced current amplifying layer having a thickness of 100 nm was stacked on the electrode. On the photo-induced current amplifying layer, a charge generation layer and a charge transport layer were formed under the same conditions as in Example 1, thereby preparing a double-layered photoelectric sensor.
(Electrical characteristics of the photoelectric sensor)

The electrical characteristics of the photoelectric sensor thus obtained were measured by a current measuring device similar to that used in Example 1. The results of the measurement are shown in FIG. 17. As will be understood from the graph, an increase in the photocurrent according to the light irradiation was observed, and the amplifying effect was greater than in the comparative photoelectric sensor. FIG. 18 shows the results of calculation of quantum efficiency made in the same way as in Example 1.
(Information recording method and recording characteristics)

Image recording was carried out in the same way as in Example 1 by using the photoelectric sensor obtained as described above and an information recording medium prepared in the same way as in Example 1. The recorded image was free from image unevenness and image noise attributable to partial or local unevenness of sensitivity of the photoelectric sensor. Thus, a favorable recorded image was obtained.

The information recorded on the information recording medium was read and output in the same way as in Example 1. As a result, it was revealed that the gray scale was reproduced to a certain extent, and that the sensitivity was somewhat improved in comparison to the comparative photoelectric sensor. In addition, a favorable print, which was free from image unevenness and image noise, was obtained. Thus, the image quality was improved.

Further, a color image was recorded by separating the applied light into three colors, i.e., R, G and B, using prisms and a color filter in the same way as in Example 1. As a result, the recorded image was free from image unevenness and image noise attributable to partial or local unevenness of sensitivity of the photoelectric sensor. When information on the color image thus recorded was read and output in the same way as in Example 1, a favorable print, which was free from image unevenness and image noise, was obtained.

EXAMPLE 4

(Preparation of a double-layered photoelectric sensor)

1 part by weight of a polyvinyl formal resin was mixed with 98 parts by weight of 1,4-dioxane and 98 parts by weight of cyclohexanone, and the mixture was thoroughly kneaded by using a mixing machine, thereby obtaining a coating solution for forming a photo-induced current amplifying layer. In the same way as in Example 1, the surface of a cleaned electrode was coated with the prepared coating solution in 0.4 sec. by a spinner at 4,000 rpm, and the coated electrode was allowed to stand under a dust-free condition, thereby effecting leveling drying. Thereafter, drying was carried out for 0.5 hour at 100° C. Thus, a photo-induced current amplifying layer having a thickness of 100 nm was stacked on the electrode. On the photo-induced current amplifying layer, a charge generation layer and a charge transport layer were formed under the same conditions as in Example 1, thereby preparing a double-layered photoelectric sensor.
(Electrical characteristics of the photoelectric sensor)

The electrical characteristics of the photoelectric sensor thus obtained were measured by a current measuring device similar to that used in Example 1. The results of the measurement are shown in FIG. 17. As will be understood from the graph, an increase in the photocurrent according to the light irradiation was observed, and the amplifying effect was greater than in the comparative photoelectric sensor. FIG. 18 shows the results of calculation of quantum efficiency made in the same way as in Example 1.
(Information recording method and recording characteristics)

Image recording was carried out in the same way as in Example 1 by using the photoelectric sensor of the present invention prepared as described above and an information recording medium prepared in the same way as in Example 1. The recorded image was free from image unevenness and image noise attributable to partial or local unevenness of sensitivity of the photoelectric sensor. Thus, a favorable recorded image was obtained.

The information recorded on the information recording medium was read and output in the same way as in Example 1. As a result, it was revealed that the reproduction of the gray scale was slightly better than in the case of the comparative photoelectric sensor, and the improvement in the sensitivity was very little. However, a favorable print, which was free from image unevenness and image noise, was obtained. Thus, the image quality was improved.

Further, a color image was recorded by separating the applied light into three colors, i.e., R, G and B, using prisms and a color filter in the same way as in Example 1. As a result, the recorded image was free from image unevenness and image noise attributable to partial or local unevenness of sensitivity of the photoelectric sensor. When information on the color image thus recorded was read and output in the same way as in Example 1, a favorable print, which was free from image unevenness and image noise, was obtained.

EXAMPLE 5

5 parts by weight of a polyvinyl alcohol (manufactured by Nippon Synthetic Chemical Industry Co., Ltd.; the degree of saponification: 97% to 99%) was dissolved in 95 parts by weight of ion-exchanged water to prepare a coating solution. The coating solution was coated on the photoconductive layer of a photoelectric sensor prepared in the same way as in Example 1 by using a spinner, thereby stacking a dielectric layer of 1 $\mu$m in thickness on the photoconductive layer.

Next, an information recording layer was formed on the dielectric layer by the same method as that used to form the information recording layer in Example 1. Further, an ITO film was grown on the information recording layer to a thickness of 20 nm by sputtering, thereby stacking an electrically conductive layer on the information recording layer. In this way, an information recording medium was prepared.

A DC voltage of 680 V was applied between the two electrodes of the information recording system, and at the same time, exposure was carried out by projecting a gray scale from the photoelectric sensor side for 1/30 sec at an exposure of 0.2 to 200 lux in the same way as in Example 1. The voltage application time was 0.02 sec. After the exposure, the information recording medium was taken out, and the recorded information was read and output by an information output system similar to that used in Example 1. As a result, a favorable print was obtained.

EXAMPLE 6

(Preparation of an information recording medium)

On a glass substrate thoroughly cleaned, tin oxide was deposited to a thickness of 100 nm to prepare an electrode.

Thereafter, the electrode was subjected to a cleaning treatment similar to that in Example 1. The surface of the cleaned electrode was coated with a coating solution in 5 sec. by a spinner at 2,000 rpm. The coating solution was obtained by uniformly mixing 16 parts by weight of a β-pinene polymer (Kristalex 3100, manufactured by Rika Hercules Co.), and 80 parts by weight of xylene. Thereafter, it was allowed to stand for 30 minutes at room temperature, thereby obtaining an information recording medium having an information recording layer of 0.7 μm in thickness.

(Information recording method)

An information recording system similar to that in Example 1 was prepared by using the information recording medium prepared as described above and a photoelectric sensor prepared in the same way as in Example 1. A DC voltage of 800 V was applied between the two electrodes, and at the same time, exposure was carried out by projecting a gray scale from the photoelectric sensor side for 0.1 sec. at an exposure of 0.2 to 200 lux. The voltage application time was 0.5 sec. After the exposure, the information recording medium was taken out and heated for 30 sec. at 80° C. to effect development. As a result, a frost image corresponding to the gray scale was formed.

It was possible to read the frost image formed on the information recording medium by the information output system as shown in FIG. 12 in the same way as in Example 1. A favorable image, which was free from image unevenness and image noise, was obtained.

EXAMPLE 7

(Preparation of an information recording medium)

On a glass substrate having a thickness of 1.1 mm and thoroughly cleaned, an ITO film having a thickness of 100 nm was grown by sputtering to obtain an electrode. Thereafter, the electrode was subjected to a cleaning treatment in the same way as in Example 1.

The surface of the electrode was coated by spinner coating method (1,500 rpm; 20 sec) with a solution of 7% fluorocarbon resin (Cytop, manufactured by Asahi Glass Company, Ltd., having a glass transition temperature of 100° C., a water absorption of 0.01% and a resistivity of $1 \times 10^{18}$ ohm-cm) in a fluorine-containing solvent, and it was dried for 3 hours at room temperature, thereby obtaining an information recording medium having an information recording layer of 3 μm in thickness.

(Information recording method)

An information recording system similar to that used in Example 1 was constructed by using the information recording medium prepared as described above and a photoelectric sensor prepared in the same way as in Example 1. A DC voltage of 900 V was applied between the two electrodes, and at the same time, exposure was carried out by projecting a gray scale from the photoelectric sensor side for 1/30 sec. at an exposure of 0.2 to 200 lux. The voltage application time was 0.1 sec.

Figure 19:
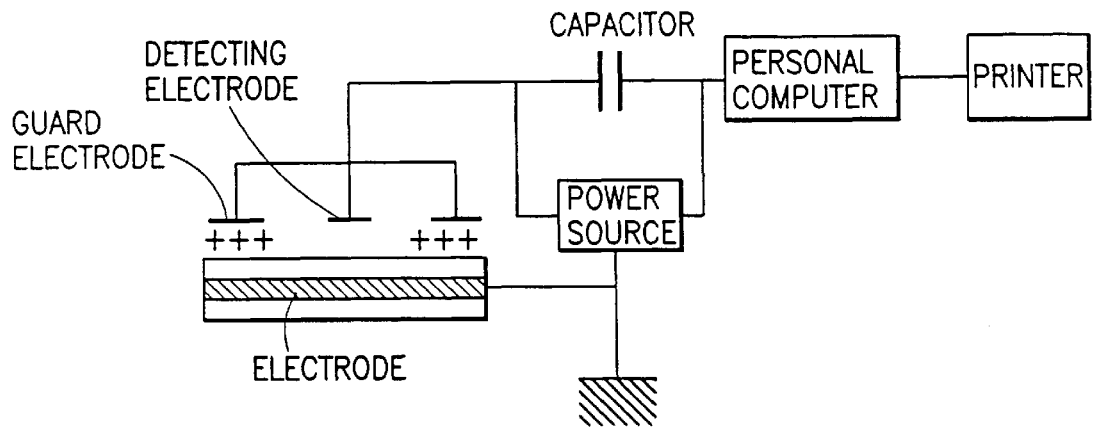
FIG. 19 illustrates an information output system.

It was possible to read the electrostatic information recorded on the resin surface of the information recording medium by an information output system as shown in FIG. 19 using a vibrating-reed electrometer (Model 344, manufactured by Trek Inc.). Noise and unevenness were less than in the case of using a conventional photoelectric sensor.

EXAMPLE 8

(Preparation of a coating solution for forming a photo-induced current amplifying layer)

3 parts by weight of a bis-azo pigment having the following structure as a photoconductive substance and 1 part by weight of a polyvinyl formal resin were mixed with 98 parts by weight of 1,4-dioxane and 98 parts by weight of cyclohexanone, and the mixture was thoroughly kneaded by using a mixing machine to obtain a pigment dispersion.

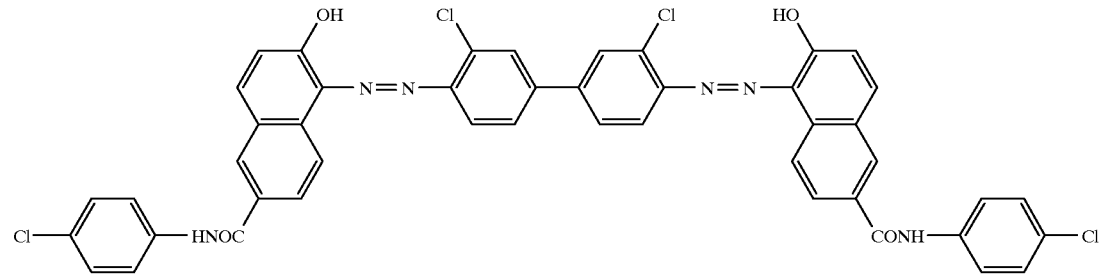

2,3-dichloro-5,6-dicyano-p-benzoquinone having the following structure as an electron accepting substance was added to the pigment dispersion in the ratio of 0.1 mol to 1 mol of the pigment in the dispersion and completely dissolved in the pigment dispersion, thereby obtaining a coating solution for forming a photo-induced current amplifying layer.

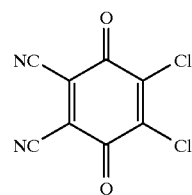

2,3-dichloro-5,6-dicyano-p-benzoquinone (Preparation of a double-layered photoelectric sensor)

On a glass substrate having a thickness of 1.1 mm and thoroughly cleaned, an ITO film having a sheet resistivity of 80 ohm/sq. and a thickness of 100 nm was grown by sputtering to obtain an electrode. The electrode was subjected to a cleaning treatment twice by using a scrubber cleaning machine (Plate Cleaner, Model 602, trade name, manufactured by Ultratech Co., Ltd.). The cleaning treatment was comprised of spraying of pure water for 2 sec., scrubber cleaning for 20 sec., rinsing with pure water for 15 sec., removal of water by high-speed rotation for 25 sec., and infrared drying for 55 sec.

The surface of the electrode thus treated was coated with the prepared coating solution for forming a photo-induced current amplifying layer in 0.4 sec. by a spinner at 4,000 rpm, and the coated electrode was allowed to stand under a dust-free condition, thereby effecting leveling drying. Thereafter, drying was carried out for 0.5 hour at 100° C.

Thus, a photo-induced current amplifying layer having a thickness of 100 nm was formed.

Then, a pyrrolopyrrole pigment (manufactured by Ciba-Geigy Ltd.) having the following structure as a charge generating substance was deposited on the photo-induced current amplifying layer at a rate of 3 nm/sec. under a vacuum of $10^{-6}$ Torr and then allowed to stand for 1 hour in acetone vapor, thereby stacking a charge generation layer of 200 nm in thickness on the photo-induced current amplifying layer.

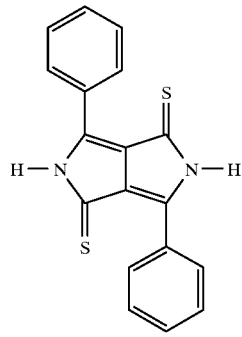

Pyrrolopyrrole Pigment

The surface of the charge generation layer was coated with a coating solution in 0.4 sec. by a spinner at 400 rpm. The coating solution was prepared by uniformly dissolving 25 parts by weight of a compound having the following structure as a charge transport substance, and 5 parts by weight of a polystyrene resin material (HRM-3, manufactured by Denki Kagaku Kogyo K.K.) in 68 parts by weight of dichloromethane and 102 parts by weight of 1,1,2-trichloroethane.

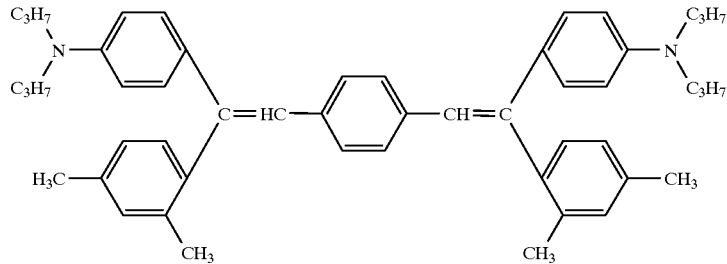

After the coating process, the coated electrode was allowed to stand under a calm condition until a dry film was formed on the surface of the coating so that the surface of the coating film was unadherable, thereby effecting leveling drying. After the leveling drying, the coating was dried for 2 hours at 80° C., thereby stacking a charge transport layer on the charge generation layer, and thus obtaining a photoelectric sensor having a photoconductive layer of 20 μm in thickness that comprised the charge generation and transport layers according to the present invention.

(Electrical characteristics of the photoelectric sensor)

Figure 20:
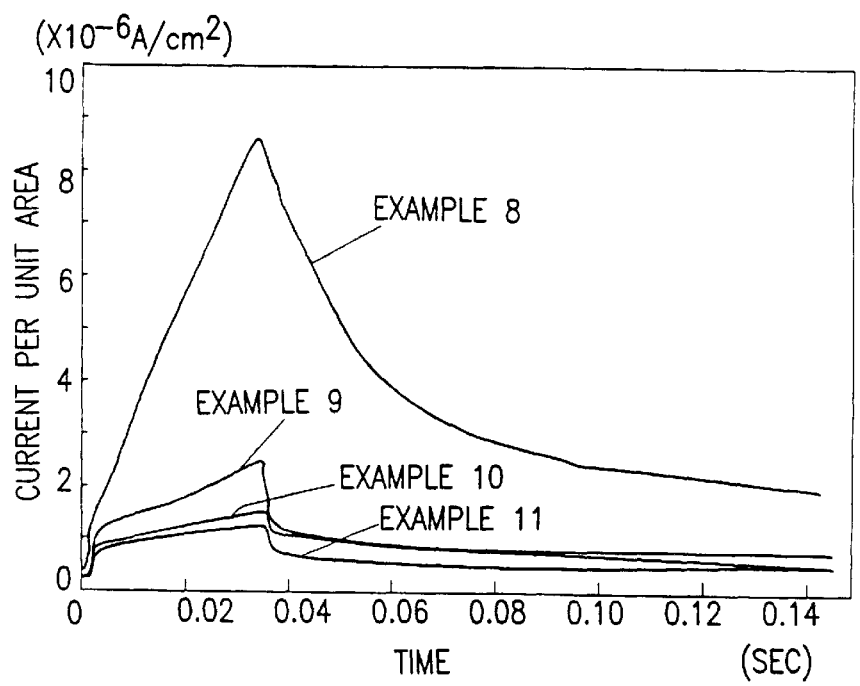
FIG. 20 is a graph showing electrical characteristics of further examples of the photoelectric sensor according to the present invention.

The electrical characteristics of the photoelectric sensor thus obtained were measured by a current measuring device similar to that used in Example 1. The results of the measurement are shown in FIG. 20. As will be understood from the graph, an increase in the photocurrent according to the light irradiation was observed, and the amplifying effect was greater than in the comparative photoelectric sensor.

(Information recording method and recording characteristics)

Image recording was carried out in the same way as in Example 1 by using the photoelectric sensor prepared as described above and an information recording medium prepared in the same way as in Example 1. The recorded image was free from image unevenness and image noise attributable to partial or local unevenness of sensitivity of the photoelectric sensor. Thus, a favorable recorded image was obtained.

The information recorded on the information recording medium was read and output in the same way as in Example 1. As a result, a favorable print, which had gradation corresponding to the gray scale and was free from image unevenness and image noise, was obtained. Thus, the image quality was improved.

Further, a color image was recorded by separating the applied light into three colors, i.e., R, G and B, using prisms and a color filter in the same way as in Example 1. As a result, the recorded image was free from image unevenness and image noise attributable to partial or local unevenness of sensitivity of the photoelectric sensor. When information on the color image thus recorded was read and output in the same way as in Example 1, a favorable print, which was free from image unevenness and image noise, was obtained.

EXAMPLE 9

(Preparation of a double-layered photoelectric sensor)

1 part by weight of a polyvinyl formal resin was dissolved in 98 parts by weight of 1,4-dioxane and 98 parts by weight of cyclohexanone. In the resulting solution, 0.078 parts by weight of 2,3-dichloro-5,6-dicyano-p-benzoquinone having the following structure as an electron accepting substance was completely dissolved, thereby obtaining a coating solution for forming a photo-induced current amplifying layer.

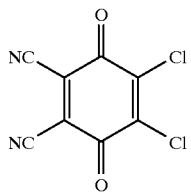

2,3-dichloro-5,6-dicyano-p-benzoquinone

In the same way as in Example 1, the surface of a cleaned electrode was coated with the prepared coating solution in 0.4 sec. by a spinner at 4,000 rpm, and the coated electrode was allowed to stand under a dust-free condition, thereby effecting leveling drying. Thereafter, drying was carried out for 0.5 hour at 100° C. Thus, a photo-induced current amplifying layer having a thickness of 100 nm was stacked on the electrode. On the photo-induced current amplifying layer, a charge generation layer and a charge transport layer were formed in the same way as in Example 8, thereby preparing a double-layered photoelectric sensor.
(Electrical characteristics of the photoelectric sensor)

The electrical characteristics of the photoelectric sensor thus obtained were measured by a current measuring device similar to that used in Example 1. The results of the measurement are shown in FIG. 20. As will be understood from the graph, an increase in the photocurrent according to the light irradiation was observed, and the amplifying effect was greater than in the comparative photoelectric sensor.
(Information recording method and recording characteristics)

Image recording was carried out in the same way as in Example 1 by using the photoelectric sensor of the present invention prepared as described above and an information recording medium prepared in the same way as in Example 1. The recorded image was free from image unevenness and image noise attributable to partial or local unevenness of sensitivity of the photoelectric sensor. Thus, a favorable recorded image was obtained.

The information recorded on the information recording medium was read and output in the same way as in Example 1. As a result, it was revealed that the gray scale was reproduced to a considerable extent, and that the sensitivity was considerably improved in comparison to the comparative photoelectric sensor. In addition, a favorable print, which was free from image unevenness and image noise, was obtained. Thus, the image quality was improved.

Further, a color image was recorded by separating the applied light into three colors, i.e., R, G and B, using prisms and a color filter in the same way as in Example 1. As a result, the recorded image was free from image unevenness and image noise attributable to partial or local unevenness of sensitivity of the photoelectric sensor. When information on the color image thus recorded was read and output in the same way as in Example 1, a favorable print, which was free from image unevenness and image noise, was obtained.

EXAMPLE 10

(Preparation of a double-layered photoelectric sensor)

3 parts by weight of a bis-azo pigment having the following structure and 1 part by weight of a polyvinyl formal resin were mixed with 98 parts by weight of 1,4-dioxane and 98 parts by weight of cyclohexanone, and the mixture was thoroughly kneaded by using a mixing machine to prepare a pigment dispersion, thereby obtaining a coating solution for forming a photo-induced current amplifying layer.

was allowed to stand under a dust-free condition, thereby effecting leveling drying. Thereafter, drying was carried out for 0.5 hour at 100° C. Thus, a photo-induced current amplifying layer having a thickness of 100 nm was stacked on the electrode. On the photo-induced current amplifying layer, a charge generation layer and a charge transport layer were formed in the same way as in Example 8, thereby preparing a double-layered photoelectric sensor.
(Electrical characteristics of the photoelectric sensor)

The electrical characteristics of the photoelectric sensor thus obtained were measured by a current measuring device similar to that used in Example 1. The results of the measurement are shown in FIG. 20. As will be understood from the graph, an increase in the photocurrent according to the light irradiation was observed, and the amplifying effect was greater than in the comparative photoelectric sensor.
(Information recording method and recording characteristics)

Image recording was carried out in the same way as in Example 1 by using the photoelectric sensor of the present invention prepared as described above and an information recording medium prepared in the same way as in Example 1. The recorded image was free from image unevenness and image noise attributable to partial or local unevenness of sensitivity of the photoelectric sensor. Thus, a favorable recorded image was obtained.

The information recorded on the information recording medium was read and output in the same way as in Example 1. As a result, it was revealed that the gray scale was reproduced to a certain extent, and that the sensitivity was somewhat improved in comparison to the comparative photoelectric sensor. In addition, a favorable print, which was free from image unevenness and image noise, was obtained. Thus, the image quality was improved.

Further, a color image was recorded by separating the applied light into three colors, i.e., R. G and B. using prisms and a color filter in the same way as in Example 1. As a result, the recorded image was free from image unevenness and image noise attributable to partial or local unevenness of sensitivity of the photoelectric sensor. When information on the color image thus recorded was read and output in the same way as in Example 1, a favorable print, which was free from image unevenness and image noise, was obtained.

EXAMPLE 11

(Preparation of a double-layered photoelectric sensor)

1 part by weight of a polyvinyl formal resin was dissolved in 98 parts by weight of 1,4-dioxane and 98 parts by weight of cyclohexanone, thereby obtaining a coating solution for forming a photo-induced current amplifying layer. In the

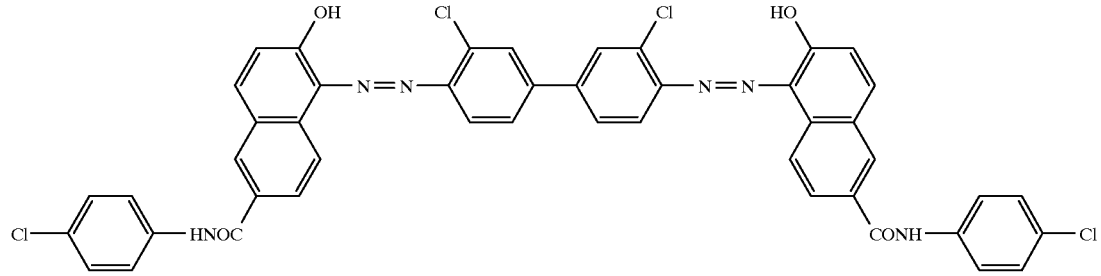

In the same way as in Example 1, the surface of a cleaned electrode was coated with the prepared coating solution in 0.4 sec. by a spinner at 4,000 rpm, and the coated electrode same way as in Example 1, the surface of a cleaned electrode was coated with the prepared coating solution in 0.4 sec. by a spinner at 4,000 rpm, and the coated electrode was allowed to stand under a dust-free condition, thereby effecting leveling drying. Thereafter, drying was carried out for 0.5 hour at 100° C. Thus, a photo-induced current amplifying layer having a thickness of 100 nm was stacked on the electrode. On the photo-induced current amplifying layer, a charge generation layer and a charge transport layer were formed in the same way as in Example 8, thereby preparing a double-layered photoelectric sensor.

(Electrical characteristics of the photoelectric sensor)

The electrical characteristics of the photoelectric sensor thus obtained were measured by a current measuring device similar to that used in Example 1. The results of the measurement are shown in FIG. 20. As will be understood from the graph, an increase in the photocurrent according to the light irradiation was observed, and the amplifying effect was greater than in the comparative photoelectric sensor.

(Information recording method and recording characteristics)

Image recording was carried out in the same way as in Example 1 by using the photoelectric sensor of the present invention prepared as described above and an information recording medium prepared in the same way as in Example 1. The recorded image was free from image unevenness and image noise attributable to partial or local unevenness of sensitivity of the photoelectric sensor. Thus, a favorable recorded image was obtained.

The information recorded on the information recording medium was read and output in the same way as in Example 1. As a result, it was revealed that the reproduction of the gray scale was slightly better than in the case of the comparative photoelectric sensor, and the improvement in the sensitivity was very little. However, a favorable print, which was free from image unevenness and image noise, was obtained. Thus, the image quality was improved.

Further, a color image was recorded by separating the applied light into three colors, i.e., R, G and B. using prisms and a color filter in the same way as in Example 1. As a result, the recorded image was free from image unevenness and image noise attributable to partial or local unevenness of sensitivity of the photoelectric sensor. When information on the color image thus recorded was read and output in the same way as in Example 1, a favorable print, which was free from image unevenness and image noise, was obtained.

EXAMPLE 12

(Preparation of a coating solution for forming a photo-induced current amplifying layer)

3 parts by weight of a bis-azo pigment having the following structure as a photoconductive substance and 1 part by weight of a polyvinyl formal resin were mixed with 98 parts by weight of 1,4-dioxane and 98 parts by weight of cyclohexanone, and the mixture was thoroughly kneaded by using a mixing machine to obtain a pigment dispersion.

2,3-dichloro-5,6-dicyano-p-benzoquinone having the following structure as an electron accepting substance was added to the pigment dispersion in the ratio of 0.1 mol to 1 mol of the pigment in the dispersion and completely dissolved in the pigment dispersion, thereby obtaining a coating solution for forming a photo-induced current amplifying layer.

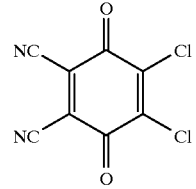

2,3-dichloro-5,6-dicyano-p-benzoquinone (Preparation of a double-layered photoelectric sensor)

In the same way as in Example 1, the surface of a cleaned electrode was coated with the prepared coating solution for forming a photo-induced current amplifying layer in 0.4 sec. by a spinner at 4,000 rpm, and the coated electrode was allowed to stand under a dust-free condition, thereby effecting leveling drying. Thereafter, drying was carried out for 0.5 hour at 100° C. Thus, a photo-induced current amplifying layer having a thickness of 100 nm was stacked on the electrode.

Then, a pyrrolopyrrole pigment (manufactured by Ciba-Geigy Ltd.) having the following structure as a charge generating substance was deposited on the photo-induced current amplifying layer at a rate of 3 nm/sec. under a vacuum of $10^{-6}$ Torr and then allowed to stand for 1 hour in acetone vapor, thereby stacking a charge generation layer of 200 nm in thickness on the photo-induced current amplifying layer.

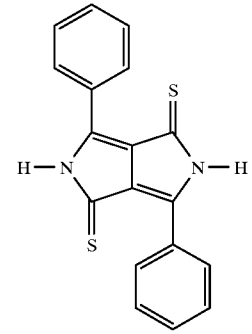

Pyrrolopyrrole Pigment

The surface of the charge generation layer was coated with a coating solution in 0.4 sec. by a spinner at 400 rpm.

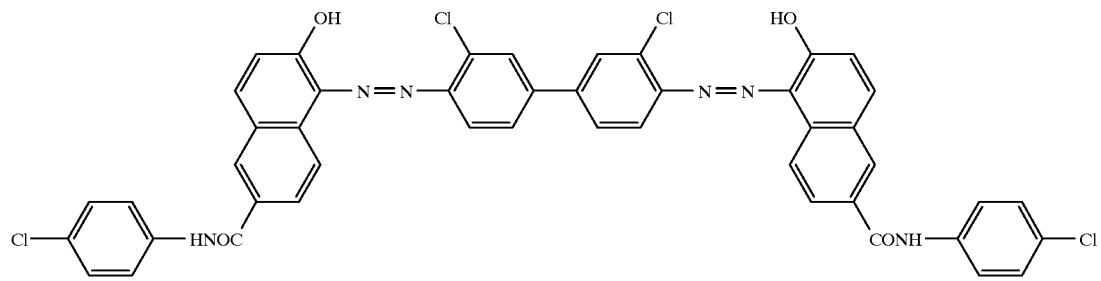

The coating solution was prepared by uniformly dissolving 25 parts by weight of a compound having the following structure as a charge transport substance, and 5 parts by weight of a polystyrene resin material (HRM-3, manufactured by Denki Kagaku Kogyo K.K.) in 68 parts by weight of dichloromethane and 102 parts by weight of 1,1,2-trichloroethane.

1 part by weight of a polyvinyl formal resin was dissolved in 98 parts by weight of 1,4-dioxane and 98 parts by weight of cyclohexanone. In the resulting solution, 0.078 parts by weight of 2,3-dichloro-5,6-dicyano-p-benzoquinone having the following structure as an electron accepting substance was completely dissolved, thereby obtaining a coating solution for forming a photo-induced current amplifying layer.

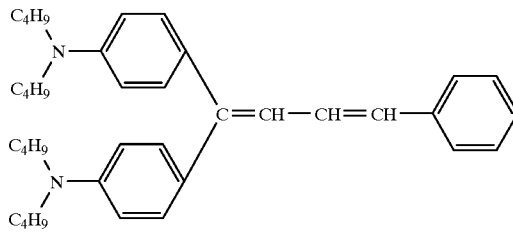

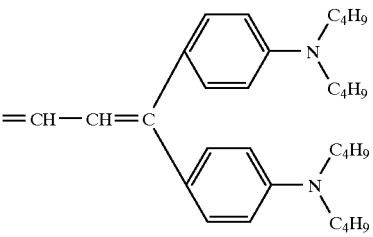

After the coating process, the coated electrode was allowed to stand under a calm condition until a dry film was formed on the surface of the coating so that the surface of the coating film was unadherable, thereby effecting leveling drying. After the leveling drying, the coating was dried for 2 hours at 80° C., thereby stacking a charge transport layer on the charge generation layer, and thus obtaining a photoelectric sensor having a photoconductive layer of 20 μm in thickness that comprised the charge generation and transport layers according to the present invention.

(Electrical characteristics of the photoelectric sensor)

Figure 21:
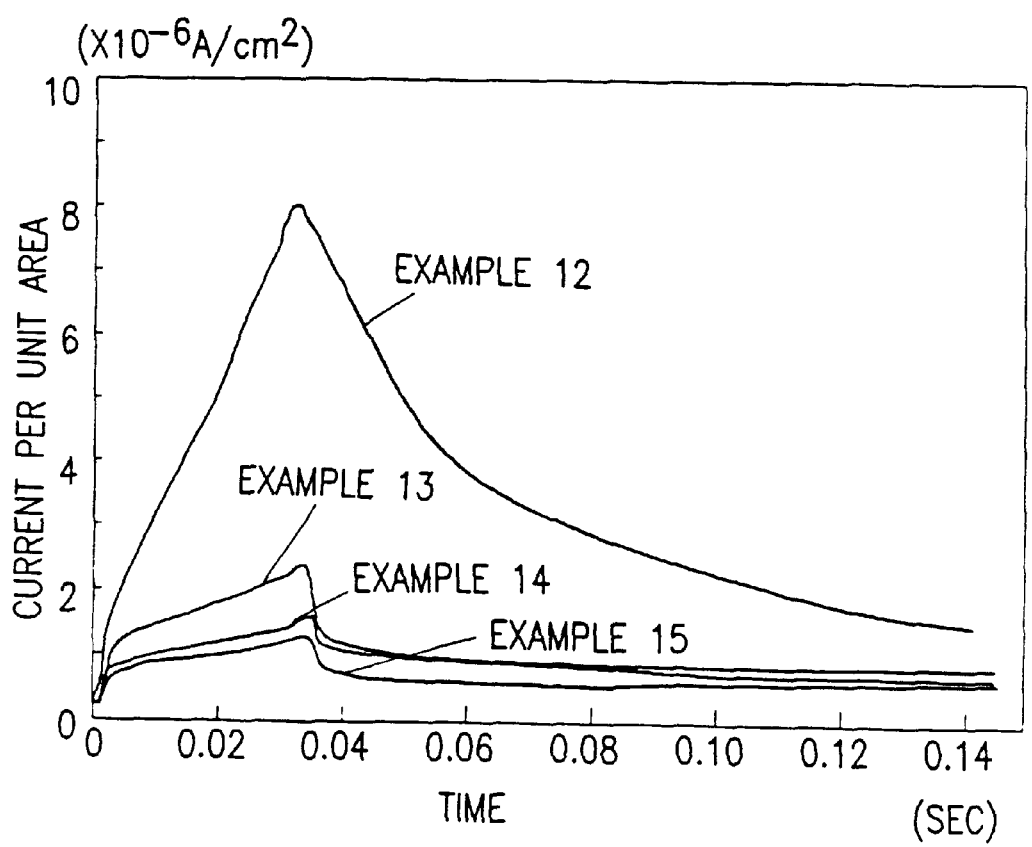
FIG. 21 is a graph showing electrical characteristics of further examples of the photoelectric sensor according to the present invention.

The electrical characteristics of the photoelectric sensor thus obtained were measured by a current measuring device similar to that used in Example 1. The results of the measurement are shown in FIG. 21. As will be understood from the graph, an increase in the photocurrent according to the light irradiation was observed.

(Information recording method and recording characteristics)

Image recording was carried out in the same way as in Example 1 by using the photoelectric sensor of the present invention prepared as described above and an information recording medium prepared in the same way as in Example 1. The recorded image was free from image unevenness and image noise attributable to partial or local unevenness of sensitivity of the photoelectric sensor. Thus, a favorable recorded image was obtained.

The information recorded on the information recording medium was read and output in the same way as in Example 1. As a result, a favorable print, which had gradation corresponding to the gray scale and was free from image unevenness and image noise, was obtained. Thus, the image quality was improved.

Further, a color image was recorded by separating the applied light into three colors, i.e., R, G and B, using prisms and a color filter in the same way as in Example 1. As a result, the recorded image was free from image unevenness and image noise attributable to partial or local unevenness of sensitivity of the photoelectric sensor. When information on the color image thus recorded was read and output in the same way as in Example 1, a favorable print, which was free from image unevenness and image noise, was obtained.

EXAMPLE 13
(Preparation of a double-layered photoelectric sensor)

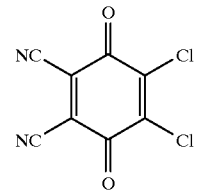

2,3-dichloro-5,6-dicyano-p-benzoquinone

In the same way as in Example 1, the surface of a cleaned electrode was coated with the prepared coating solution in 0.4 sec. by a spinner at 4,000 rpm, and the coated electrode was allowed to stand under a dust-free condition, thereby effecting leveling drying. Thereafter, drying was carried out for 0.5 hour at 100° C. Thus, a photo-induced current amplifying layer having a thickness of 100 nm was stacked on the electrode. On the photo-induced current amplifying layer, a charge generation layer and a charge transport layer were formed under the same conditions as in Example 12, thereby preparing a double-layered photoelectric sensor.

(Electrical characteristics of the photoelectric sensor)

The electrical characteristics of the photoelectric sensor thus obtained were measured by a current measuring device similar to that used in Example 1. The results of the measurement are shown in FIG. 21. As will be understood from the graph, an increase in the photocurrent according to the light irradiation was observed.

(Information recording method and recording characteristics)

Image recording was carried out in the same way as in Example 1 by using the photoelectric sensor of the present invention prepared as described above and an information recording medium prepared in the same way as in Example 1. The recorded image was free from image unevenness and image noise attributable to partial or local unevenness of sensitivity of the photoelectric sensor. Thus, a favorable recorded image was obtained.

The information recorded on the information recording medium was read and output in the same way as in Example 1. As a result, it was revealed that the gray scale was reproduced to a considerable extent, and that the sensitivity was considerably improved in comparison to the comparative photoelectric sensor. In addition, a favorable print, which was free from image unevenness and image noise, was obtained. Thus, the image quality was improved.

Further, a color image was recorded by separating the applied light into three colors, i.e., R, G and B, using prisms and a color filter in the same way as in Example 1. As a result, the recorded image was free from image unevenness and image noise attributable to partial or local unevenness of sensitivity of the photoelectric sensor. When information on the color image thus recorded was read and output in the same way as in Example 1, a favorable print, which was free from image unevenness and image noise, was obtained.

EXAMPLE 14
(Preparation of a double-layered photoelectric sensor)

3 parts by weight of a bis-azo pigment having the following structure as a photoconductive substance and 1 part by weight of a polyvinyl formal resin were mixed with 98 parts by weight of 1,4-dioxane and 98 parts by weight of cyclohexanone, and the mixture was thoroughly kneaded by using a mixing machine to prepare a pigment dispersion, thereby obtaining a coating solution for forming a photo-induced current amplifying layer.

somewhat improved in comparison to the comparative photoelectric sensor. In addition, a favorable print, which was free from image unevenness and image noise, was obtained. Thus, the image quality was improved.

Further, a color image was recorded by separating the applied light into three colors, i.e., R, G and B, using prisms and a color filter in the same way as in Example 1. As a result, the recorded image was free from image unevenness and image noise attributable to partial or local unevenness of sensitivity of the photoelectric sensor. When information on the color image thus recorded was read and output in the same way as in Example 1, a favorable print, which was free from image unevenness and image noise, was obtained.

EXAMPLE 15
(Preparation of a double-layered photoelectric sensor)

1 part by weight of a polyvinyl formal resin was dissolved in 98 parts by weight of 1,4-dioxane and 98 parts by weight of cyclohexanone, thereby obtaining a coating solution for forming a photo-induced current amplifying layer. In the same way as in Example 1, the surface of a cleaned electrode was coated with the prepared coating solution in 0.4 sec. by a spinner at 4,000 rpm, and the coated electrode was allowed

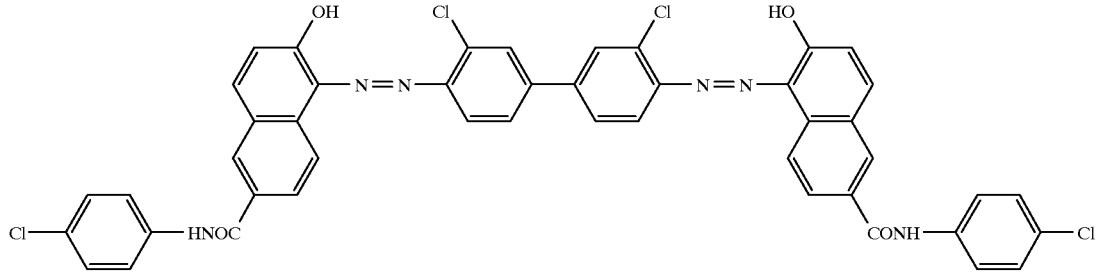

In the same way as in Example 1, the surface of a cleaned electrode was coated with the prepared coating solution in 0.4 sec. by a spinner at 4,000 rpm, and the coated electrode was allowed to stand under a dust-free condition, thereby effecting leveling drying. Thereafter, drying was carried out for 0.5 hour at 100° C. Thus, a photo-induced current amplifying layer having a thickness of 100 nm was stacked on the electrode. On the photo-induced current amplifying layer, a charge generation layer and a charge transport layer were formed in the same way as in Example 12, thereby preparing a double-layered photoelectric sensor.
(Electrical characteristics of the photoelectric sensor)

The electrical characteristics of the photoelectric sensor thus obtained were measured by a current measuring device similar to that used in Example 1. The results of the measurement are shown in FIG. 21. As will be understood from the graph, an increase in the photocurrent according to the light irradiation was observed.
(Information recording method and recording characteristics)

Image recording was carried out in the same way as in Example 1 by using the photoelectric sensor of the present invention prepared as described above and an information recording medium prepared in the same way as in Example 1. The recorded image was free from image unevenness and image noise attributable to partial or local unevenness of sensitivity of the photoelectric sensor. Thus, a favorable recorded image was obtained.

The information recorded on the information recording medium was read and output in the same way as in Example 1. As a result, it was revealed that the gray scale was reproduced to a certain extent, and that the sensitivity was to stand under a dust-free condition, thereby effecting leveling drying. Thereafter, drying was carried out for 0.5 hour at 100° C. Thus, a photo-induced current amplifying layer having a thickness of 100 nm was stacked on the electrode. On the photo-induced current amplifying layer, a charge generation layer and a charge transport layer were formed in the same way as in Example 12, thereby preparing a double-layered photoelectric sensor.
(Electrical characteristics of the photoelectric sensor)

The electrical characteristics of the photoelectric sensor thus obtained were measured by a current measuring device similar to that used in Example 1. The results of the measurement are shown in FIG. 21. As will be understood from the graph, an increase in the photocurrent according to the light irradiation was observed.
(Information recording method and recording characteristics)

Image recording was carried out in the same way as in Example 1 by using the photoelectric sensor prepared as described above and an information recording medium prepared in the same way as in Example 1. The recorded image was free from image unevenness and image noise attributable to partial or local unevenness of sensitivity of the photoelectric sensor. Thus, a favorable recorded image was obtained.

The information recorded on the information recording medium was read and output in the same way as in Example 1. As a result, it was revealed that the reproduction of the gray scale was slightly better than in the case of the comparative photoelectric sensor, and the improvement in the sensitivity was very little. However, a favorable print, which was free from image unevenness and image noise, was obtained. Thus, the image quality was improved.

Further, a color image was recorded by separating the applied light into three colors, i.e., R, G and B, using prisms and a color filter in the same way as in Example 1. As a result, the recorded image was free from image unevenness and image noise attributable to partial or local unevenness of sensitivity of the photoelectric sensor. When information on the color image thus recorded was read and output in the same way as in Example 1, a favorable print, which was free from image unevenness and image noise, was obtained.

EXAMPLE 16
(Preparation of a coating solution for forming a photo-induced current amplifying layer)

1 part by weight of a polyvinyl formal resin was dissolved in 98 parts by weight of 1,4-dioxane and 98 parts by weight of cyclohexanone. In the resulting solution, 0.078 parts by weight of 2,3-dichloro-5,6-dicyano-p-benzoquinone having the following structure as an electron accepting substance was completely dissolved, thereby obtaining a coating solution for forming a photo-induced current amplifying layer.

ing leveling drying. Thereafter, drying was carried out for 0.5 hour at 100° C. Thus, a photo-induced current amplifying layer having a thickness of 100 nm was stacked on the electrode.

The surface of the photo-induced current amplifying layer was coated with a pigment dispersion in 0.4 sec. by a spinner at 2,000 rpm. The pigment dispersion was prepared by mixing 3 parts by weight of a bis-azo pigment having the following structure as a charge generating substance and 1 part by weight of a polyvinyl formal resin with 98 parts by weight of 1,4-dioxane and 98 parts by weight of cyclohexanone, and thoroughly kneading the mixture by using a mixing machine. After the coating process, drying was carried out for 1 hour at 100° C. Thus, a charge generation layer having a thickness of 200 nm was stacked on the photo-induced current amplifying layer.

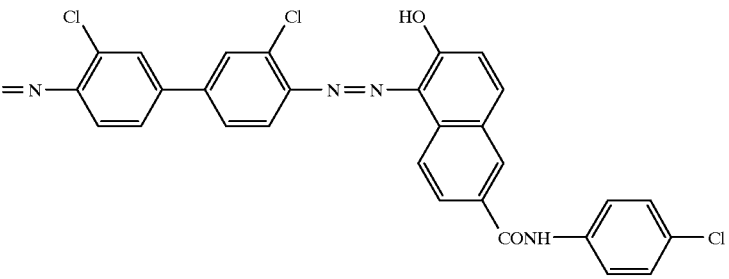

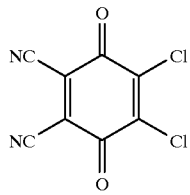

The surface of the charge generation layer was coated with a coating solution in 0.4 sec. by a spinner at 400 rpm. The coating solution was prepared by uniformly dissolving 25 parts by weight of a compound having the following structure as a charge transport substance, and 5 parts by weight of a polystyrene resin material (HRM-3, manufactured by Denki Kagaku Kogyo K.K.) in 68 parts by weight of dichloromethane and 102 parts by weight of 1,1,2-trichloroethane.

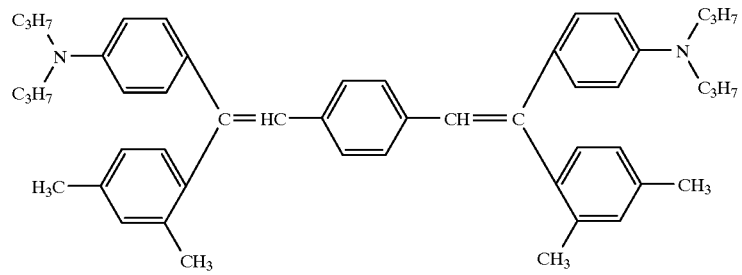

2,3-dichloro-5,6-dicyano-p-benzoquinone (Preparation of a double-layered photoelectric sensor)

In the same way as in Example 1, the surface of a cleaned electrode was coated with the prepared coating solution for forming a photo-induced current amplifying layer in 0.4 sec. by a spinner at 4,000 rpm, and the coated electrode was allowed to stand under a dust-free condition, thereby effect- After the coating process, the coated electrode was allowed to stand under a calm condition until a dry film was formed on the surface of the coating so that the surface of the coating film was unadherable, thereby effecting leveling drying. After the leveling drying, the coating was dried for 2 hours at 80° C, thereby stacking a charge transport layer on the charge generation layer, and thus obtaining a photoelectric sensor having a photoconductive layer of 20 µm in thickness that comprised the charge generation and transport layers according to the present invention.

(Information recording method and recording characteristics)

Image recording was carried out in the same way as in Example 1 by using the photoelectric sensor of the present invention prepared as described above and an information recording medium prepared in the same way as in Example 1. The recorded image was free from image unevenness and image noise attributable to partial or local unevenness of sensitivity of the photoelectric sensor. Thus, a favorable recorded image was obtained.

The information recorded on the information recording medium was read and output in the same way as in Example 1. As a result, a favorable print, which had gradation corresponding to the gray scale and was free from image unevenness and image noise, was obtained. Thus, the image quality was improved.

Further, a color image was recorded by separating the applied light into three colors, i.e., R, G and B, using prisms and a color filter in the same way as in Example 1. As a result, the recorded image was free from image unevenness and image noise attributable to partial or local unevenness of sensitivity of the photoelectric sensor. When information on the color image thus recorded was read and output in the same way as in Example 1, a favorable print, which was free from image unevenness and image noise, was obtained.

EXAMPLE 17
(Preparation of a double-layered photoelectric sensor)

1 part by weight of a polyvinyl formal resin was dissolved in 98 parts by weight of 1,4-dioxane and 98 parts by weight of cyclohexanone, thereby obtaining a coating solution for forming a photo-induced current amplifying layer. In the same way as in Example 1, the surface of a cleaned electrode was coated with the prepared coating solution in 0.4 sec. by a spinner at 4,000 rpm, and the coated electrode was allowed to stand under a dust-free condition, thereby effecting leveling drying. Thereafter, drying was carried out for 0.5 hour at 100° C. Thus, a photo-induced current amplifying layer having a thickness of 100 nm was stacked on the electrode. On the photo-induced current amplifying layer, a charge generation layer and a charge transport layer were formed under the same conditions as in Example 16, thereby preparing a double-layered photoelectric sensor.

(Information recording method and recording characteristics)

Image recording was carried out in the same way as in Example 1 by using the photoelectric sensor obtained as described above and an information recording medium prepared in the same way as in Example 1. The recorded image was free from image unevenness and image noise attributable to partial or local unevenness of sensitivity of the photoelectric sensor. Thus, a favorable recorded image was obtained.

The information recorded on the information recording medium was read and output in the same way as in Example 1. As a result, a favorable print, which had gradation corresponding to the gray scale and was free from image unevenness and image noise, was obtained. Thus, the image quality was improved.

Further, a color image was recorded by separating the applied light into three colors, i.e., R, G and B, using prisms and a color filter in the same way as in Example 1. As a result, the recorded image was free from image unevenness and image noise attributable to partial or local unevenness of sensitivity of the photoelectric sensor. When information on the color image thus recorded was read and output in the same way as in Example 1, a favorable print, which was free from image unevenness and image noise, was obtained.

EXAMPLE 18
(Preparation of a coating solution for forming a photo-induced current amplifying layer)

1 part by weight of a polyvinyl formal resin was dissolved in 98 parts by weight of 1,4-dioxane and 98 parts by weight of cyclohexanone. In the resulting solution, 0.078 parts by weight of 2,3-dichloro-5,6-dicyano-p-benzoquinone having the following structure as an electron accepting substance was completely dissolved, thereby obtaining a coating solution for forming a photo-induced current amplifying layer.

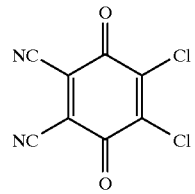

2,3-dichloro-5,6-dicyano-p-benzoquinone (Preparation of a double-layered photoelectric sensor)

In the same way as in Example 1, the surface of a cleaned electrode was coated with the prepared coating solution for forming a photo-induced current amplifying layer in 0.4 sec. by a spinner at 4,000 rpm, and the coated electrode was allowed to stand under a dust-free condition, thereby effecting leveling drying. Thereafter, drying was carried out for 0.5 hour at 100° C. Thus, a photo-induced current amplifying layer having a thickness of 100 nm was stacked on the electrode.

The surface of the photo-induced current amplifying layer was coated with a pigment dispersion in 0.4 sec. by a spinner at 2,000 rpm. The pigment dispersion was prepared by mixing 3 parts by weight of a bis-azo pigment having the following structure as a charge generating substance and 1 part by weight of a polyvinyl formal resin with 98 parts by weight of 1,4-dioxane and 98 parts by weight of cyclohexanone, and thoroughly kneading the mixture by using a mixing machine. After the coating process, drying was carried out for 1 hour at 100° C. Thus, a charge generation layer having a thickness of 200 nm was stacked on the photo-induced current amplifying layer.

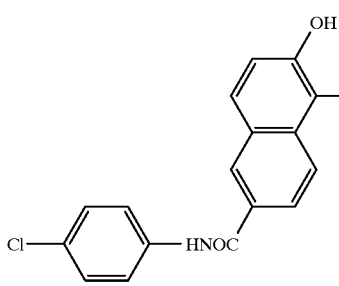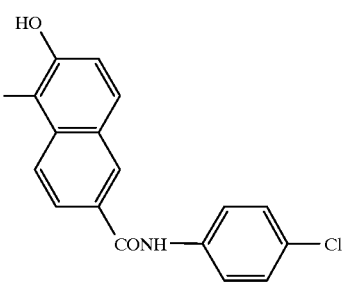

The surface of the charge generation layer was coated with a coating solution in 0.4 sec. by a spinner at 400 rpm. The coating solution was prepared by uniformly dissolving 3 parts by weight of a compound having the following structure as a charge transport substance, and 2 parts by weight of a polycarbonate resin material in 22 parts by weight of dichloromethane.

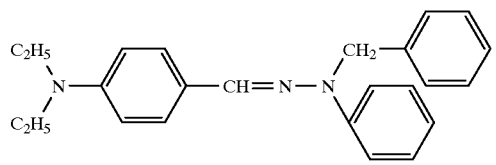

After the coating process, the coated electrode was allowed to stand under a calm condition until a dry film was formed on the surface of the coating so that the surface of the coating film was unadherable, thereby effecting leveling drying. After the leveling drying, the coating was dried for 2 hours at 80° C., thereby stacking a charge transport layer on the charge generation layer, and thus obtaining a photo-electric sensor having a photoconductive layer of 10 μm in thickness that comprised the charge generation and transport layers according to the present invention.

(Information recording method and recording characteristics)

Image recording was carried out in the same way as in Example 1 by using the photoelectric sensor of the present invention prepared as described above and an information recording medium prepared in the same way as in Example 1. The recorded image was free from image unevenness and image noise attributable to partial or local unevenness of sensitivity of the photoelectric sensor. Thus, a favorable recorded image was obtained.

The information recorded on the information recording medium was read and output in the same way as in Example 1. As a result, a favorable print, which had gradation corresponding to the gray scale and was free from image unevenness and image noise, was obtained. Thus, the image quality was improved.

Further, a color image was recorded by separating the applied light into three colors, i.e., R, G and B, using prisms and a color filter in the same way as in Example 1. As a result, the recorded image was free from image unevenness and image noise attributable to partial or local unevenness of sensitivity of the photoelectric sensor. When information on the color image thus recorded was read and output in the same way as in Example 1, a favorable print, which was free from image unevenness and image noise, was obtained.

EXAMPLE 19

(Preparation of a double-layered photoelectric sensor)

1 part by weight of a polyvinyl formal resin was dissolved in 98 parts by weight of 1,4-dioxane and 98 parts by weight of cyclohexanone, thereby obtaining a coating solution for forming a photo-induced current amplifying layer. In the same way as in Example 1, the surface of a cleaned electrode was coated with the prepared coating solution in 0.4 sec. by a spinner at 4,000 rpm, and the coated electrode was allowed to stand under a dust-free condition, thereby effecting leveling drying. Thereafter, drying was carried out for 0.5 hour at 100° C. Thus, a photo-induced current amplifying layer having a thickness of 100 nm was stacked on the electrode. On the photo-induced current amplifying layer, a charge generation layer and a charge transport layer were formed in the same way as in Example 18, thereby preparing a double-layered photoelectric sensor.

(Information recording method and recording characteristics)

Image recording was carried out in the same way as in Example 1 by using the photoelectric sensor obtained as described above and an information recording medium prepared in the same way as in Example 1. The recorded image was free from image unevenness and image noise attributable to partial or local unevenness of sensitivity of the photoelectric sensor. Thus, a favorable recorded image was obtained.

The information recorded on the information recording medium was read and output in the same way as in Example 1. As a result, a favorable print, which had gradation corresponding to the gray scale and was free from image unevenness and image noise, was obtained. Thus, the image quality was improved.

Further, a color image was recorded by separating the applied light into three colors, i.e., R, G and B, using prisms and a color filter in the same way as in Example 1. As a result, the recorded image was free from image unevenness and image noise attributable to partial or local unevenness of sensitivity of the photoelectric sensor. When information on the color image thus recorded was read and output in the same way as in Example 1, a favorable print, which was free from image unevenness and image noise, was obtained.

EXAMPLE 20

(Preparation of a coating solution for forming a photo-induced current amplifying layer)

1 part by weight of a polyvinyl formal resin was dissolved in 98 parts by weight of 1,4-dioxane and 98 parts by weight of cyclohexanone. In the resulting solution, 0.078 parts by weight of 2,3-dichloro-5,6-dicyano-p-benzoquinone having the following structure as an electron accepting substance was completely dissolved, thereby obtaining a coating solution for forming a photo-induced current amplifying layer.

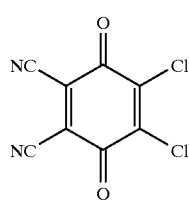

2,3-dichloro-5,6-dicyano-p-benzoquinone (Preparation of a double-layered photoelectric sensor)

In the same way as in Example 1, the surface of a cleaned electrode was coated with the prepared coating solution for forming a photo-induced current amplifying layer in 0.4 sec. by a spinner at 4,000 rpm, and the coated electrode was allowed to stand under a dust-free condition, thereby effecting leveling drying. Thereafter, drying was carried out for 0.5 hour at 100° C. Thus, a photo-induced current amplifying layer having a thickness of 100 nm was stacked on the electrode.

The surface of the photo-induced current amplifying layer was coated with a pigment dispersion in 0.4 sec. by a spinner at 2,000 rpm. The pigment dispersion was prepared by mixing 3 parts by weight of a bis-azo pigment having the following structure as a charge generating substance and 1 part by weight of a polyvinyl formal resin with 98 parts by weight of 1,4-dioxane and 98 parts by weight of cyclohexanone, and thoroughly kneading the mixture by using a mixing machine. After the coating process, drying was carried out for 1 hour at 100° C. Thus, a charge generation layer having a thickness of 200 nm was stacked on the photo-induced current amplifying layer.

formed on the surface of the coating so that the surface of the coating film was unadherable, thereby effecting leveling drying. After the leveling drying, the coating was dried for 2 hours at 80° C., thereby stacking a charge transport layer on the charge generation layer, and thus obtaining a photoelectric sensor having a photoconductive layer of 20 μm in thickness that comprised the charge generation and transport layers according to the present invention.

(Information recording method and recording characteristics)

Image recording was carried out in the same way as in Example 1 by using the photoelectric sensor of the present invention prepared as described above and an information recording medium prepared in the same way as in Example 1. The recorded image was free from image unevenness and image noise attributable to partial or local unevenness of sensitivity of the photoelectric sensor. Thus, a favorable recorded image was obtained.

The information recorded on the information recording medium was read and output in the same way as in Example 1. As a result, a favorable print, which had gradation corresponding to the gray scale and was free from image unevenness and image noise, was obtained. Thus, the image quality was improved.

Further, a color image was recorded by separating the applied light into three colors, i.e., R, G and B, using prisms and a color filter in the same way as in Example 1. As a result, the recorded image was free from image unevenness and image noise attributable to partial or local unevenness of sensitivity of the photoelectric sensor. When information on the color image thus recorded was read and output in the same way as in Example 1, a favorable print, which was free from image unevenness and image noise, was obtained.

EXAMPLE 21

(Preparation of a double-layered photoelectric sensor)

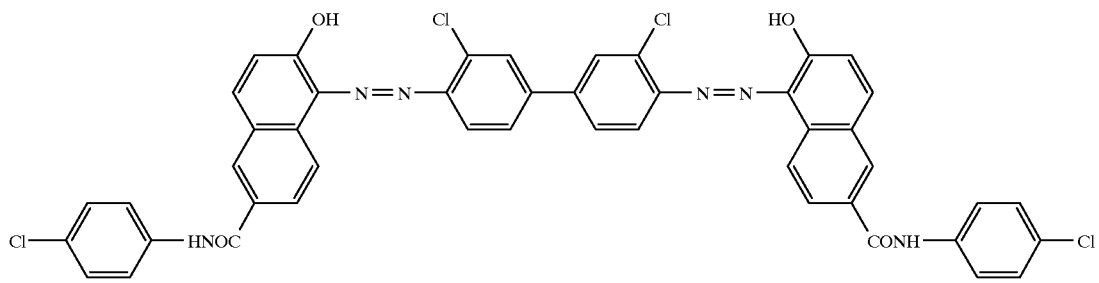

The surface of the charge generation layer was coated with a coating solution in 0.4 sec. by a spinner at 400 rpm. The coating solution was prepared by uniformly dissolving 25 parts by weight of a compound (T-405, manufactured by Anan Co., Ltd.) having the following structure as a charge transport substance, and 5 parts by weight of a polystyrene resin material (HRM-3, manufactured by Denki Kagaku Kogyo K.K.) in 68 parts by weight of dichloromethane and 102 parts by weight of 1,1,2-trichloroethane.

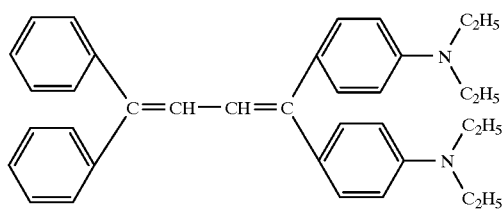

After the coating process, the coated electrode was allowed to stand under a calm condition until a dry film was 1 part by weight of a polyvinyl formal resin was dissolved in 98 parts by weight of 1,4-dioxane and 98 parts by weight of cyclohexanone, thereby obtaining a coating solution for forming a photo-induced current amplifying layer. In the same way as in Example 1, the surface of a cleaned electrode was coated with the prepared coating solution in 0.4 sec. by a spinner at 4,000 rpm, and the coated electrode was allowed to stand under a dust-free condition, thereby effecting leveling drying. Thereafter, drying was carried out for 0.5 hour at 100° C. Thus, a photo-induced current amplifying layer having a thickness of 100 nm was stacked on the electrode. On the photo-induced current amplifying layer, a charge generation layer and a charge transport layer were formed in the same way as in Example 18, thereby preparing a double-layered photoelectric sensor.

(Information recording method and recording characteristics)

Image recording was carried out in the same way as in Example 1 by using the photoelectric sensor of the present invention prepared as described above and an information recording medium prepared in the same way as in Example 1. The recorded image was free from image unevenness and image noise attributable to partial or local unevenness of sensitivity of the photoelectric sensor. Thus, a favorable recorded image was obtained.

The information recorded on the information recording medium was read and output in the same way as in Example 1. As a result, a favorable print, which had gradation corresponding to the gray scale and was free from image unevenness and image noise, was obtained. Thus, the image quality was improved.

Further, a color image was recorded by separating the applied light into three colors, i.e., R, G and B, using prisms and a color filter in the same way as in Example 1. As a result, the recorded image was free from image unevenness and image noise attributable to partial or local unevenness of sensitivity of the photoelectric sensor. When information on the color image thus recorded was read and output in the same way as in Example 1, a favorable print, which was free from image unevenness and image noise, was obtained.

Thus, the photoelectric sensor of the present invention has a photo-induced current amplifying layer provided between the electrode and the photoconductive layer, thereby making it possible to stably control the injection of charge carriers from the electrode into the photoconductive layer and to allow the overall electrical conductivity of the photoelectric sensor to be semiconductive when no light is applied thereto. In addition, it is possible to eliminate partial or local unevenness of sensitivity of the photoelectric sensor, which would otherwise be likely to occur when light is applied to the photoelectric sensor. Accordingly, the photoelectric sensor is free from partial unevenness of the recorded information occurring over a relatively wide area and observed as unevenness of sensitivity and local unevenness of the recorded information occurring locally and observed as noise. Thus, the photoelectric sensor of the present invention enables high-sensitivity and high-quality information recording on an information recording medium without unevenness of sensitivity and noise.

What we claim is:

1. A photoelectric sensor having a photoconductive layer on an electrode and used to form information on an information recording medium, said photoelectric sensor being semiconductive and having such a function that when a voltage is applied between the electrode of said photoelectric sensor and an electrode of said information recording medium while information exposure is being carried out, or when information exposure is carried out with a voltage being applied between the two electrodes, information is recorded on said information recording medium with an electric current amplified to a level higher than an intensity of a photoelectric current induced by the information exposure, and that even after termination of the information exposure, when the voltage is continuously applied, said photoelectric sensor shows moderately decaying electrical conductivity and continuously effects information recording to said information recording medium, wherein the improvement comprises a photo-induced current amplifying layer provided between said electrode and said photoconductive layer, said photo-induced current amplifying layer comprising at least one substance selected from the group consisting of an electron accepting substance, an organic pigment and a synthetic resin material.

2. A photoelectric sensor having a photoconductive layer on an electrode and used to form information on an information recording medium having an information recording layer stacked on an electrode so that information is formed on said information recording layer by an electric field or electric charge given thereto from said photoelectric sensor disposed to face said information recording medium, said photoelectric sensor being semiconductive and having such a function that when a voltage is applied between the electrode of said photoelectric sensor and the electrode of said information recording medium while information exposure is being carried out, or when information exposure is carried out with a voltage being applied between the two electrodes, the electric field or electric charge given to said information recording medium is amplified, and that even after termination of the information exposure, when the voltage is continuously applied, said photoelectric sensor sustains electrical conductivity and continuously gives the electric field or electric charge to said information recording medium, wherein the improvement comprises a photo-induced current amplifying layer provided between said electrode and said photoconductive layer, said photo-induced current amplifying layer comprising at least one substance selected from the group consisting of an electron accepting substance, an organic pigment and a synthetic resin material.

3. A photoelectric sensor according to claim 1 or 2, wherein said photoconductive layer has a single-layer structure containing a photoconductive substance and a charge transport substance.

4. A photoelectric sensor according to claim 1 or 2, wherein said photoconductive layer has a double-layered structure including a charge generation layer and a charge transport layer.

5. A photoelectric sensor according to claim 1 or 2, wherein said photo-induced current amplifying layer contains at least one substance selected from an electron accepting substance, an organic pigment and a synthetic resin material.

6. A photoelectric sensor according to claims 1 or 2, wherein said photo-induced current amplifying layer has inject current stabilizing action.

7. A photoelectric sensor according to claim 1 or 2, wherein when an electric field having an intensity of $10^5$ V/cm to $10^6$ V/cm is applied to said photoelectric sensor during the voltage application, the passing current density at an unexposed portion is $10^{-4}$ A/cm$^2$ to $10^{-7}$ A/cm$^2$.

8. A photoelectric sensor according to claim 1 or 2, wherein when a thermally stimulated current is measured at a bias voltage of 1.5 V/$\mu$m, clear peak is observed in the range of 50° C. to 110° C., and the current density at the peak is not lower than $5 \times 10^{-8}$ A/cm$^2$.

9. An information recording system for recording light information on an information recording medium by information exposure, said system comprising a photoelectric sensor as defined in claim 1 or 2, and the information recording medium having an information recording layer formed on an electrode, said photoelectric sensor and said information recording medium being disposed on an optical axis to face each other across a gap and connected to each other so that a voltage can be applied between the electrode of said photoelectric sensor and the electrode of said information recording medium.

10. An information recording system according to claim 9, wherein said information recording layer comprises a liquid crystal phase and a resin phase.

11. An information recording system according to claim 9, wherein said information recording layer is made of a thermoplastic resin and heated after electric charge corresponding to information exposure has been given to a surface thereof, thereby forming a frost image corresponding to the information exposure on the surface of said information recording layer.

12. An information recording system according to claim 9, wherein said information recording layer is an electric charge retaining layer, so that electric charge corresponding to information exposure is given to and formed on a surface of said information recording layer, or the electric charge formed on the surface of said information recording layer is developed with a toner.

13. An information recording system according to claim 9, wherein said information recording layer has memory properties.

14. An information recording system according to claim 9, wherein when an electric field having an intensity of $10^5$ V/cm to $10^6$ V/cm is applied to said photoelectric sensor, the passing current density at an unexposed portion is $10^{-4}$ A/cm$^2$ to $10^{-7}$ A/cm$^2$, and the resistivity of said information recording medium is $10^{10}$ ohm-cm to $10^{13}$ ohm-cm.

15. An information recording system having a photo-induced current amplifying layer, a photoconductive layer, a dielectric layer, an information recording layer, and an upper electrode, which are successively stacked on a lower electrode in the mentioned order, wherein a photoelectric sensor part including said lower electrode, said photo-induced current amplifying layer and said photoconductive layer comprises a photoelectric sensor as defined in claim 1 or 2, and said lower and upper electrodes are connected together so that a voltage can be applied therebetween.

16. An information recording system according to claim 15, wherein said information recording layer of said information recording medium comprises a liquid crystal phase and a resin phase.

17. An information recording and reproducing method wherein light information is recorded on an information recording medium by information exposure, the information recording medium having a photoelectric sensor having a photoconductive layer on an electrode and a photo-induced current amplifying layer provided between said electrode and said photoconductive layer, said photo-induced current amplifying layer comprising at least one substance selected from the group consisting of an electron accepting substance, an organic pigment and a synthetic resin material, and the information recording medium having an information recording layer formed on an electrode, at least one of said electrode of said photoelectric sensor and said electrode of said information recording medium being transparent, said method comprising the steps of: using the information recording medium; disposing said photoelectric sensor and said information recording medium on an optical axis to face each other across a gap, applying a voltage between said two electrodes while carrying out light information exposure, thereby recording light information on said information recording medium; and reproducing the light information recorded on said information recording medium as visible information by transmitted or reflected light.

18. An information recording and reproducing method wherein light information is recorded on an information recording medium by information exposure, the information recording medium having a photoelectric sensor having a photoconductive layer on an electrode and a photo-induced current amplifying layer provided between said electrode and said photoconductive layer, said photo-induced current amplifying layer comprising at least one substance selected from the group consisting of an electron accepting substance, an organic pigment and a synthetic resin material, and the information recording medium having an information recording layer of a thermoplastic resin formed on an electrode, said method comprising the steps of: using the information recording medium; carrying out light information exposure; heating said information recording layer after electric charge has been given to a surface thereof by the light information exposure, thereby forming a frost image corresponding to the information exposure on the surface of said information recording layer; and reproducing the light information recorded on said information recording medium as visible information by transmitted or reflected light.

19. An information recording and reproducing method wherein light information is recorded on an information recording medium by information exposure, the information recording medium having a photoelectric sensor having a photoconductive layer on an electrode and a photo-induced current amplifying layer provided between said electrode and said photoconductive layer, said photo-induced current amplifying layer comprising at least one substance selected from the group consisting of an electron accepting substance, an organic pigment and a synthetic resin material, and the information recording medium having as an information recording layer and electric charge retaining layer formed on an electrode, said method comprising the steps of: using the information recording medium; carrying out light information exposure to give electric charge to said information recording layer, thereby recording light information on said information recording medium; and reading and reproducing the recorded light information with an electric potential sensor.

20. An information recording and reproducing method wherein light information is recorded on an information recording medium by information exposure, the information recording medium having a photoelectric sensor having a photoconductive layer on an electrode and a photo-induced current amplifying layer provided between said electrode and said photoconductive layer, said photo-induced current amplifying layer comprising at least one substance selected from the group consisting of an electron accepting substance, an organic pigment and a synthetic resin material, and the information recording medium having as an information recording layer an electric charge retaining layer formed on an electrode, said method comprising the steps of: using the information recording medium carrying out light information exposure to give electric charge to said information recording layer, thereby recording light information on said information recording medium; developing the recorded light information with a toner; and reproducing the recorded light information as visible information by transmitted or reflected light.

21. An information recording and reproducing method wherein light information is recorded on an information recording medium by information exposure, the information recording medium having a photo-induced current amplifying layer, a photoconductive layer, a dielectric layer, an information recording layer, and an upper electrode which are successively stacked on a lower electrode in the mentioned order, in which a photoelectric sensor part including said lower electrode, said photo-induced current amplifying layer and said photoconductive layer comprises a photoelectric sensor, said photo-induced current amplifying layer comprising at least one substance selected from the group consisting of an electron accepting substance, an organic pigment and a synthetic resin material, at least one of said upper and lower electrodes being transparent said method comprising the steps of: using the information recording medium; applying a voltage between said upper and lower electrodes while carrying out light information exposure, thereby recording light information on said information recording medium; and reproducing the light information recorded on said information recording medium as visible information by transmitted or reflected light.

* * * * *